United States Patent
Cooley et al.

(10) Patent No.: US 9,382,762 B2
(45) Date of Patent: *Jul. 5, 2016

(54) CUTTING ELEMENT APPARATUSES, DRILL BITS INCLUDING SAME, METHODS OF CUTTING, AND METHODS OF ROTATING A CUTTING ELEMENT

(71) Applicant: US SYNTHETIC CORPORATION, Orem, UT (US)

(72) Inventors: Craig H. Cooley, Saratoga Springs, UT (US); Timothy N. Sexton, Santaquin, UT (US); S. Barrett Peterson, Orem, UT (US); Jeffrey Lund, Cottonwood Heights, UT (US); Christopher F. Johnson, Bountiful, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/561,031

(22) Filed: Dec. 4, 2014

(65) Prior Publication Data

US 2015/0152688 A1 Jun. 4, 2015

Related U.S. Application Data

(60) Continuation of application No. 14/033,262, filed on Sep. 20, 2013, now Pat. No. 8,931,582, which is a continuation of application No. 13/487,541, filed on Jun. 4, 2012, now Pat. No. 8,561,728, which is a (Continued)

(51) Int. Cl.
*E21B 10/42* (2006.01)
*E21B 10/55* (2006.01)
(Continued)

(52) U.S. Cl.
CPC ............... *E21B 10/42* (2013.01); *B23B 27/12* (2013.01); *E21B 10/08* (2013.01); *E21B 10/55* (2013.01); *E21B 10/567* (2013.01); *E21B 10/62* (2013.01); *E21B 2010/545* (2013.01)

(58) Field of Classification Search
CPC ....... E21B 10/62; E21B 10/567; E21B 10/08; E21B 10/42; E21B 10/55; E21B 2010/545; E21B 10/573; B32B 27/12
USPC ............... 166/291, 292, 155, 177.4, 84.1; 175/342, 383, 426, 432, 331, 369
See application file for complete search history.

(56) References Cited

U.S. PATENT DOCUMENTS 1,686,403 A   10/1928   Boynton
1,723,381 A   8/1929    Seifert (Continued)

FOREIGN PATENT DOCUMENTS

WO   8606990      12/1986
WO   2005021191   3/2005
WO   2007044791   4/2007

OTHER PUBLICATIONS

PCT/US2006/039692, International Search Report dated Mar. 6, 2007.

(Continued)

*Primary Examiner* — Daniel P Stephenson
(74) *Attorney, Agent, or Firm* — Holland & Hart LLP

(57) ABSTRACT

A subterranean drilling system may include a drill string and a rotary drill bit coupled to the drill string. The rotary drill bit may include a bit body and a cutting element coupled to the bit body, with the cutting element being structured to rotate in response to torque applied to the cutting element. The system also may include a cam assembly coupled to the drill string, a cam follower assembly in contact with a cam surface of the cam assembly, and a torque-applying structure coupled to the cam follower assembly. The torque-applying structure may be configured to apply torque to the cutting element in response to relative rotation between the cam assembly and the cam follower assembly.

20 Claims, 34 Drawing Sheets

Related U.S. Application Data continuation of application No. 13/289,871, filed on Nov. 4, 2011, now Pat. No. 8,210,285, which is a continuation of application No. 12/910,686, filed on Oct. 22, 2010, now Pat. No. 8,061,452, which is a division of application No. 11/844,821, filed on Aug. 24, 2007, now Pat. No. 7,845,436, which is a continuation-in-part of application No. 11/247,574, filed on Oct. 11, 2005, now Pat. No. 7,604,073.

(51) Int. Cl.
| | |
|---|---|
| *B23B 27/12* | (2006.01) |
| *E21B 10/567* | (2006.01) |
| *E21B 10/62* | (2006.01) |
| *E21B 10/08* | (2006.01) |
| *E21B 10/54* | (2006.01) |

(56) References Cited

U.S. PATENT DOCUMENTS

| | | |
|---|---|---|
| 1,790,613 A | 1/1931 | Gildersleeve et al. |
| 2,289,707 A | 7/1942 | Hellman |
| 2,506,341 A | 5/1950 | Herbert |
| 2,631,360 A | 3/1953 | Sanford et al. |
| 2,710,180 A | 6/1955 | Graham |
| 2,879,049 A | 3/1959 | Poundstone |
| 2,917,819 A | 12/1959 | Britton et al. |
| 3,136,615 A | 6/1964 | Bovenkerk et al. |
| 3,141,746 A | 7/1964 | De Lai |
| 3,271,080 A | 9/1966 | Gowanlock |
| 3,528,516 A | 9/1970 | Brown |
| 3,565,192 A | 2/1971 | McLarty |
| 3,720,273 A | 3/1973 | McKenry et al. |
| 3,749,190 A | 7/1973 | Shipman |
| 3,763,492 A | 10/1973 | Easton |
| 3,847,236 A | 11/1974 | Coalson |
| 4,014,395 A | 3/1977 | Pearson |
| 4,047,583 A | 9/1977 | Dyer |
| 4,057,884 A | 11/1977 | Suzuki |
| 4,073,354 A | 2/1978 | Rowley et al. |
| 4,199,035 A | 4/1980 | Thompson |
| 4,200,159 A | 4/1980 | Peschel et al. |
| 4,201,421 A | 5/1980 | Den Besten et al. |
| 4,222,446 A | 9/1980 | Vasek |
| 4,337,980 A | 7/1982 | Krekeler |
| 4,350,215 A | 9/1982 | Radtke et al. |
| 4,386,669 A | 6/1983 | Evans |
| 4,396,077 A | 8/1983 | Radtke |
| 4,453,605 A | 6/1984 | Short, Jr. |
| 4,466,498 A | 8/1984 | Bardwell |
| 4,511,006 A | 4/1985 | Grainger |
| 4,538,690 A | 9/1985 | Short |
| 4,553,615 A | 11/1985 | Grainger |
| 4,654,947 A | 4/1987 | Davis |
| 4,690,228 A | 9/1987 | Voelz et al. |
| 4,694,918 A | 9/1987 | Hall et al. |
| 4,720,216 A | 1/1988 | Smith et al. |
| 4,751,972 A | 6/1988 | Jones et al. |
| 4,782,903 A | 11/1988 | Strange |
| 4,802,539 A | 2/1989 | Hall et al. |
| 4,877,096 A | 10/1989 | Tibbitts |
| 5,007,493 A | 4/1991 | Coolidge et al. |
| 5,007,685 A | 4/1991 | Beach et al. |
| 5,056,382 A | 10/1991 | Clench |
| 5,181,576 A | 1/1993 | Askew et al. |
| 5,279,375 A | 1/1994 | Tibbitts |
| 5,293,945 A | 3/1994 | Rosenhauch et al. |
| 5,318,138 A | 6/1994 | Dewey et al. |
| 5,332,051 A | 7/1994 | Knowlton |
| 5,351,772 A | 10/1994 | Smith |
| 5,469,927 A | 11/1995 | Griffin |
| 5,558,170 A | 9/1996 | Thigpen et al. |
| 5,678,645 A | 10/1997 | Tibbitts et al. |
| 5,810,103 A | 9/1998 | Torbet |
| 5,906,245 A | 5/1999 | Tibbitts et al. |
| 5,947,214 A | 9/1999 | Tibbitts et al. |
| 5,975,811 A | 11/1999 | Briese et al. |
| 6,070,677 A | 6/2000 | Johnston |
| 6,073,524 A | 6/2000 | Weiss et al. |
| 6,283,234 B1 | 9/2001 | Torbet |
| 6,302,224 B1 | 10/2001 | Sherwood, Jr. |
| 6,408,959 B2 | 6/2002 | Bertagnolli |
| 6,655,479 B2 | 12/2003 | Kleine et al. |
| 6,733,087 B2 | 5/2004 | Hall et al. |
| 6,733,365 B1 | 5/2004 | Shaw et al. |
| 7,048,080 B2 | 5/2006 | Griffo et al. |
| 7,070,011 B2 | 7/2006 | Sherwood, Jr. et al. |
| 7,192,226 B2 | 3/2007 | Unsworth |
| 7,533,709 B2 | 5/2009 | Meyer |
| 7,533,720 B2 | 5/2009 | Robichaux et al. |
| 7,533,739 B2 | 5/2009 | Cooley et al. |
| 7,604,073 B2 | 10/2009 | Cooley et al. |
| 7,681,646 B2 | 3/2010 | Robichaux et al. |
| 7,681,665 B2 | 3/2010 | Eppink |
| 7,845,436 B2 | 12/2010 | Cooley et al. |
| 7,882,905 B2 | 2/2011 | Radford et al. |
| 7,913,760 B2 | 3/2011 | Robichaux et al. |
| 7,987,931 B2 | 8/2011 | Cooley et al. |
| 8,061,452 B2 | 11/2011 | Cooley et al. |
| 8,079,431 B1 | 12/2011 | Cooley et al. |
| 8,146,663 B2 | 4/2012 | Robichaux et al. |
| 8,202,335 B2 | 6/2012 | Cooley et al. |
| 8,210,285 B2 | 7/2012 | Cooley et al. |
| 8,297,348 B2 | 10/2012 | Robichaux et al. |
| 8,528,631 B2 | 9/2013 | Robichaux et al. |
| 8,561,728 B2 | 10/2013 | Cooley et al. |
| 2002/0053472 A1 | 5/2002 | Kleine et al. |
| 2005/0183892 A1 | 8/2005 | Oldham et al. |
| 2007/0278017 A1 | 12/2007 | Shen et al. |
| 2008/0017419 A1 | 1/2008 | Cooley et al. |
| 2009/0020339 A1 | 1/2009 | Sherwood, Jr. |
| 2010/0200298 A1 | 8/2010 | Mackenzie |
| 2010/0314176 A1 | 12/2010 | Zhang et al. |
| 2011/0088955 A1 | 4/2011 | Cooley et al. |
| 2014/0020956 A1 | 1/2014 | Cooley et al. |

OTHER PUBLICATIONS

European Search Report for European Application No. EP 09 01 2820 dated Nov. 18, 2009.
PCT/US2012/062432, International Search Search Report dated Apr. 22, 2013.
English Abstract of WO8606990. Dec. 4, 1986.

CUTTING ELEMENT APPARATUSES, DRILL BITS INCLUDING SAME, METHODS OF CUTTING, AND METHODS OF ROTATING A CUTTING ELEMENT

CROSS REFERENCE TO RELATED APPLICATION

This application is a continuation of U.S. patent application Ser. No. 14/033,262, filed Sep. 20, 2013, pending, which is a continuation of U.S. patent application Ser. No. 13/487,541, filed Jun. 4, 2012, now U.S. Pat. No. 8,561,728, issued Oct. 22, 2013, which is a continuation of U.S. patent application Ser. No. 13/289,871, filed Nov. 4, 2011, now U.S. Pat. No. 8,210,285, issued Jul. 3, 2012, which is a continuation of U.S. patent application Ser. No. 12/910,686, filed Oct. 22, 2010, now U.S. Pat. No. 8,061,452, issued Nov. 22, 2011, which is a divisional of U.S. patent application Ser. No. 11/844,821, filed Aug. 24, 2007, now U.S. Pat. No. 7,845,436, issued Dec. 7, 2010, which is a continuation-in-part of prior U.S. application Ser. No. 11/247,574, filed Oct. 11, 2005, now U.S. Pat. No. 7,604,073, issued Oct. 20, 2009, the disclosures of which are incorporated, in their entirety, by this reference.

FIELD OF THE INVENTION

The present invention relates generally to cutting elements. More specifically, the present invention relates to methods and apparatuses for applying torque to a cutting element to rotate the cutting element while cutting a material.

BACKGROUND

Cutting elements have been utilized for a variety of material removal processes such as machining, cutting, and drilling. For example, tungsten carbide cutting elements have been used for machining metals and, to some degree, on drilling tools for drilling subterranean formations, as known in the art. Further, polycrystalline diamond compact (PDC) cutters have been employed for machining metals (e.g., nonferrous metals, usually) and for subterranean drilling tools, such as, drill bits, reamers, core bits, etc. Of course, other types of cutting elements have been utilized for cutting operations, for example, ceramic (cubic boron nitride, silicon carbide, etc.) cutting elements or other cutting elements as known in the art.

For example, it is known to perform lathe operations with a cutting element (e.g., PDC cutter, a tungsten carbide cutting element, or another cutting element as known in the art). Additionally, some machinery (i.e., a planer) is designed to remove or cut material along a selected plane by moving a the piece to be cut against a cutting element. In some configurations, the piece to be cut may be rotated and the cutting element may be radially moved to plane or face a surface of the material. Such machinery may be utilized, among other examples, for forming monuments or building materials (e.g., any rock formation, such as granite, marble, etc.).

More particularly, with respect to subterranean drilling, rotary drill bits employing cutting elements for drilling subterranean formations, such as polycrystalline diamond compact (PDC) cutters, have been employed for several decades. Although other configurations are known in the art, PDC cutters are typically comprised of a disc-shaped diamond "table" formed on and bonded (under high-pressure and high-temperature conditions) to a supporting substrate, such as a cemented tungsten carbide (WC) substrate.

As known in the art, the drill bit bodies to which cutting elements are attached may often be formed of steel or of molded tungsten carbide. Drill bit bodies formed of molded tungsten carbide (so-called matrix-type bit bodies) are typically fabricated by preparing a mold that embodies the inverse of the desired topographic features of the drill bit body to be formed. Examples of such topographic features include generally radially extending blades, sockets or pockets for accepting the cutting elements, junk slots, internal watercourses, passages for delivery of drilling fluid to the bit face, ridges, lands, and the like. Tungsten carbide particles are then placed into the mold and a binder material, such as a metal including copper and tin, is melted or infiltrated into the tungsten carbide particles and solidified to form the drill bit body. Steel drill bit bodies, on the other hand, are typically fabricated by machining a piece of steel to form the desired external topographic features of the drill bit body. In both matrix-type and steel bodied drill bits, a threaded pin connection may be formed for securing the drill bit body to the drive shaft of a downhole motor or directly to drill collars at the distal end of a drill string rotated at the surface by a rotary table or top drive.

Cutting elements are typically attached to matrix-type and steel bodied drill bits by either brazing or press-fitting the cutting elements into recesses or pockets formed in the bit face or in blades extending from the face. The cutting elements are attached to the bit bodies in this manner to ensure sufficient cutting element retention, as well as mechanical strength sufficient to withstand the forces experienced during drilling operations. However, conventional drill bits having conventionally attached cutting elements suffer from a number of drawbacks and disadvantages. For example, because the cutting element is affixed to the bit body, only a portion of the circumferential cutting edge of the cutting element actually engages the subterranean formation being drilled. The constant engagement between this select portion of the cutting edge and the formation tends to quickly degrade and wear down the engaged portion of the cutting edge, resulting in decreased cutting element life, drilling efficiency, and accuracy. This constant engagement also significantly increases the temperature of the cutting element, which may further result in increased wear and/or potential destruction of the cutting element and drill bit body.

Accordingly, a number of conventional attempts have been made to provide a drill bit having cutting elements that are free to rotate during drilling due to interaction with a subterranean formation. For example, U.S. Pat. No. 4,553,615 to Grainger (the '615 patent) discloses a rotary drilling drag bit having a cutting element having a spindle formed of cemented tungsten carbide mounted in a recess formed in the face of a bit blade. A similar configuration is disclosed in U.S. Pat. No. 4,222,446 to Vasek.

However, unpredictability of the nature of contact with the formation being drilled, extreme temperatures, forces, and pressures encountered in subterranean drilling environments may prevent or inhibit rotation of the cutting elements altogether. Thus, such a conventional cutting element, as with brazed or press-fit cutting elements, may exhibit a portion of the cutting edge that tends to degrade and wear down, resulting in decreased cutting element life and drilling efficiency. Similarly, when machining, wear that occurs relative to a cutting element may cause interruptions in the machining operation to replace or otherwise reorient the cutting element.

Accordingly, there exists a need for methods and apparatuses for rotating a cutting element during cutting of a material. The torque applied to the cutting element would be sufficient to rotate, either continuously or periodically, the cutting element during cutting of a material.

SUMMARY

In at least one embodiment, a rotary drill bit for drilling a subterranean formation may comprise a bit body and at least one cutting element coupled to the bit body. Further, the at least one cutting element may comprise a table bonded to a substrate, and a torque-generating assembly may be configured to apply torque to the substrate of the at least one cutting element. The torque-generating assembly may be powered by the rotary motion of the rotary drill bit or may be hydraulically or electrically powered. In addition, the torque-generating assembly may generate and apply torque to the cutting element either continuously or periodically and may comprise an actuator assembly, such as an electric motor assembly, a hydraulic pump assembly, and/or a cam assembly. In certain embodiments, a structural assembly transmits the mechanical motion generated by the actuator assembly to the cutting element. According to one embodiment, the structural assembly comprises a rack coupled to the actuator assembly and a pinion operably coupled to both the rack and a drive shaft affixed to the cutting element.

In one aspect of the invention, a cutting element assembly may comprise at least one cutting element having a table bonded to a substrate and a torque-generating assembly coupled to the at least one cutting element and configured for applying torque to the cutting element. In a further aspect of the invention, a cutting element may comprise a substrate, a table of superabrasive material disposed on an end of the substrate and at least one impelling feature formed into at least a portion of an exterior surface of the substrate.

In addition, yet another aspect of the invention relates to a method of rotating a cutting element coupled to a drill bit for drilling a subterranean formation. More specifically, a cutting element may be provided comprising a table bonded to a substrate and the substrate of the cutting element may be coupled to a drill bit body. Also, torque may be applied to the substrate of the cutting element. A method of drilling a subterranean formation may comprise providing a cutting element comprising a table bonded to a substrate, coupling the cutting element to a drill bit, engaging the subterranean formation with the cutting element, and applying torque to the cutting element.

Further, another aspect of the present invention relates to a method of cutting a material, the method comprising: providing a cutting element comprising a table bonded to a substrate; cutting a material with the cutting element; and rotating the cutting element by applying torque to the substrate of the cutting element while cutting the material with the cutting element.

In an additional embodiment, a subterranean drilling system may comprise a drill string and a rotary drill bit coupled to the drill string. The rotary drill bit may comprise a bit body and a cutting element coupled to the bit body. The cutting element may be structured to rotate in response to torque applied to the cutting element. The system also may comprise a cam assembly coupled to the drill string, a cam follower assembly in contact with a cam surface of the cam assembly, and a torque-applying structure coupled to the cam follower assembly. In certain embodiments, the torque-applying structure may be configured to apply torque to the cutting element in response to relative rotation between the cam assembly and the cam follower assembly.

In one embodiment, the cutting element may comprise at least one engaging feature and the torque-applying structure may be a push rod having a first end disposed within a recess defined in the cam follower assembly and a second end structured to engage the at least one engaging feature of the cutting element. The first end of the push rod may comprise a superabrasive material.

In certain embodiments, the cam follower assembly may comprise at least one cam follower element. This cam follower element may comprise a substrate and a superabrasive table bonded to the substrate. In addition, at least a portion of the cam follower assembly may be pivotably attached to the bit body. At least a portion of the cam follower assembly also may be rotatably attached to at least a portion of the torque-applying structure. In certain embodiments, at least a portion of the cam follower assembly may pivot in response to relative rotation between the cam assembly and the cam follower assembly and at least a portion of the torque-applying structure may rotate in response to relative rotation between the cam assembly and the cam follower assembly.

In one embodiment, the push rod may be biased toward the cam follower assembly. The push rod also may comprise a flexible portion and a substantially rigid portion. In addition, the cutting element may be limited from rotating in a selected direction. The torque-applying structure also may apply torque to the cutting element in periodic increments, causing the cutting element to rotate in periodic increments. The cutting element also may rotate within an angle of rotation of less than 360 degrees.

In certain embodiments, the drilling system may further comprise a pressure-compensating assembly. This pressure-compensating assembly may be structured to at least partially compensate for differences between a pressure within at least a portion of the drill bit and another pressure external to at least a portion of the drill bit. The pressure-compensating assembly also may comprise a lubricating fluid within a sealed chamber that is defined by at least one seal member and a dynamic member that is structured to move in response to changes in pressure external to the sealed chamber.

In one embodiment, the cam assembly may comprise a plurality of cam inserts each affixed to a cam body, the plurality of cam inserts comprising at least a portion of the cam surface. At least one cam insert of the plurality of cam inserts may at least partially surround an adjacent cam insert. In addition, the plurality of cam inserts may be substantially identical.

In certain embodiments, the cam assembly may comprise a cam body having a substantially planar bottom surface. In addition, the cam surface of the cam assembly may be angled with respect to the substantially planar bottom surface of the cam body. The cam assembly also may comprise a substantially annular-shaped cam body having an external surface and an internal surface. In addition, a distance between the external surface and the internal surface of the cam body may vary at different points on the cam body.

In one embodiment, a rotary drill bit for drilling a subterranean formation may comprise a bit body and a cutting element coupled to the bit body and structured to rotate in response to torque applied to the cutting element. The cutting element may comprise a first portion a second portion mechanically coupled to the first portion. The first portion of the cutting element may be structured to decouple from the second portion of the cutting element when a cutting force applied to the first portion exceeds a selected magnitude.

In certain embodiments, the second portion of the cutting element may comprise at least one engaging structure structured to engage at least one engaging structure of the first portion of the cutting element. In addition, the first portion of the cutting element may comprise a superabrasive table bonded to a substrate. The second portion of the cutting element also may comprise a friction material structured to engage a friction material of the first portion of the cutting element.

In one embodiment, a subterranean drilling system may comprise a rotary drill bit comprising a bit body and a cutting element coupled to the bit body, the cutting element being structured to rotate in response to torque applied to the cutting element. The system also may comprise a torque-amplifying assembly operably coupled to the cutting element and a torque-generating assembly structured to apply a selected torque to the torque-amplifying assembly. In certain embodiments, the torque-amplifying assembly may apply a torque in excess of the selected torque to the cutting element.

The torque-amplifying assembly may comprise a first gear coupled to the torque-generating assembly, the first gear comprising a plurality of teeth, and a second gear engaged with the first gear, the second gear comprising a plurality of teeth. In one embodiment, the number of teeth on the second gear may be different than the number of teeth on the first gear.

In certain embodiments, a subterranean drilling system may comprise a torque-generating assembly and a rotary drill bit comprising a bit body and a plurality of rotatable cutting elements coupled to both the bit body and the torque-generating assembly. In one embodiment, each of the plurality of rotatable cutting elements may rotate in response to torque applied by the torque-generating assembly. In addition, the torque-generating assembly may comprise at least one engaging feature that is structured to engage at least one engaging feature provided on at least one of the plurality of rotatable cutting elements.

In one embodiment, a rotary drill bit for drilling a subterranean formation may comprise a bit body, a coupling structure, and a cutting element. The cutting element may comprise a non-ferrous portion having a top surface and a bottom surface and a ferrous portion bonded to the bottom surface of the non-ferrous portion. In certain embodiments, the ferrous portion may be structured to be threadedly coupled to the coupling structure to couple the cutting element to the bit body.

In one embodiment, the ferrous portion may comprise steel. In addition, at least a portion of the ferrous portion may be coated with an erosion resistant material. The erosion resistant material also may comprise tungsten carbide.

In certain embodiments, a rotary drill bit for drilling a subterranean formation may comprise a bit body, a cutting element coupled to the bit body, the cutting element being structured to rotate in response to torque applied to the cutting element, a hydraulic actuator assembly, and a structural assembly coupling the hydraulic actuator assembly to the cutting element. In one embodiment, the structural assembly may be configured to apply torque to the cutting element by converting linear motion generated by the hydraulic actuator assembly into rotary motion.

The hydraulic actuator assembly may comprise a pump, a chamber defined in the bit body, the chamber being in fluid communication with the pump, a piston disposed within the chamber, the piston moveable between a first position and a second position, and a piston rod coupled to the piston. The structural assembly may comprise a connecting structure coupled to the piston rod and a crank rotatably attached to the connecting structure.

In one embodiment, a subterranean drilling system may comprise a drill string and a rotary drill bit coupled to the drill string. The rotary drill bit may comprise a bit body, a first cutting element coupled to the bit body, the first cutting element being structured to rotate in response to torque applied to the cutting element, and a second cutting element coupled to the bit body; the second cutting element being structured to remain in a fixed position relative to the bit body. The system also may comprise a cam assembly coupled to the drill string, the cam assembly comprising a cam surface, a cam follower assembly in contact with the cam surface of the cam assembly, and a torque-applying structure coupled to the cam follower assembly. In certain embodiments, the torque-applying structure may be configured to apply torque to the first cutting element in response to relative rotation between the cam assembly and the cam follower assembly.

Features from any of the above-mentioned embodiments may be used in combination with one another in accordance with the present invention. These and other embodiments, features and advantages will be more fully understood upon reading the following detailed description in conjunction with the accompanying drawings and claims.

BRIEF DESCRIPTION OF THE DRAWINGS

The accompanying drawings illustrate exemplary embodiments of the present invention and are a part of the specification. Together with the following description, the drawings demonstrate and explain aspects of the present invention.

Figure 1A:
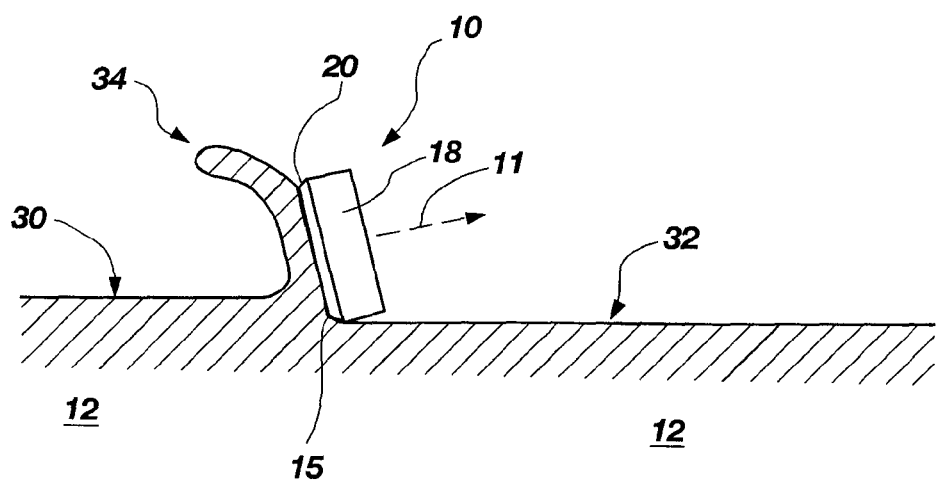
FIG. 1A shows a schematic representation of a cutting element used for cutting a material.

Throughout the drawings, identical reference characters and descriptions indicate similar, but not necessarily identical elements. While the present invention is susceptible to various modifications and alternative forms, specific embodiments have been shown by way of example in the drawings and will be described in detail herein. However, one of skill in the art will understand that the present invention is not intended to be limited to the particular forms disclosed. Rather, the invention covers all modifications, equivalents and alternatives falling within the scope of the invention as defined by the appended claims.

DETAILED DESCRIPTION

For ease of use, the words "including" and "having," as used in the specification and claims, are interchangeable with and have the same meaning as the word "comprising." In addition, as used throughout the specification and claims, the word "cutting" generally refers to any drilling, boring, or the like. The word "cutting," as used herein, refers broadly to machining processes, drilling processes, or any other material removal process utilizing a cutting element.

Figure 1B:
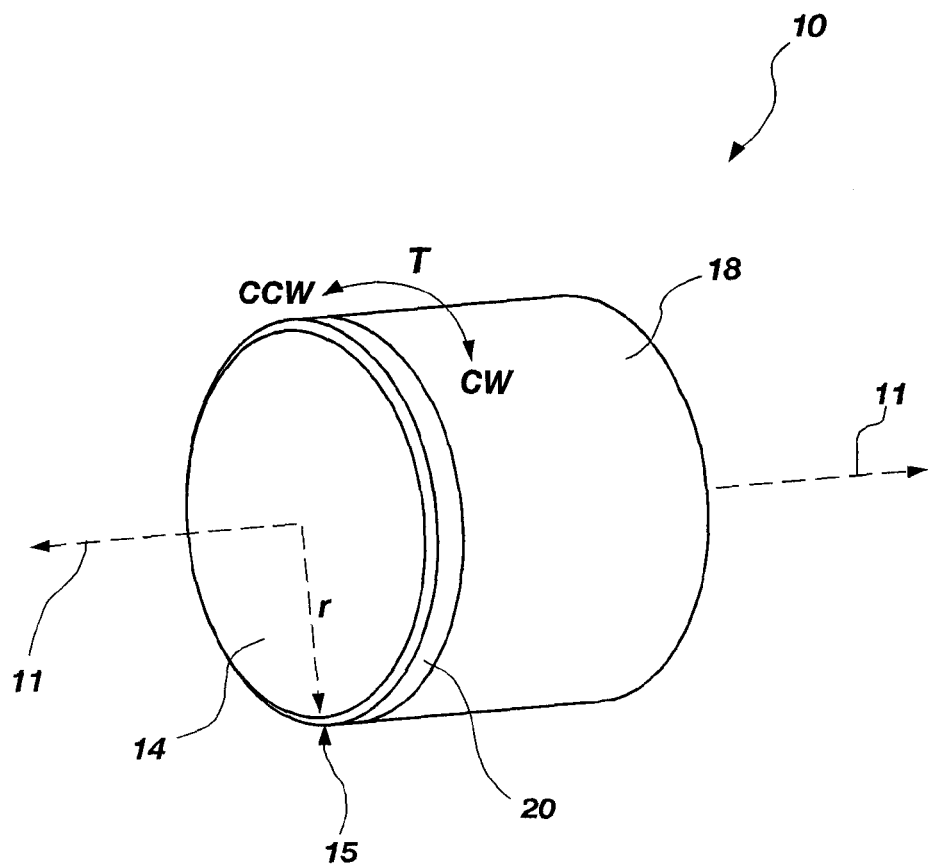
FIG. 1B shows a perspective view of a cutting element.
Figure 1C:
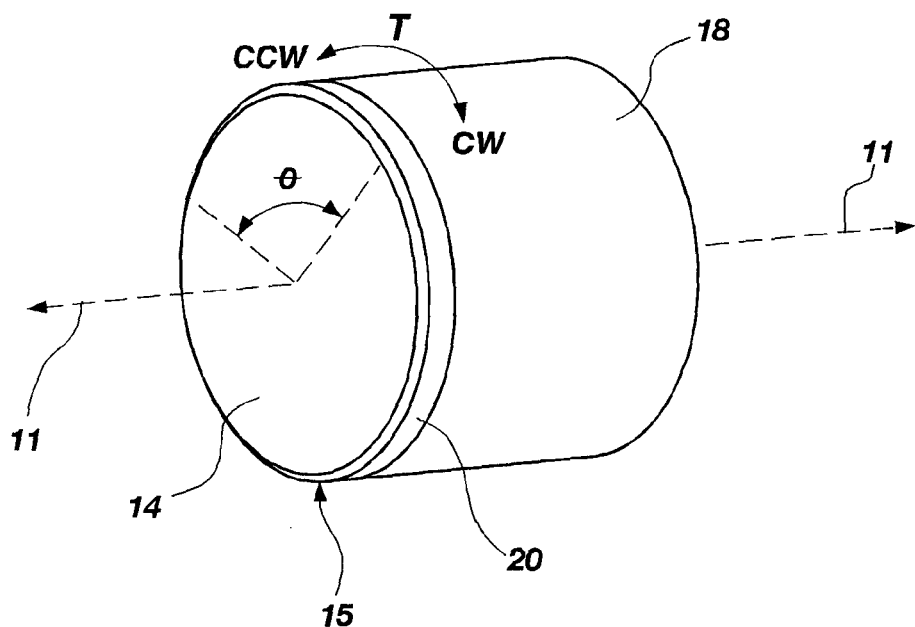
FIG. 1C shows a perspective view of a cutting element and a selected angle θ within which the cutting element may be rotated.
Figure 1D:
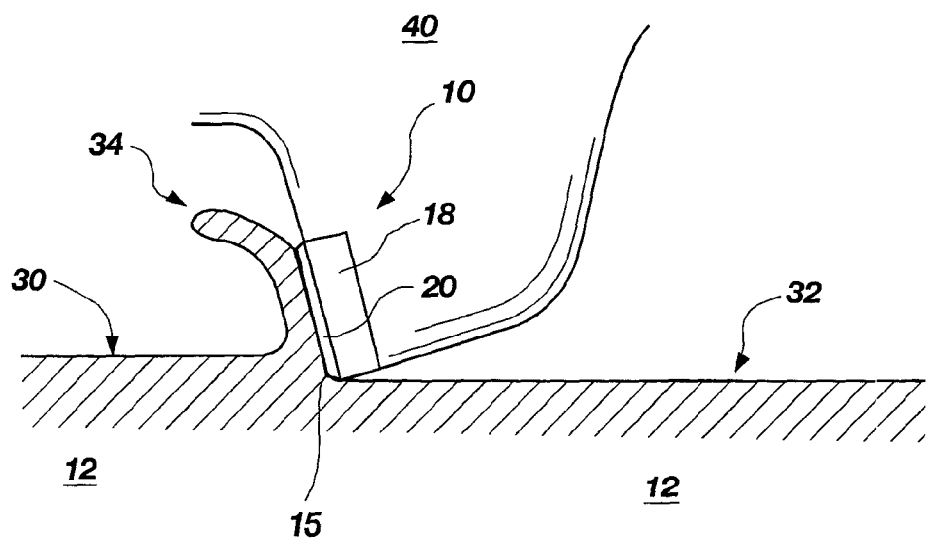
FIG. 1D shows a schematic view of a cutting element used for cutting a material, the cutting element supported by a body.

Generally speaking, the present invention relates to applying a torque to a cutting element during a cutting process. More particularly, a cutting element may be rotated during a cutting process so that a cutting edge is moved during the cutting process. For example, as shown in FIG. 1A, a cutting element 10 may be used for cutting a material 12. Cutting element 10 may comprise, as shown in FIG. 1A, a substrate 18 bonded to a superhard table 20 (e.g., polycrystalline diamond). Thus, in one embodiment, cutting element 10 may comprise a PDC cutter. In further detail, cutting edge 15 of cutting element 10 may be forced against material 12 so that cuttings 34 are removed from surface 30 and cut surface 32 is formed. Cuttings 34 are shown (collectively in the drawings) as a so-called "chip." It is understood that the cuttings may comprise pulverized material, fractured material, sheared material, a continuous chip, or any cuttings produced as known in the art, without limitation. According to one aspect of the present invention, cutting element 10 may be rotated during the process of cutting material 12. Such rotation may introduce a greater portion of a cutting edge 15 of cutting element 10 against material 12, which may reduce wear of the cutting element 10. For example, cutting element 10 may be rotated by applying a torque (labeled "T" in FIGS. 1B and 1C) to substrate 18 of the cutting element 10. In one embodiment, cutting element 10 may be substantially cylindrical and may rotate about central axis 11. FIG. 1B shows another view of cutting element 10. As shown in FIG. 1B, cutting edge 15 (located generally at radius r from central axis 11) may be formed about the circumference of cutting face 14, which may be substantially planar. In addition, as known in the art, cutting edge 15 may include at least one chamfer, at least one so-called buttress geometry, or any other geometry as known in the art. Further, cutting element 10 may be rotated about central axis 11 in a direction of the applied torque T in a direction CW (i.e., clockwise), in a direction labeled CCW (i.e., counterclockwise), or both (e.g., one direction at a time). Such rotation may cause a selected portion of cutting edge 15 to contact a material (e.g., material 12, as shown in FIG. 1A) cut with cutting element 10. For example, FIG. 1C shows cutting element 10 and a portion of cutting edge 15 encompassed by angle θ. Thus, it may be appreciated that cutting element 10 may be rotated in directions CW and CCW so that a selected region of cutting edge 15 encompassed by angle θ is moved into cutting engagement with a material. Of course, the cutting element may be rotated in at least one direction, substantially continuously or intermittently, so that the entire cutting edge interacts with a material being cut during a cutting process. Of course, it may further be appreciated that cutting element 10 must be supported to resist against the forces of the cutting process. As shown in FIG. 1D, the present invention contemplates that, in one embodiment, a cutting element 10 may be supported, at least in part, by a body 40 (e.g., a bit blade, a cutting element holding base, a lathe cutting element base, a planer cutting element base, etc.).

Figure 2:
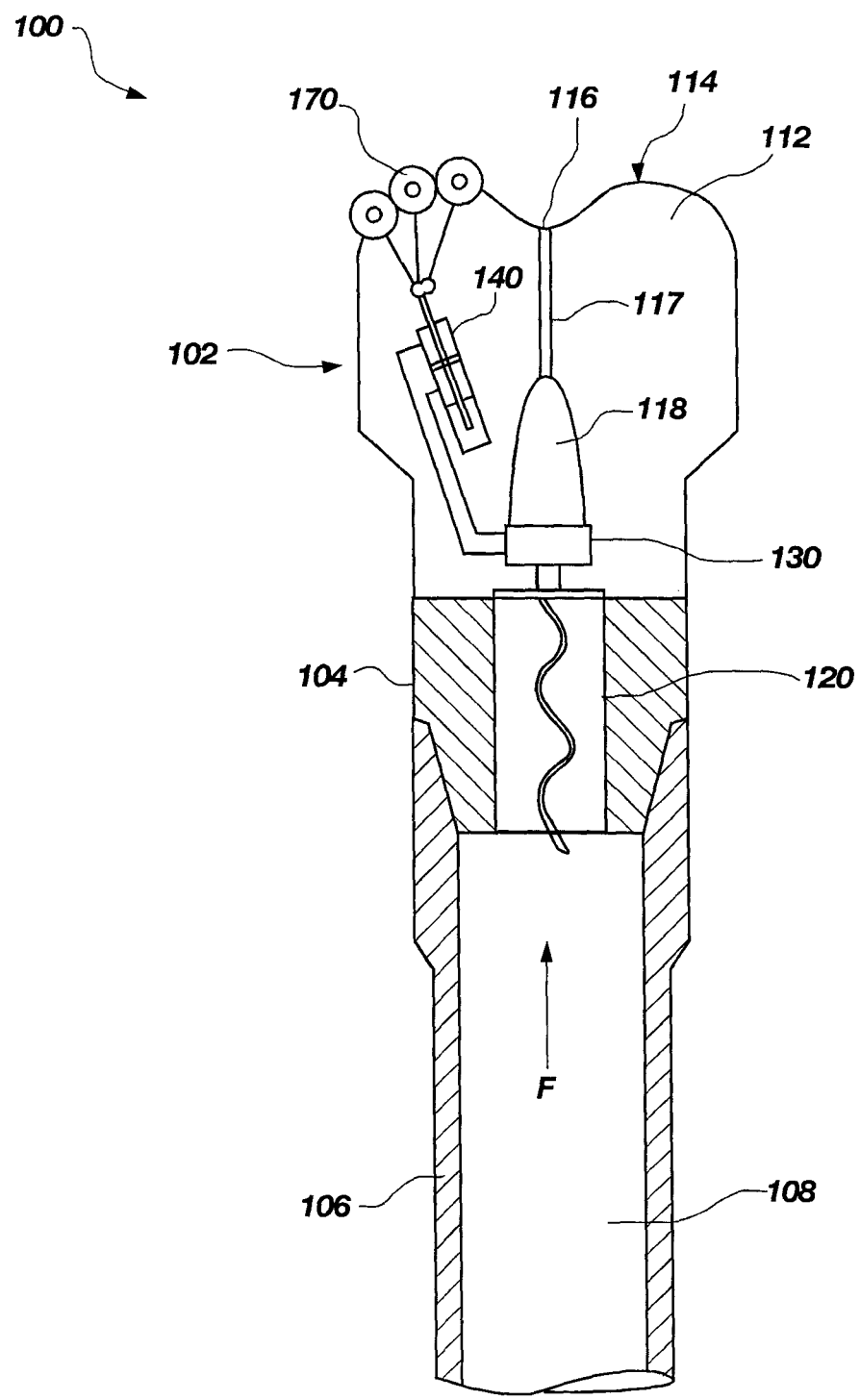
FIG. 2 shows a schematic, side cross-sectional view of an exemplary drilling apparatus and drill bit employing an actuator assembly for applying torque to a rotatable cutting element.

In addition, one aspect and application of the present invention relates to apparatuses and methods for applying torque to a cutting element in order to rotate the cutting element relative to a drill bit body. FIG. 2 is a schematic side cross-sectional view of an exemplary drilling apparatus and drill bit employing an actuator assembly for applying torque to a rotatable cutting element. As seen in the exemplary embodiment illustrated in FIG. 2, exemplary drilling apparatus 100 generally comprises a drill bit 102 having a tapered shank 104 threaded onto a drill string 106, as known in the art. Drill bit 102 generally represents any number of earth-boring or drilling tools, including, for example, core bits, roller-cone bits, fixed-cutter bits, eccentric bits, bicenter bits, reamers, reamer wings, and the like. In at least one embodiment, drill bit 102 comprises a plurality of radially and longitudinally extending blades 112 defining a leading end for drilling into a subterranean structure. Circumferentially adjacent blades 112 may define a plurality of so-called junk slots therebetween for channeling formation cuttings away from a face 114 of drill bit 102. As will be known to those of skill in the art, drill bit 102 may be formed in any number of ways and of any number of materials. For example, drill bit 102 may be machined from steel or may be manufactured by infiltrating a binder of tungsten carbide particulate, as described above.

As shown in FIG. 2, drilling fluids F may be pumped through a bore 108 formed in drill string 106 and into a plenum 118 defined within drill bit 102. As known in the art, at least one passageway 117 defined within drill bit 102 may communicate drilling fluids F to one or more apertures 116 formed in face 114 of drill bit 102. Drilling fluids F emanating from apertures 116 promote flushing formation cuttings away from face 114 while simultaneously cooling blades 112 and cutting elements 170.

According to at least one embodiment, one or more rotatable cutting elements 170 may be mounted to drill bit 102 (e.g., to face 114 or blade 112). Generally speaking, each of cutting elements 170 may comprise any cutting element known in the art capable of cutting a subterranean formation, including, for example, a PDC cutter. As seen in the exemplary embodiment illustrated in FIG. 4A, a cutting element 170 may comprise a layer or table 174 bonded to or formed upon a substrate 172. Table 174 may be formed of any number of materials used for cutting formations, including, for example, a superhard or superabrasive material such as polycrystalline diamond. "Superhard," as used herein, refers to any material having a hardness that is at least equal to a hardness of tungsten carbide. Similarly, substrate 172 may comprise any number of materials capable of adequately supporting a superabrasive material during drilling of a subterranean formation, including, for example, cemented tungsten carbide. For example, cutting element 170 may include a table 174 comprising polycrystalline diamond bonded to a substrate 172 comprising cobalt-cemented tungsten carbide. In such a configuration, table 174 and substrate 172 may be manufactured according to processes known in the art. Optionally, after formation of table 174, a catalyst material (e.g., cobalt, nickel, etc.) may be at least partially removed (e.g., by acid-leaching) from table 174.

Figure 4A:
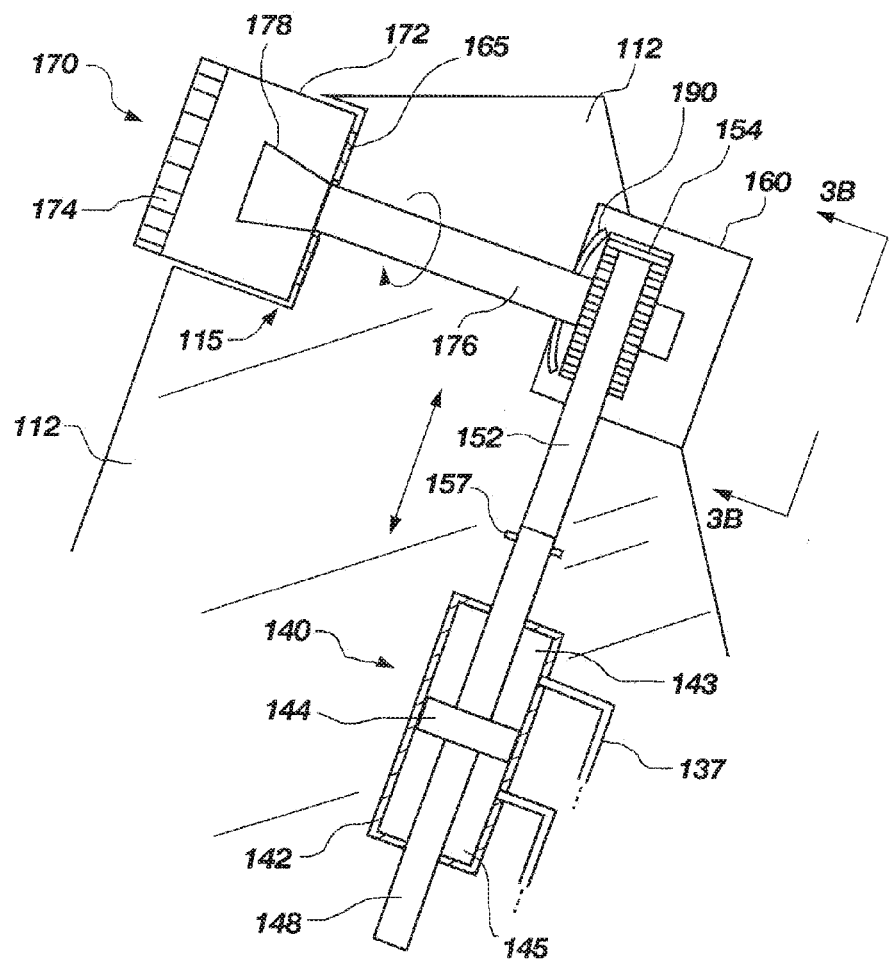
FIG. 4A shows an enlarged cross-sectional view of an exemplary actuator and structural assembly for applying torque to a rotatable cutting element.

The present invention contemplates that cutting elements 170 may be rotatably mounted to face 114 or blades 112 of drill bit 102 in any number of ways and configurations. For example, in at least one embodiment a recess 178 may be defined within substrate 172 so as to retain the distal end of a structural member rotatably attached to a torque-generating assembly housed in drill bit 102. Additional examples of structures for coupling a shaft to a substrate are disclosed in U.S. patent application Ser. No. 11/148,806, filed Jun. 9, 2005, the disclosure of which is incorporated, in its entirety, by this reference. Any of such structures or other suitable structures as known in the art for coupling a shaft to a substrate may be employed to couple substrate 172 to shaft 176, as shown in FIG. 4A. In further detail, in the exemplary embodiment illustrated in FIG. 4A, recess 178 is defined to have a tapered cross-section that embodies the inverse of the shape of the distal end of a drive shaft 176 rotatably attached to a torque-generating assembly (e.g., actuator assembly 140) housed in drill bit 102. Although recess 178 may be formed in any number of sizes or shapes, recess 178 may be formed to exhibit a tapered cross-sectional size that decreases in width in a direction away from table 174. This substantially frustoconical configuration may provide a robust structure for mechanically retaining the distal end of drive shaft 176 within substrate 172 of cutting element 170. Further, such a configuration may rotatably couple cutting element 170 to a torque-generating assembly (e.g., actuator assembly 140) housed in drill bit 102 (FIG. 2). In further detail, cutting element 170 may be mechanically coupled to a rotatable structural assembly (e.g., drive shaft 176). Accordingly, such mechanical coupling may avoid thermal damage to cutting element 170 associated with conventional brazing techniques.

Referring to FIG. 4A, in one embodiment, each of cutting elements 170 may be rotatably mounted to drill bit 102 by adhering, brazing, welding, or otherwise mechanically affixing substrate 172 of each of cutting elements 170 to a rotatable structural assembly (e.g., drive shaft 176) attached to a torque-generating assembly (e.g., actuator assembly 140) housed in drill bit 102. For example, the inner surface of recess 178 defined in substrate 172 may be threaded so as to house a structural assembly (e.g., drive shaft 176) having a complimentary threaded outer surface. In another embodiment, each of cutting elements 170 may be rotatably mounted to drill bit 102 in a manner similar to that disclosed in U.S. Pat. No. 4,553,615 to Grainger, the entirety of the disclosure of which is hereby incorporated by this reference. For example, cutting element 170 may include a spindle that is rotatably held in a cutting pocket 115 formed in blade 112 by a resilient split ring (i.e., a lock ring) fitted into a peripheral groove formed along the spindle.

According to certain embodiments, each of cutting elements 170 is rotatably mounted within a respective cutting pocket 115 defined in bit blade 112 of drill bit 102. Cutting pocket 115 of bit blade 112 may be generally configured for surrounding at least a portion of the substrate 172 of cutting element 170. As seen in FIG. 4A, the uppermost edge or tip of table 174 of each of cutting elements 170 may be positioned to extend beyond the upper surface of bit blade 112. Such clearance may be desirable so that each of cutting elements 170 contact the subterranean formation to be drilled, thus cutting and removing material from the formation. A portion of the upper surface of bit blade 112 may be structured for contacting a subterranean formation during drilling to limit a depth-of-cut (i.e., a rate-of-penetration) of a cutting element associated therewith, as known in the art. In addition, optionally, each of cutting elements 170 may be oriented to exhibit a so-called "negative" back rake angle, a side rake angle, or both, as known in the art. Further, each of cutting elements 170 (table 174, substrate 122, or both) may include a chamfer or buttress or may embody any other cutting edge geometry known in the art, without limitation.

Figure 3:
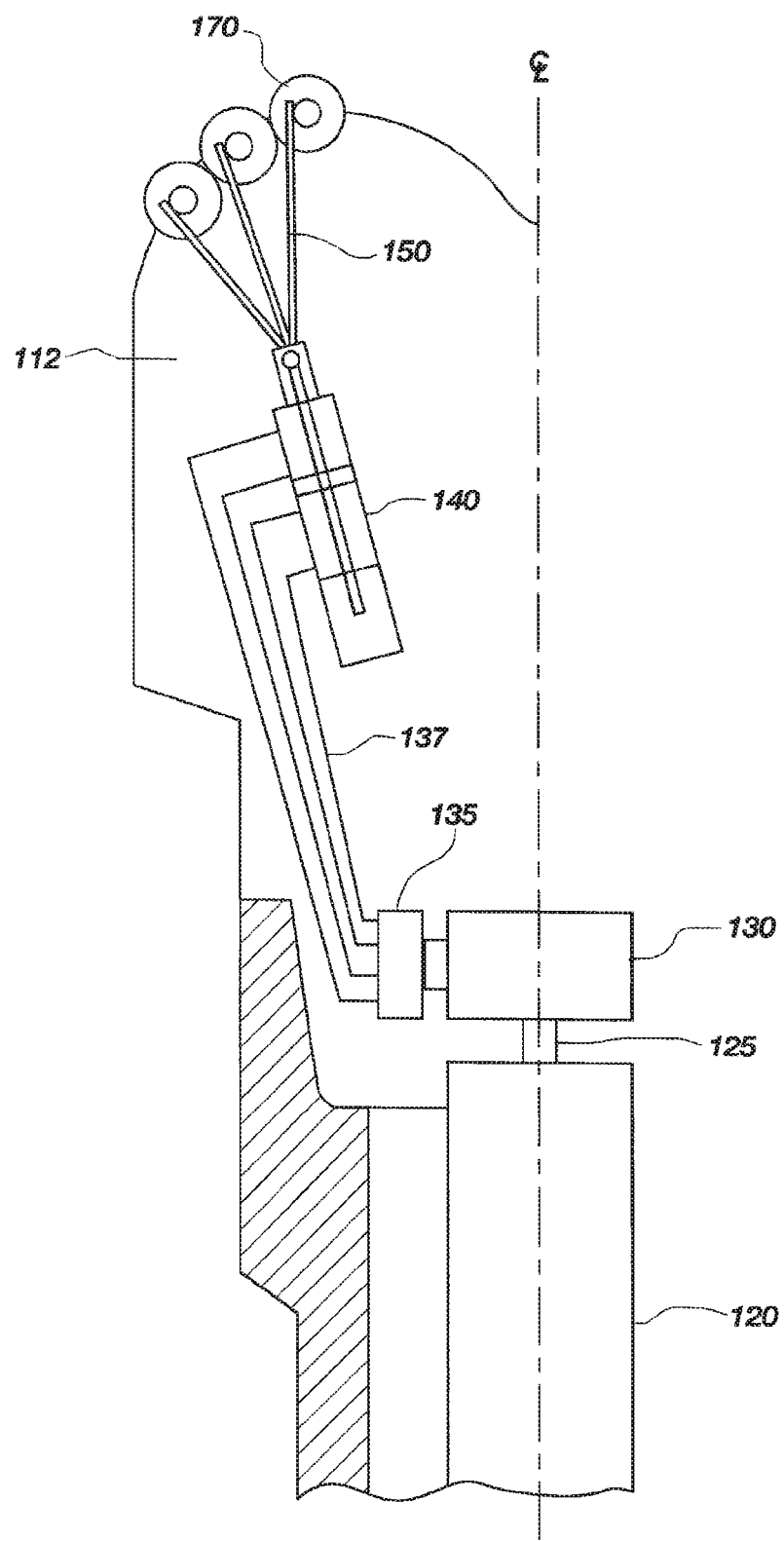
FIG. 3 shows an enlarged schematic view of an exemplary rotary drill bit employing an actuator assembly for applying torque to a rotatable cutting element.

In addition, still referring to the exemplary embodiments illustrated in FIGS. 2 and 3, drilling apparatus 100 may further comprise a motor 120 for powering a pump 130. Motor 120 may be configured to convert the momentum or energy of drilling fluids F into torque to rotate output shaft 125 connected to pump 130. For example, motor 120 may comprise a positive displacement motor for converting the momentum or energy of drilling fluids F flowing through bore 108 in drill string 106 into torque or a force or a moment for rotating output shaft 125, as known in the art. Alternatively, motor 120 may comprise any other configuration or motor capable of driving pump 130, including, for example, a Moineau-type motor, a turbine-type motor, or the like.

In at least one embodiment, pump 130 may be configured to generate pressure (via mechanical energy generated by motor 120) for operating an actuator assembly 140. Pump 130 may comprise any form of pump device capable of operating actuator assembly 140, including, for example, a hydraulic or pneumatic pump such as a gear, vane, or piston pump. In the exemplary embodiment illustrated in FIG. 3, a control valve assembly 135 is configured to control the flow, pressure, or both, of fluid between pump 130 and actuator assembly 140. Control valve assembly 135 may comprise any form of valve or other structure capable of controlling the flow and/or pressure of fluids between pump 130 and actuator assembly 140 (and vice versa). For example, control valve assembly 135 may comprise one or more angle valve, ball valve, block and bleed valve, control valve, directional valve, drain valve, poppet valve, solenoid valve, spool valve, or the like. Control valve assembly 135 may also comprise so-called "double-port" or "multi-port" hydraulic or pneumatic valve configurations, and may be connected to pump 130 via internal or external threads, a bolt or clamp flange, union connection, tube fitting, welds, or the like.

Figure 4B:
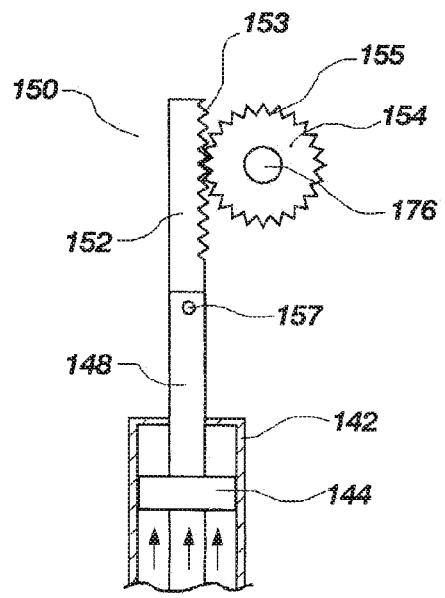
FIG. 4B shows an enlarged cross-sectional view of the exemplary actuator and structural assembly illustrated in FIG. 3A, as taken along the line 3B.

As seen in the exemplary embodiment illustrated in FIG. 3, pump 130 and control valve assembly 135 may be in fluid communication with an actuator assembly 140 housed in drill bit 102 via one or more conduits 137. Conduits 137 generally represent any form of fluid communication device known to those of skill in the art, including, for example, hoses, pipe, or tubing. Actuator assembly 140, in one embodiment, generally represents a device capable of transforming the pressure or flow generated by pump 130 into a torque, or a moment for rotating each of cutting elements 170. In at least one embodiment, actuator assembly 140 converts hydraulic or pneumatic pressure generated by pump 130 into a force that is used to rotate each of cutting elements 170. For example, as illustrated in FIGS. 4A and 4B, actuator assembly 140 may comprise a housing 142 within which a piston 144 is positioned. Also, piston 144 may be mechanically coupled to a piston rod 148. As known in the art, piston 144 is moveable within chamber 142 by generating a pressure differential between chambers 143 and 145 via connections 137. As detailed above, such a pressure difference between chambers 143 and 145 may be controlled by control valve assembly 135 coupled to pump 130.

According to certain embodiments, piston rod 148 of actuator assembly 140 is mechanically coupled to a structural assembly 150. Generally speaking, structural assembly 150 couples piston rod 148 of actuator assembly 140 with rotatable drive shaft 176, to apply torque to substrate 172 of cutting element 170. In the exemplary embodiment illustrated in FIGS. 4A and 4B, structural assembly 150 converts the motion of piston 144 and piston rod 148 into rotary motion (i.e., torque) to rotate drive shaft 176. According to one exemplary embodiment, structural assembly 150 comprises a rack 152 operably coupled to a pinion 154. Rack 152 may be operably coupled to pinion 154 in any number of ways and configurations. For example, as illustrated in the side view of FIG. 4B, a plurality of gear-teeth 153 may be provided along a portion of rack 152 which are engageable with a plurality of complimentary-shaped gear-teeth 155 formed along the circumference of pinion 154. Optionally, a biasing element 190 (e.g., a Belleville washer spring, a coil spring, etc.) may be positioned between the pinion 154 and the bit body (e.g., bit blade 112) so that cutting element 170 is biased toward cutting pocket 115. Of course, any rack-and-pinion configuration as known in the art may be employed, without limitation, for utilizing the motion of actuator assembly 140 to rotate rotatable drive shaft 176. Pinion 154 and at least a portion of rack 152 may be housed within a recess 160 defined within blade 112 of drill bit 102, which may be optionally sealed and pressurized to inhibit exposure to drilling fluid or other environmental conditions.

In the exemplary embodiment illustrated in FIGS. 4A and 4B, piston rod 148 is mechanically coupled to rack 152 via a pin 157 through piston rod 148 and rack 152. Alternatively, piston rod 148 may be mechanically coupled to rack 152 via any number of other structural configurations, including, for example, a so-called "ball-and-socket" structure, a hinged structure, welding, threads, or other coupling configurations as known in the art. In addition, although piston rod 148 is illustrated in FIGS. 4A and 4B as being mechanically coupled to rack 152, piston rod 148 may be configured to rotate pinion 154 directly. For example, a plurality of gear-teeth may be provided along a portion of piston rod 148 and configured to engage the plurality of complimentary gear-teeth 155 formed along the circumference of pinion 154. In another embodiment, a portion of the substrate of a cutting element may include gear-teeth and a rack may engage such gear-teeth directly.

In the exemplary embodiment illustrated in FIGS. 4A and 4B, pinion 154 is mechanically coupled to rotatable drive shaft 176. Generally speaking, pinion 154 may be mechanically coupled to rotatable drive shaft 176 in any number of ways known to those of skill in the art, including, for example, by adhering, brazing, welding, or otherwise mechanically coupling substrate pinion 154 to drive shaft 176. Thus, movement of rack 152 and rotation of pinion 154 may convert the motion of piston 144 and piston rod 148 into rotary motion for rotating drive shaft 176 and cutting element 170. Accordingly, the exemplary embodiment illustrated in FIGS. 3, 4A, and 4B converts the energy or momentum of drilling fluids F into a force or moment (via motor 120, pump 130 and actuator assembly 140, for example) for applying torque to cutting element 170 to rotate the same relative to drill bit 102. During use, a selected magnitude of torque generated and applied to cutting element 170 may be sufficient to rotate the cutting element 170 while performing a cutting operation (e.g., a drilling operation on a subterranean formation). Further, as mentioned above, cutting element 170 may be configured to rotate through a selected angle so that a selected portion of a cutting edge may be used for cutting a subterranean formation.

Although illustrated as comprising a rack 152 operably coupled to a pinion 154, structural assembly 150 may also comprise any number of other structural configurations and/or devices capable of transforming the motion of actuator assembly 140 to rotate shaft 176. For example, structural assembly 150 may comprise a cam mechanism (such as a cam follower assembly), a clutch assembly (such as a Sprag clutch assembly), a freewheel, a ratchet, a transmission or the like. Furthermore, actuator assembly 140 may comprise any device configured to provide a suitable motion for rotating (via structural assembly) shaft 176. For example, actuator assembly 140 may comprise a solenoid or any other actuator as know in the art.

Additionally and optionally, as shown in FIG. 4A, separation element 165 (e.g., a washer or other element) may be positioned between a front surface of cutting pocket 115 and a back surface of substrate 172 of cutting element 170. Separation element 165 may comprise a washer or a layer of material, such as a metal or ceramic shim. In another embodiment, separation element 165 may be configured to reduce friction and/or wear between cutting element 170 and cutting pocket 115. In a further embodiment, separation element 165 may be sacrificial (i.e., may be softer than substrate 172 of cutting element 120 and/or cutting pocket 115). In another embodiment, a coating, such as diamond, silicon carbide, chrome, etc., may be formed (e.g., electroplated, thermally sprayed, sputtered, electrolessly deposited, or otherwise formed or deposited) upon at least one of cutting pocket 115 and substrate 172. Such a configuration may facilitate rotation of cutting element with respect to cutting pocket 115.

Figure 4C:
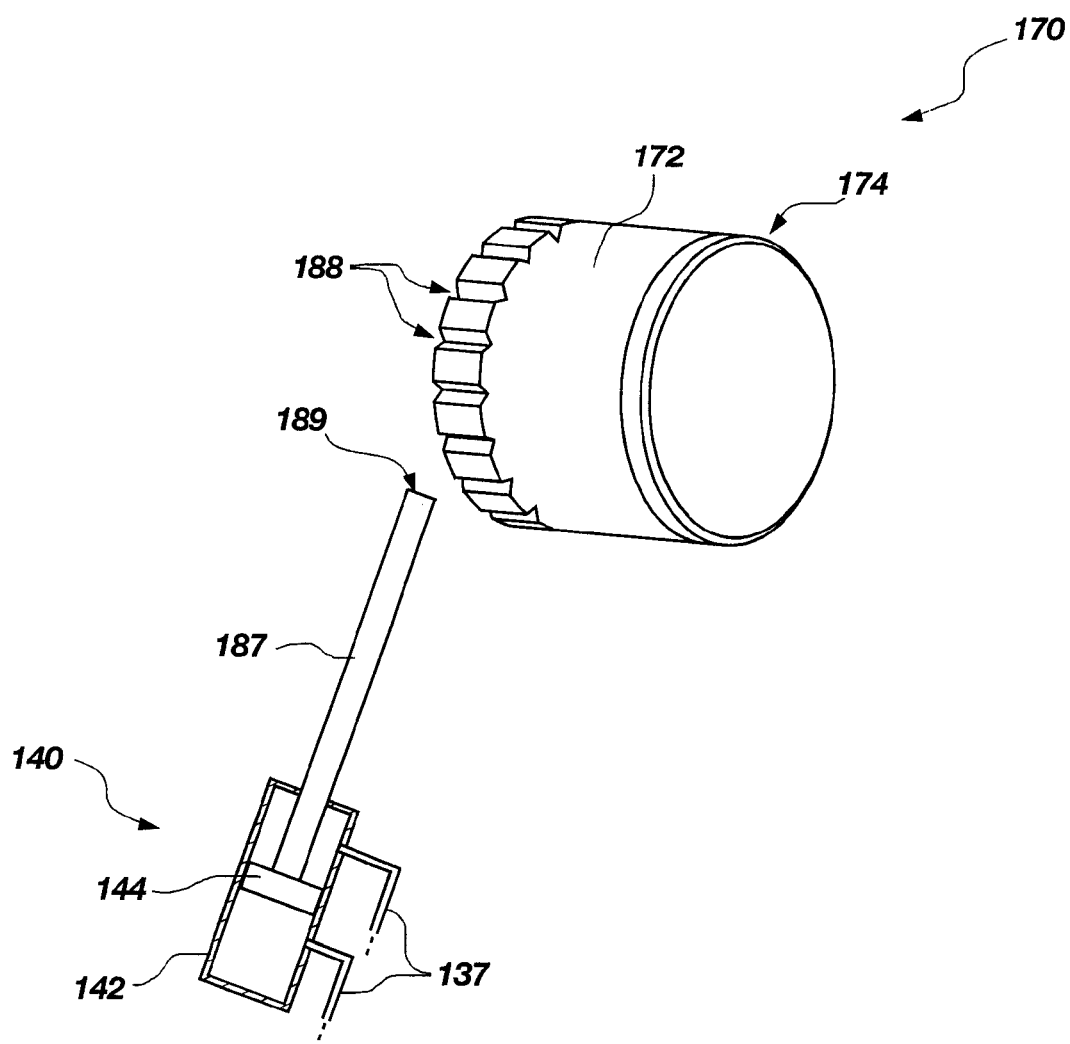
FIG. 4C shows a schematic perspective view of an actuator assembly for rotating a cutting element including a substrate comprising engaging features.
Figure 4D:
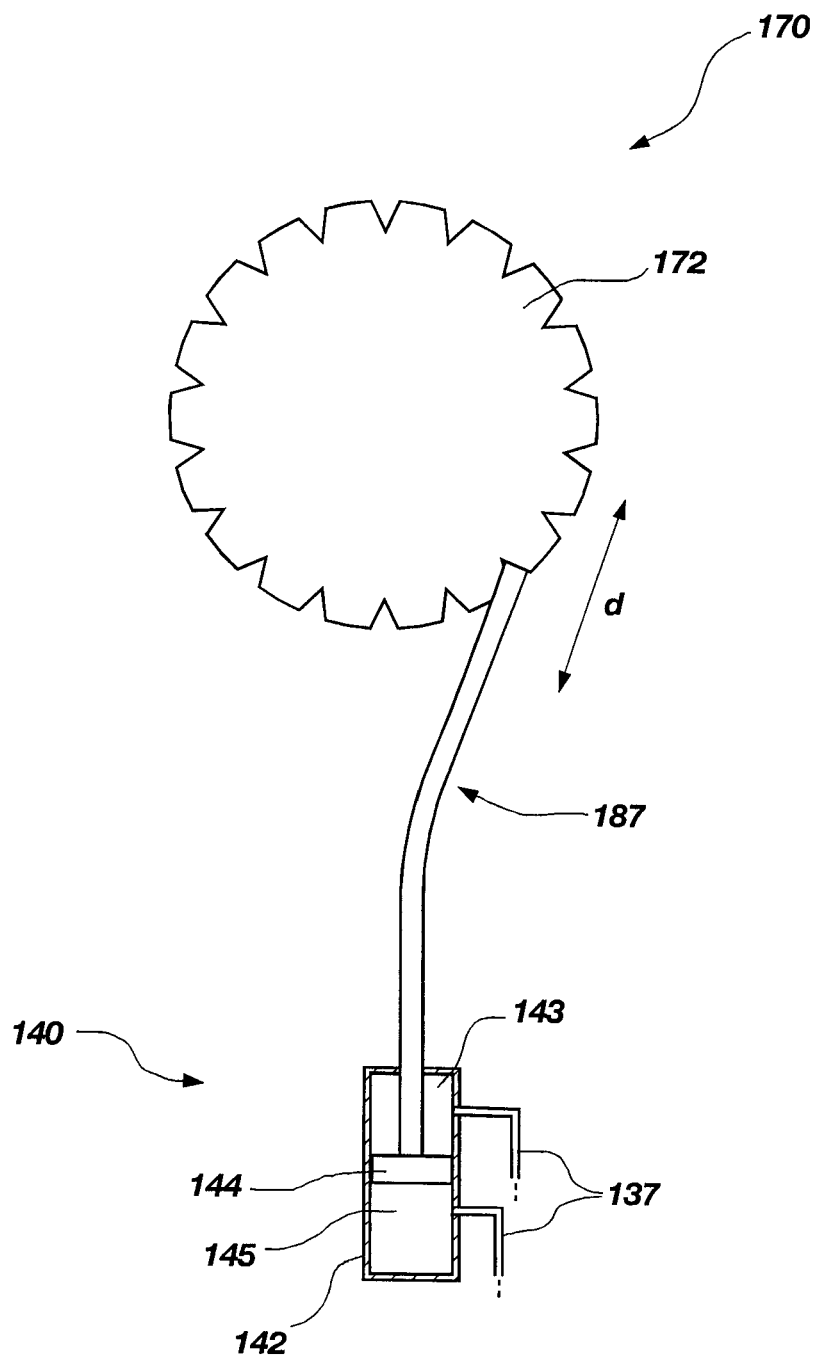
FIG. 4D shows a schematic top elevation view of the actuator assembly and cutting element shown in FIG. 4C.

In a further embodiment, a push rod or other structural member may directly engage a feature formed in the substrate of a cutting element to apply torque to the substrate for rotating the cutting element. For example, FIG. 4C shows an actuator assembly 140 and a push rod 187 configured for engaging the engaging features 188 formed into a substrate 172 of cutting element 170. More particularly, an end 189 of push rod 187 may be structured for interacting with engaging features 188 (e.g., a surface or other aspect of a recess) to rotate cutting element 170. Thus, it may be understood that actuator assembly 140 may cause push rod 187 to reciprocate (i.e., toward and away) with respect to substrate 172. More particularly, as shown in FIG. 4D, push rod 187 may reciprocate along a direction labeled "d." Also, optionally, as shown in FIG. 4D, push rod 187 may be flexible and may be biased (e.g., bent or otherwise biased) toward engaging features 188 formed in substrate 172. Such a configuration may cause the push rod 187 to lock into an appropriately positioned engagement feature 188.

Figure 5:
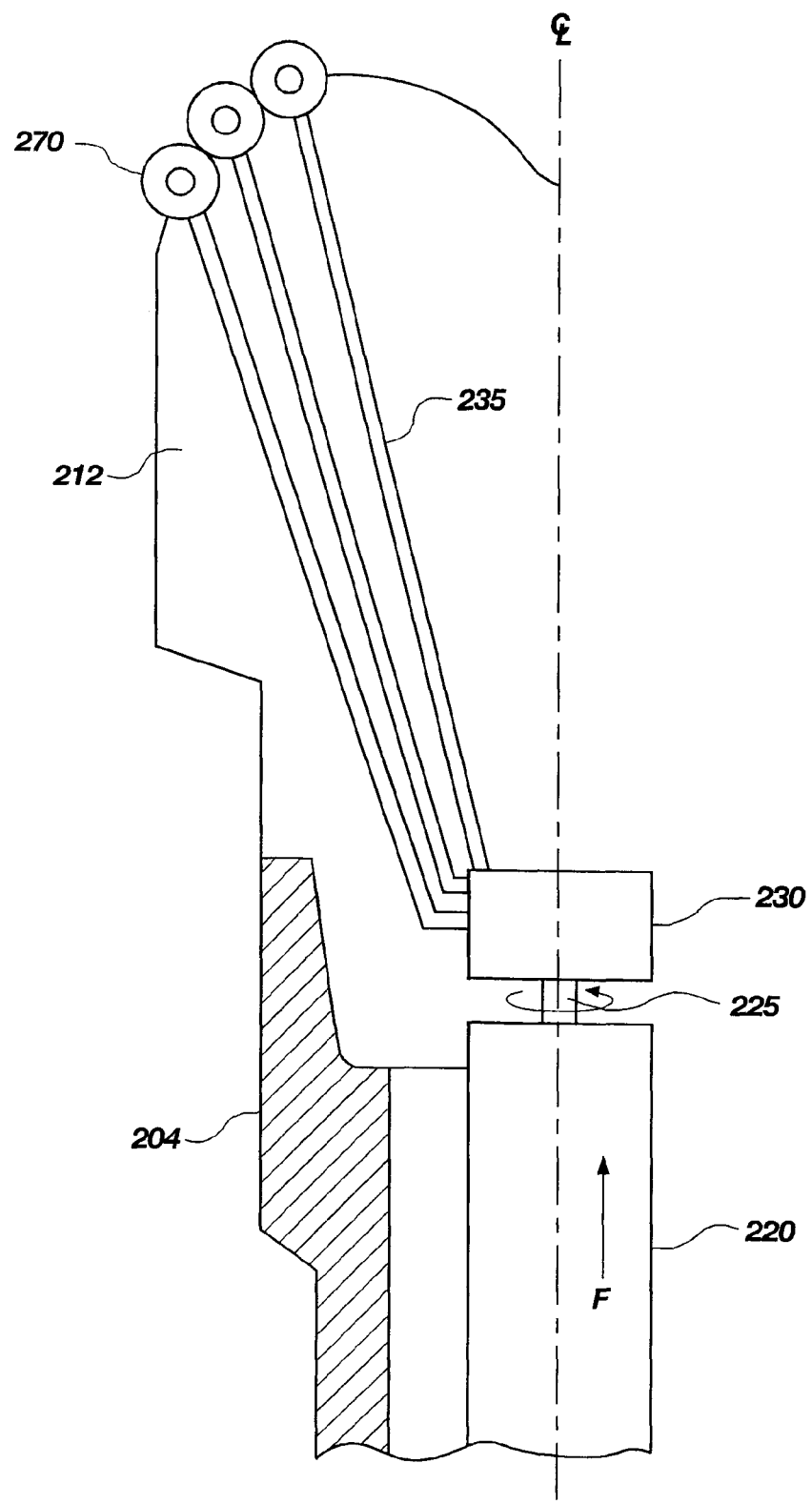
FIG. 5 shows a schematic, side cross-sectional view of an alternative embodiment of a rotary drill bit employing an actuator assembly for applying torque to a rotatable cutting element.

FIG. 5 is a schematic, side cross-sectional view of an alternative embodiment of a rotary drill bit employing an actuator assembly for applying torque to a rotatable cutting element. As illustrated in this exemplary embodiment, a drilling apparatus may comprise a motor 220 for powering a power source 230. In at least one embodiment, motor 220 may be a positive displacement motor for converting the momentum or energy of drilling fluids F flowing through a bore in a drill string into mechanical energy, as known in the art. Thus, motor 220 may convert the flow of drilling fluids F into mechanical energy to rotate output shaft 225 coupled to power source 230 (e.g., an electrical generator, a hydraulic pump, etc.). Alternatively, motor 220 may comprise any other configuration or motor capable of driving power source 230, including, for example, a Moineau-type motor, a turbine-type motor, or the like. Furthermore, the present invention contemplates an individual rotation device or mechanism may be coupled to each of cutting elements 270. For example, a miniature hydraulic motor may be mechanically coupled to each cutting element 270. Such a configuration may eliminate the need for structural assembly 150. Thus, in at least one embodiment, power source 230 is configured to convert the mechanical energy generated by motor 220 into hydraulic energy or electricity for powering a torque-generating assembly, such as actuator assembly 240 or 340 (illustrated in FIGS. 6 and 7, respectively). Generally, in one embodiment, power source 230 may comprise any form of device capable of generating electricity, as known in the art. As seen in the exemplary embodiment illustrated in FIG. 5, power source 230 may be in communication with an actuator assembly (e.g., actuator assembly 240 and/or 340, as discussed below) via one or more connections 235. Connections 235 generally represent any form of electrical conduit known to those of skill in the art, including, for example, electrical cables, wiring, or the like.

Figure 6:
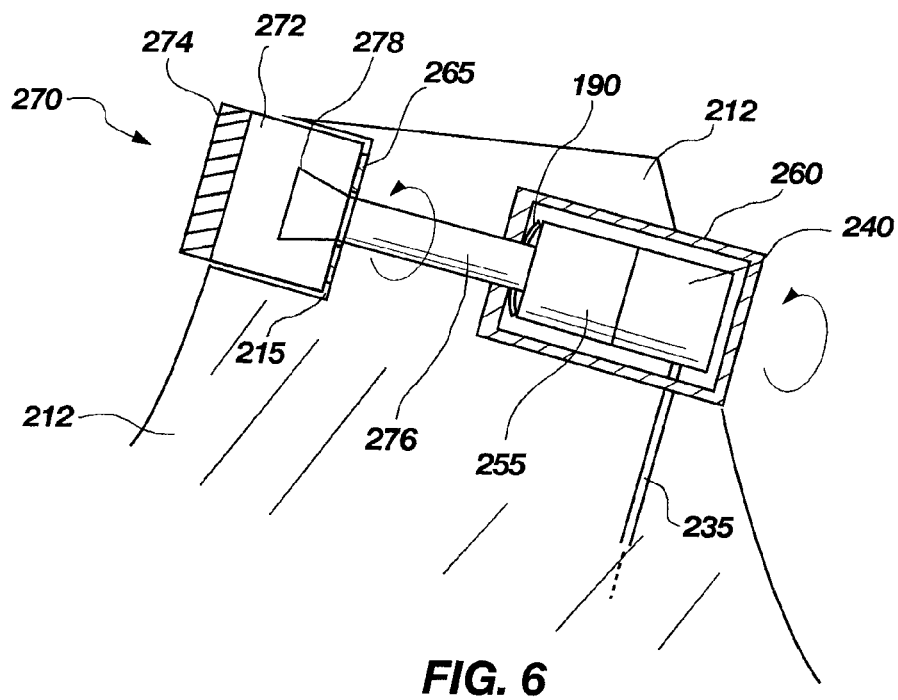
FIG. 6 shows an enlarged cross-sectional view of an additional embodiment of a motor for applying torque to a rotatable cutting element.

More particularly, FIG. 6 shows an enlarged cross-sectional view of an embodiment of an actuator assembly 240 for applying torque to a rotatable cutting element. Actuator assembly 240 generally represents a device capable of transforming electricity or hydraulic energy generated and supplied by power source 230 into torque for rotating cutting element 270. In at least one embodiment, actuator assembly 240 comprises a motor (e.g., an electric motor or a hydraulic motor) that converts the electricity or hydraulic energy generated and supplied by power source 230 into torque. For example, FIG. 6 shows an actuator assembly 240 comprising a relatively compact motor (such as, for example, an electrically-powered geared motor or stepper motor) configured to generate and apply torque to a drive shaft 276 coupled to a substrate 272 of cutting element 270. Optionally, the torque and speed of rotation of drive shaft 276 relative to the torque and speed of rotation generated by actuator assembly 240 may be controlled by a transmission 255 coupled to actuator assembly 240. Generally, transmission 255 may represent a gearbox or other device and may be desirable for converting an unsuitably high speed and low torque generated by an actuator assembly 240 (e.g., an electrically-powered motor) to a lower speed with higher torque, or vice versa.

Similar to the exemplary embodiment illustrated in FIG. 4A, actuator assembly 240 may be housed within recess 260 defined within a blade 212 of a drill bit. Also, optionally, a biasing element 190 (e.g., a Belleville washer spring, a coil spring, etc.) may be positioned between the actuator assembly 240 and the bit body (e.g., bit blade 212) so that cutting element 270 is biased toward cutting pocket 215. Recess 260 may, optionally, be sealed and pressurized to protect actuator 240 from excessive exposure to drilling fluids. As with cutting element 170, cutting element 270 generally represents any form of cutting element capable of cutting a subterranean formation, and is generally comprised of a structure and materials similar or identical to those of cutting element 170. In addition, drive shaft 276 may be mechanically coupled to substrate 272 of cutting element 270 in accordance with any of the above-described embodiments. Also, cutting element 270 may be rotatably mounted within a cutting pocket 215 defined in bit blade 212 of a drill bit. Cutting pocket 215 of bit blade 212 may be generally configured similar to cutting pocket 115 to surround at least a portion of a periphery of cutting element 270 when positioned within cutting pocket 215. In addition, as explained above, a separation element 265 (e.g., a washer element or the like) may be positioned between front surface of cutting pocket 215 and a back surface of substrate 272 of cutting element 270.

Figure 7:
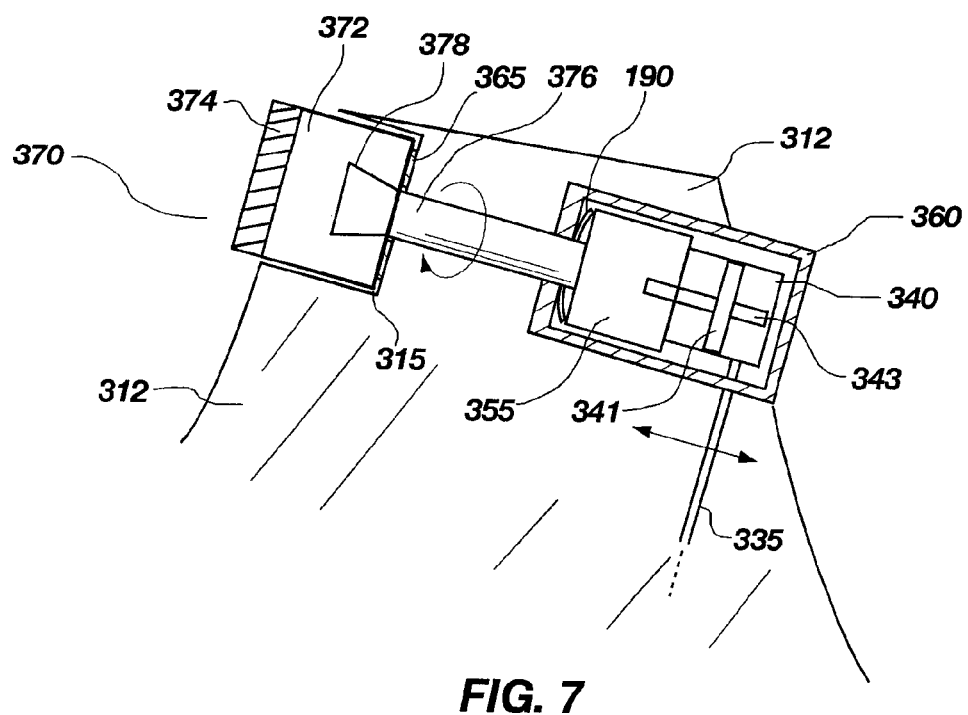
FIG. 7 shows an enlarged cross-sectional view of an additional embodiment of an actuator assembly for applying torque to a rotatable cutting element.

FIG. 7 is an enlarged cross-sectional view of an additional embodiment of an actuator assembly for rotating a cutting element. Particularly, actuator assembly 340 generally represents a device capable of transforming energy (e.g., hydraulic energy or electricity) generated and supplied by a device (e.g., a pump, a generator, or the like) into linear motion for rotating cutting elements 370. In at least one embodiment, actuator assembly 340 may be configured to move a piston rod via electricity generated and supplied by a generator (such as power source 230) via connection 335. For example, actuator assembly 340 may comprise a solenoid or any other device for moving column 341 and may be electrically powered, as known in the art. In another embodiment, actuator assembly 340 may comprise a reciprocating actuator having a column 341 coupled to a piston rod 343 configured to drive a cam assembly 355 coupled to a drive shaft 376 and may be hydraulically powered. Optionally, a biasing element 190 (e.g., a Belleville washer spring, a coil spring, etc.) may be positioned between the actuator assembly 340 and the bit body (e.g., bit blade 312) so that cutting element 370 is biased toward cutting pocket 315. Cam assembly 355 generally represents any form of cam mechanism (such as a cam indexer assembly or a cam follower assembly) capable of converting the linear motion generated by actuator assembly 340 into rotary motion for rotating drive shaft 376. Cutting element 370 generally represents any form of cutting element capable of cutting a formation, and is generally comprised of a structure and materials similar or identical to that of cutting element 170. In addition, drive shaft 376 may be mechanically coupled to a substrate 372 of cutting element 370 in accordance with any of the above-described manners of mechanically coupling drive shaft 176 to cutting element 170. Further, a separation element 365 may be positioned between the cutting pocket 315 of bit blade 312 and the cutting element 370.

Although actuator assemblies 140, 240, and 340 have been described and illustrated as including hydraulic assemblies, electric motors, and cam index assemblies, respectively, these actuator assemblies may comprise any form of assembly or device capable of generating torque for rotating a cutting element, as known in the art. For example, actuator assemblies 140, 240, and 340 may comprise pneumatic motors or pumps, gas-powered motors or pumps, induction motors or pumps, and the like. Such assemblies may include any number of devices, including, for example, fluid-driven motors, turbines, batteries, fuel cells, and the like. The mechanical motion generated by such assemblies may be either rotational, linear, or combinations thereof as desired. These mechanical forces or motions may then be transmitted to a rotatable cutting element by cam mechanisms, clutches, freewheels, ratchets, transmissions or the like.

In at least one embodiment, torque may be constantly generated and applied by a plurality of actuator assemblies 140, 240, and 340 to a plurality of drive shafts 176, 276, and 376 respectively affixed to plurality of cutting elements 170, 270, and 370. Alternatively, these actuator assemblies 140, 240, and 340 may be controlled periodically and, optionally, may generate individually and apply torque to each of the drive shafts affixed to each of a plurality of cutting elements, respectively. In other words, the above-described actuator assemblies may be used to constantly and continuously rotate a cutting element, or may be used to periodically index a cutting element, as needed. As will be understood by those of skill in the art, constant torque may be required in relatively demanding environments, while periodic indexation may suffice when in less demanding conditions, resulting in significant power conservation.

Figure 8A:
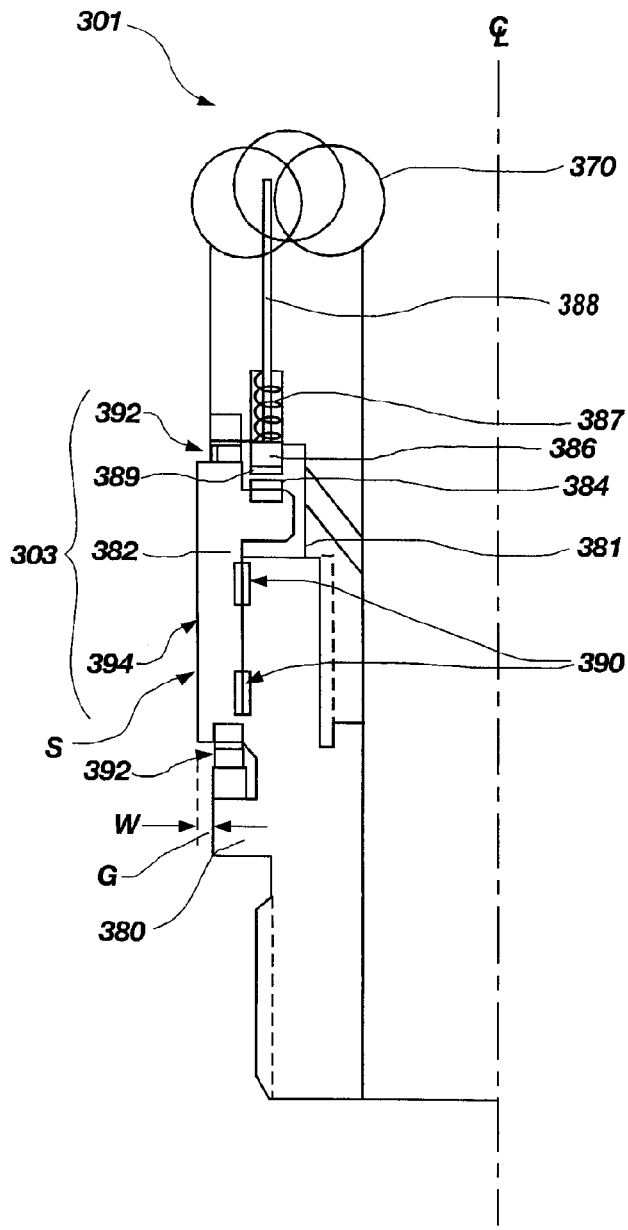
FIG. 8A shows a side cross-sectional view of an exemplary embodiment of a rotating sleeve assembly for applying torque to a cutting element.
Figure 8C:
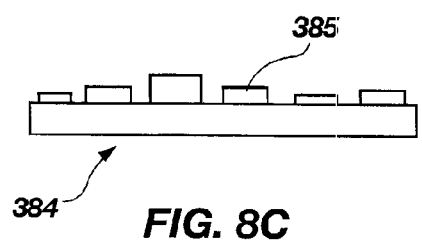
FIG. 8C shows a side view of the cam assembly illustrated in FIG. 8B.
Figure 8B:
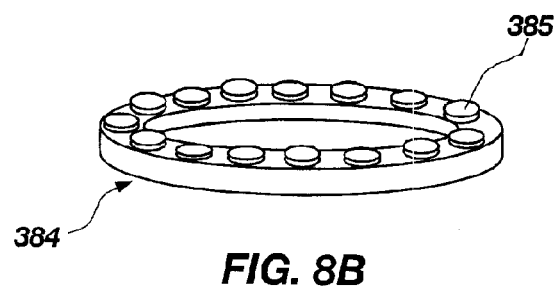
FIG. 8B shows a perspective view of a cam assembly employed by the rotating sleeve assembly illustrated in FIG. 8A.

FIG. 8A is a schematic, side cross-sectional view of an exemplary embodiment of a drill bit 301 including a sleeve assembly 303 for applying torque to at least one cutting element 370. FIG. 8B is a perspective view of a cam assembly 384 employed by the sleeve assembly 303 illustrated in FIG. 8A. FIG. 8C is a side view of cam assembly 384 illustrated in FIG. 8B. According to the embodiments illustrated in these figures, an exemplary sleeve assembly for applying torque to a cutting element may comprise a cam follower 386 positioned adjacent to a cam assembly 384, wherein the cam assembly 384 is mounted to a sleeve 382. In at least one embodiment, sleeve 382 exhibits a substantially annular or ring-like shape and may be configured to be rotatably positioned within an annular recess 381 defined generally along the outer circumference or gage portion of a drill bit body 380. Sleeve 382 may be formed of any number of materials or structures known to those of the art, including, for example, tungsten carbide or steel. According to certain embodiments, annular recess 381 defined along the outer circumference or gage portion of drill bit body 380 is formed to substantially embody the inverse of at least a portion of sleeve 382.

As seen in FIG. 8A, one or more radial bearing assemblies 390 may be provided between the inner circumferential surface of sleeve 382 and the outer circumferential surface of recess 381 in drill bit body 380. Generally, radial bearing assemblies 390 may be annularly-shaped and configured to allow sleeve 382 to rotate within recess 381 of drill bit body 380 despite radial loads experienced during subterranean drilling. Radial bearing assemblies 390 generally represent any form of bearing assembly capable of withstanding radial loads, including, for example, polycrystalline diamond bearings (e.g., PDC bearings), radial roller or ball bearings, deep-groove bearings, filling notch bearings, and the like. Similarly, one or more thrust bearing assemblies 392 may be provided between the upper and lower surfaces of sleeve 382 and the inner surfaces of recess 381. Generally, thrust bearing assemblies 392 are annularly-shaped and configured to allow sleeve 382 to rotate within recess 381 of drill bit body 380 despite the axial loads experienced during subterranean drilling. Thrust bearing assemblies 392 generally represent any form of bearing assembly capable of withstanding axial loads, including, for example, polycrystalline diamond thrust bearings, ball thrust bearings, roller thrust bearings, tapered roller bearings, and the like. Radial bearing assemblies 390 and thrust bearing assemblies 392 may be, optionally, lubricated by drilling fluids pumped through drill bit 301.

In the exemplary embodiment illustrated in FIG. 8A, cam assembly 384 is mounted on the upper surface of the inner circumference of sleeve 382. As seen in the exemplary embodiment of FIG. 8B, the body of cam assembly 384 may be formed in a substantially annular shape and may include a plurality of cam inserts 385. In at least one embodiment, each cam insert 385 is formed to have a height that differs slightly from its circumferentially adjacent inserts. For example, as seen in the side view of FIG. 8C, each insert 385 in cam assembly 384 may be formed to have a height that exceeds or differs from circumferentially adjacent inserts, resulting in an undulating cam surface. A superhard material, such as polycrystalline diamond, may be disposed on the upper surface of each insert 385 in cam assembly 384. Of course, generally, inserts 385 may each exhibit a height so that the cam surface of cam assembly 384 causes cam follower 386 to move in a desired manner.

As illustrated in FIG. 8A, cam follower 386 may be housed in drill bit 380 directly above rotating cam assembly 384. In at least one embodiment, cam follower 386 comprises a push rod 388 housed inside a recess formed in the body of drill bit 380 and attached to cam follower 386. Biasing element 387 may comprise a spring or similar structure for biasing push rod 388 in a direction toward cam assembly 384. In at least one embodiment, one end of push rod 388 is mechanically coupled to cutting element 370, while a tracing tip 389 is formed on follower 386. Thus, such a configuration may be configured to trace or follow the generally undulating upper surface of cam assembly 384 according to the configuration of inserts 385. Tracing tip 389 may be formed of any number of materials, including, for example, a superhard material such as polycrystalline diamond.

As seen in FIG. 8A, in at least one embodiment, a formation engaging portion 394 is formed along at least a portion of the outer circumferential surface of rotating sleeve 382. For example, formation engaging portion 394 may be formed to extend beyond recess 381 and the exterior gage surface "G" of drill bit 380 by a distance W. In the exemplary embodiment illustrated in FIG. 8A, formation engaging portion 394 is configured to contact at least a portion of a bore drilled in a subterranean formation. During an exemplary drilling operation, as drill bit 380 is rotated about its axis by a motor within a borehole drilled in a subterranean formation, formation engaging portion 394, which may extend beyond the outer circumferential surface of drill bit 380 by distance W, may contact at least a portion of an inner surface of the borehole. The present invention further contemplates that attributes of the surface, labeled "S," of formation engaging portion 394 may be tailored for "aggressiveness." Put another way, surface S may include gage cutting elements or structures (e.g., natural diamonds, PDC cutters, tungsten carbide elements, or other materials) that may influence that degree to which surface S engages or resists sliding contact with a subterranean formation. The resulting force from contact with the inner surfaces of the borehole may cause rotating sleeve 382, and cam assembly 384 mounted thereon, to rotate with respect to the main body of drill bit 380. As rotating sleeve 382 and cam assembly 384 rotate relative to drill bit 380, tracing tip 389 of cam follower 386 follows the generally undulating upper surface of cam assembly 384 comprised of inserts 385. Thus, push rod 388 (biased by resilient member 387 and connected to tracing tip 389) may be lowered or raised in accordance with the height of each insert 385, resulting in a generally cyclic motion. This resulting cyclic motion by push rod 388 may then be used to rotate cutting element 370 coupled thereto.

Push rod 388 may be coupled to cutting element 370 using any number of configurations or structural assemblies. For example, in at least one embodiment push rod 388 is coupled to cutting element 370 by a structural assembly (such as structural assembly 150, illustrated in FIGS. 4A-4B) comprising a rack-and-pinion assembly for converting the linear reciprocating motion of push rod 388 into rotary motion for rotating a drive shaft affixed to cutting element 370. However, as will be appreciated by those of skill in the art, push rod 388 may also be coupled to cutting element 370 using any number of other structural configurations and/or devices capable of using the linear motion of push rod 388 to rotate cutting element 370.

Thus, a torque may be generated and applied to a cutting element by utilizing the rotary motion of a rotary drill bit, without the need for additional torque-generating assemblies. As will be appreciated, drill bit 380 may comprise any number of earth-boring or drilling tools as known in the art, including without limitation, for example, core bits, roller-cone bits, fixed-cutter bits, eccentric bits, bicenter bits, reamers, reamer wings, and the like. The present invention also contemplates methods for operation of a drill bit 380 as described above. For example, during drilling with a drill bit 380, it may be advantageous to stop movement (rate-of-penetration) and rotate the drill bit 380 to cause interaction between the subterranean formation and the formation engaging portion 394 of the drill bit 380. In this way, at least one cutting element configured to rotate may be indexed (i.e., rotated). It may be appreciated that such rotation may cause so-called "bit whirl," which may cause a formation engaging portion 394 to rotate even if it is not otherwise intended to rotate or, for some other reason, does not rotate during drilling (e.g., the formation engaging portion 394, in one embodiment, may not be designed to contact the subterranean formation during drilling). Summarizing, ceasing rate-of-penetration and rotating a drill bit including a formation engaging portion 394 so that at least one cutting element rotates during such rotation of the drill bit is contemplated by the present invention.

Although actuator assemblies 140, 240 and 340 and cam follower 386 are illustrated in FIGS. 3, 6, 7, and 8A, respectively, as being coupled to each of the cutting elements disposed on a drill bit, in many situations it may prove both difficult and impractical to apply torque to each and every cutting element disposed on a drill bit. Generally, the present invention contemplates that a drill bit may include at least one cutting element that is rotatable by an application of force or torque to the cutting element. Accordingly, in another embodiment, torque may be applied to a plurality of selected cutting elements disposed on a drill bit. For example, torque may only be applied to a plurality of selected cutting elements having the highest work rate, or to those cutting elements that are otherwise highly taxed during the drilling process, as needed. In many embodiments, the cutting elements having the highest work rate are those positioned generally near the nose or generally near the shoulder of a drill bit. For example, on an 8.5 inch diameter drill bit having 35 cutters formed on 4-5 blades, it may only be necessary to apply torque to 12-15 of the cutting elements disposed on the drill bit. Although torque is only applied to a portion of the cutting elements disposed on such an exemplary drill bit, substantial performance gains realized by applying torque to each cutting element disposed on a drill bit (as described below in connection with FIG. 8) are also realized when torque is only applied to those cutting elements having the highest work rate. This selective application of torque to the various cutting elements disposed on a drill bit may thus realize various gains in energy efficiency and simplicity without significant losses in cutting element performance.

It should also be appreciated that any of the above-described embodiments may be implemented with respect to a cutting element used for a machining or other cutting operation. For example, a cutting element may be rotated in a machining operation by coupling the cutting element to an output shaft of an electric motor and energizing the motor while machining a material with the cutting element. In addition, it may be appreciated that such a configuration may allow for larger torque-generation apparatuses, since available space may be more ample that within a rotary drill bit.

Figure 9:
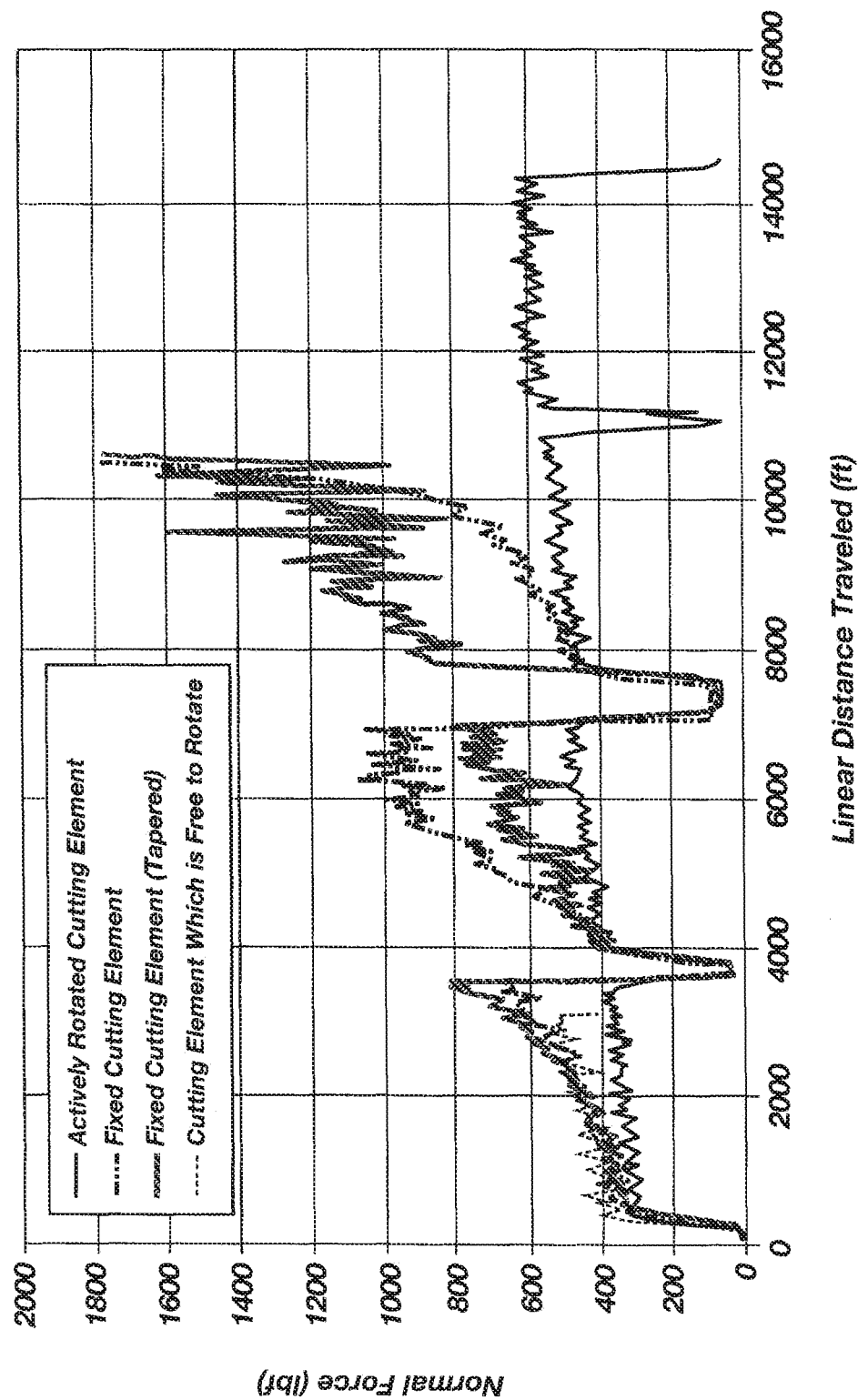
FIG. 9 shows a chart illustrating test data generated by conventional cutting elements and a cutting element according to the present invention.

FIG. 9 is a chart illustrating the advantages of applying torque to a cutting element. More specifically, FIG. 9 illustrates the vertical or weight-on-bit force versus the linear distance traveled for a cutting element cutting Sierra White granite, as obtained using a cutting element evaluation machine configured to force a cutting element through a selected material at a selected depth-of-cut. Further, the data shown in FIG. 9 was produced by forcing a PDC cutter through Sierra White granite while rotating the PDC cutter. More specifically, an electric motor was coupled to a shaft, which was attached to the substrate of a PDC cutter. The electric motor was energized and rotated at a speed of about 5 revolutions per minute while the cutting element was forced (at a selected depth of cut, for example, 0.110 inches) through the Sierra White granite. As evidenced by FIG. 9, cutting elements that are brazed with a cutting pocket (either chamfered or non-chamfered) and cutting elements that are merely free to rotate due to contact with the material being cut exhibit a much shorter lifespan and are not able to function as efficiently as cutting elements that are rotated by application of a torque to the cutting element during cutting (such as cutting elements rotated by a torque-generating member). For example, as seen in FIG. 9, the brazed chamfered or non-chamfered cutting elements that are free to rotate during cutting were destroyed after only having removed approximately 10,000 ft of Sierra White granite. However, a cutting element to which a torque of sufficient magnitude to rotate the cutting element during cutting continued to operate well after having removed over 14,000 ft of Sierra White granite. This so-called "actively-rotated" cutting element thus lasted much longer and exhibited much lower vertical force values than brazed cutting elements or cutting elements that were merely free to rotate.

Accordingly, applying torque to at least one cutting element coupled to a drill bit or at least one cutting element coupled to equipment for machining (e.g., a lathe, a so-called planer, or other machinery for cutting materials) may significantly prolong the life of such at least one cutting element. Advantageously, this configuration may also keep the engagement point between the subterranean formation being drilled and the cutting element much cooler since new portions of the cutting element's circumference are continually rotating into the cutting edge. Such a configuration may also advantageously keep the cutting edge of the cutting element much sharper than conventional cutting elements, resulting in increased cutting efficiency. For example, a drill bit may exhibit a higher rate of penetration for a given weight-on-bit, as compared to a conventional drill bit. Potentially, such a configuration may enable the drilling of various subterranean formations that have not been previously drillable by drill bits employing conventional cutting elements.

Figure 10:
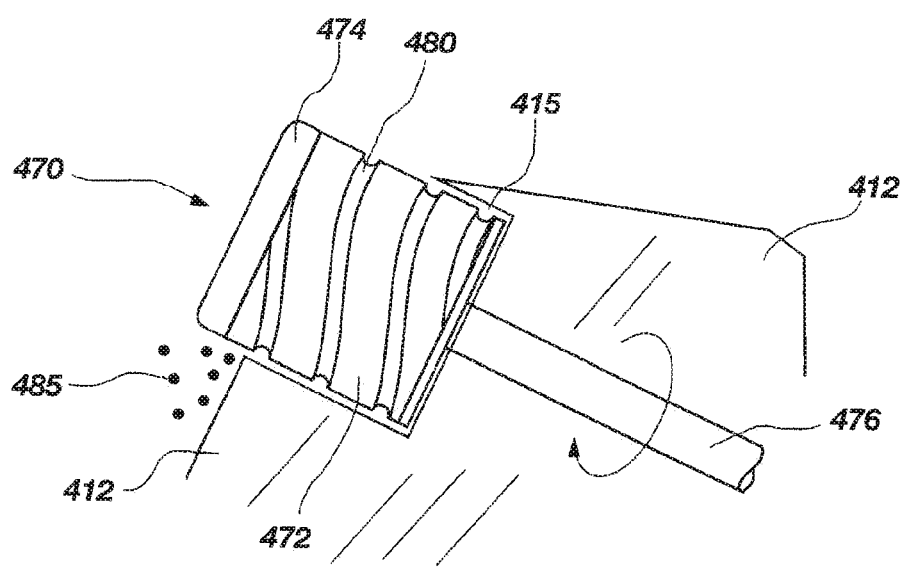
FIG. 10 shows an enlarged view of a rotatable cutting element having an impelling feature.

FIG. 10 is an enlarged view of a rotatable cutting element having an exemplary impelling feature for impelling debris generated by the cutting element. In at least one embodiment, cutting element 470 comprises a table 474 formed on a substrate 472. As with cutting element 170, cutting element 470 generally represents any form of cutting element capable of cutting a formation, and is generally comprised of a structure and materials similar or identical to that of cutting element 170. A drive shaft 476 may be mechanically coupled to substrate 472 of cutting element 470 in accordance with any of the above-described manners of mechanically coupling drive shaft 176 to cutting element 170. In general, drive shaft 476 affixed to substrate 472 of cutting element 470 is configured so as to be rotated by a torque-generating member. For example, drive shaft 476 affixed to substrate 472 of cutting element 470 may be attached to any of the actuator assemblies or cam assemblies previously described. As with cutting element 170, cutting element 470 may optionally be rotatably mounted within a cutting pocket 415 defined in bit blade 412 of a drill bit. Cutting pocket 415 of bit blade 412 may be configured similar to cutting pocket 115, as described above.

According to the exemplary embodiment illustrated in FIG. 10, at least one impelling feature 480 comprises at least one groove formed into at least a portion of an exterior surface of substrate 472. In another embodiment, impelling feature 480 may comprise at least one protrusion formed upon at least a portion of the exterior surface of substrate 472. Impelling feature 480 may be formed in a substantially helical shape. Impelling feature 480 may be formed in the exterior surface of substrate 472 in accordance with any number of processes or techniques. For example, a grinding device may be used to form a groove into at least a portion of an exterior surface of substrate 472 formed of a material such as tungsten carbide. In another example, hard-facing may be applied to at least a portion of an exterior surface of the substrate 472 to form a protrusion. Alternatively, a mold embodying the inverse of the topographical features (such as a helical groove or protrusion) of a desired substrate may be prepared. As will be appreciated by those of skill in the art, impelling feature 480 may be formed to have any number of sizes, widths, and shapes.

As cutting element 470 is rotated by a torque-generating member while drilling a subterranean formation, debris 485 generated by this drilling operation may be channeled or impelled by impelling feature 480 away from and out of cutting pocket 415. Specifically, impelling feature 480 formed along the exterior surface of substrate 472 of cutting element 470 may clear drilling debris 485 from cutting pocket 415 (e.g., similar to an auger). By clearing debris 485 from cutting pocket 415, impelling feature 480 may allow cutting element 470 to freely rotate within cutting pocket 415. Such uninhibited rotation may allow cutting element 470 to maintain a substantially constant rotation speed and torque within cutting pocket 415, resulting in an efficient cutting of the subterranean formation being drilled.

Figure 11A:
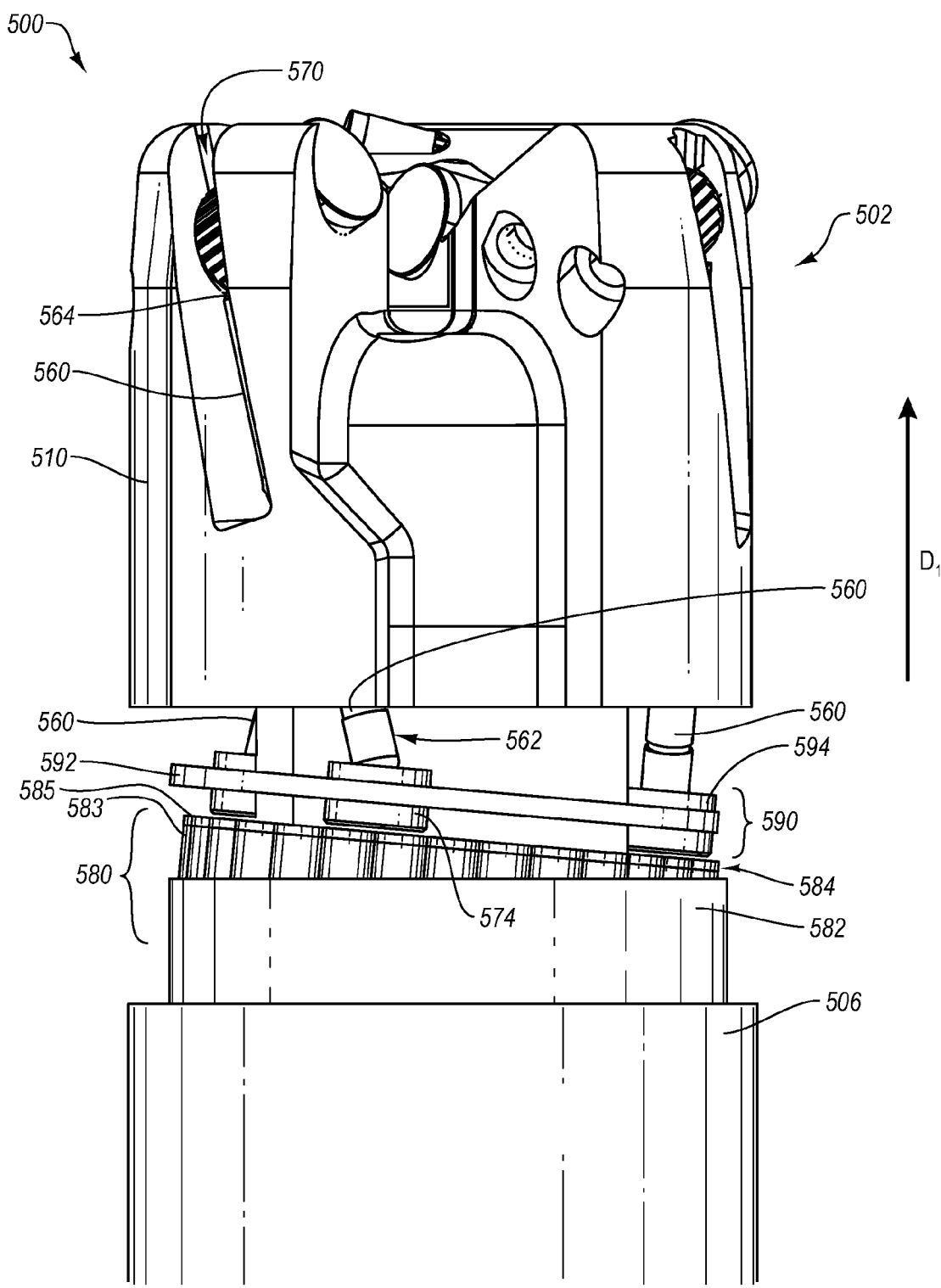
FIG. 11A is a perspective side view of an exemplary drilling system according to an additional embodiment.
Figure 11B:
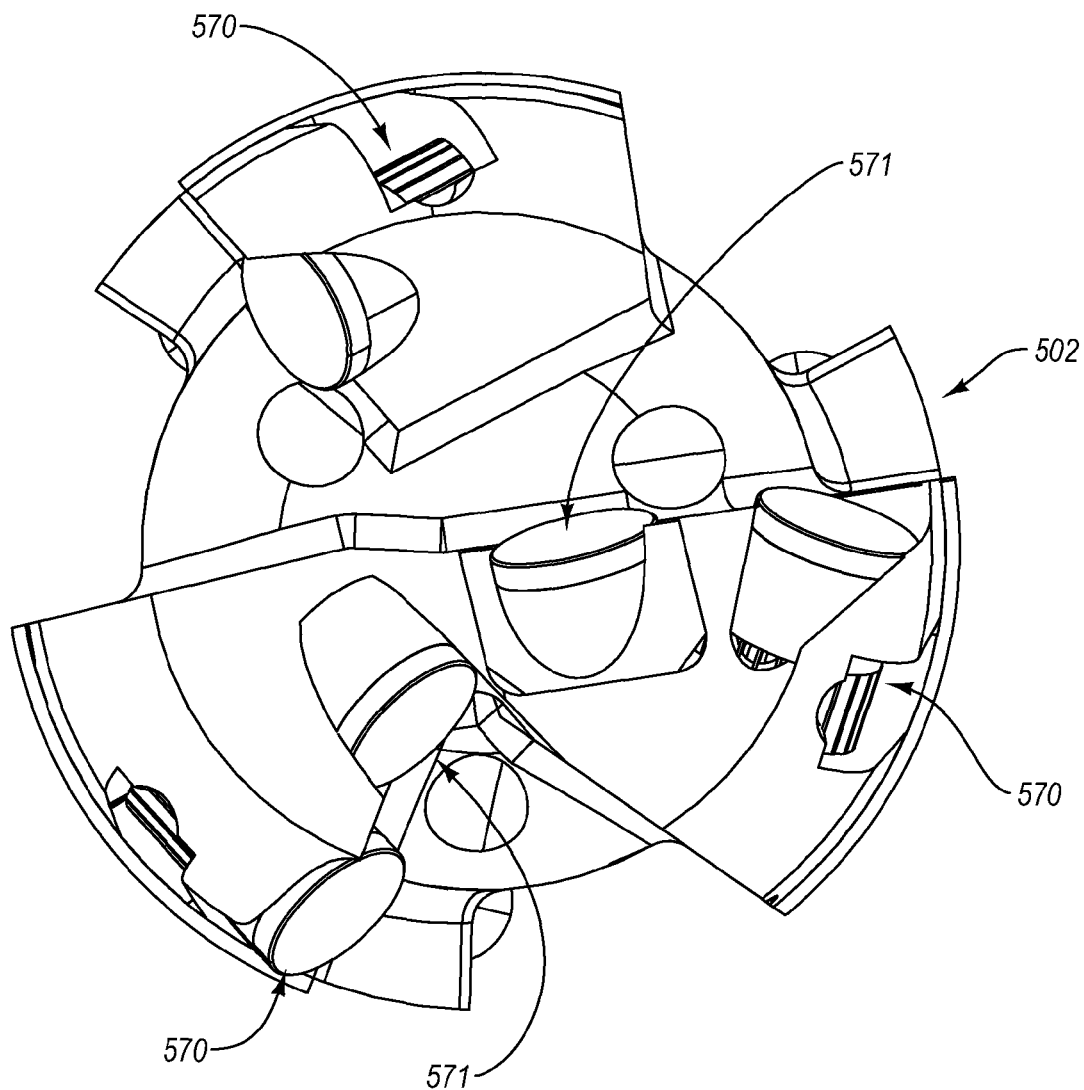
FIG. 11B is a top view of the exemplary drilling system illustrated in FIG. 11A.

FIGS. 11A and 11B are side and top views, respectively, of an exemplary drilling system according to at least one additional embodiment. As seen in these figures, exemplary drilling system 500 may comprise a drill bit 502 threaded onto, coupled or attached to a drill string 506. Drill bit 502 may represent any type of earth-boring or drilling tool; including, for example, core bits, roller-cone bits, fixed-cutter bits, eccentric bits, bicenter bits, reamers, reamer wings, and the like. Drill bit 502 may also be formed in any number of ways and of any type of material or combination or materials. For example, drill bit 502 may be machined from steel or may be manufactured by infiltrating a binder into a tungsten carbide particulate, as described above.

Figure 12A:
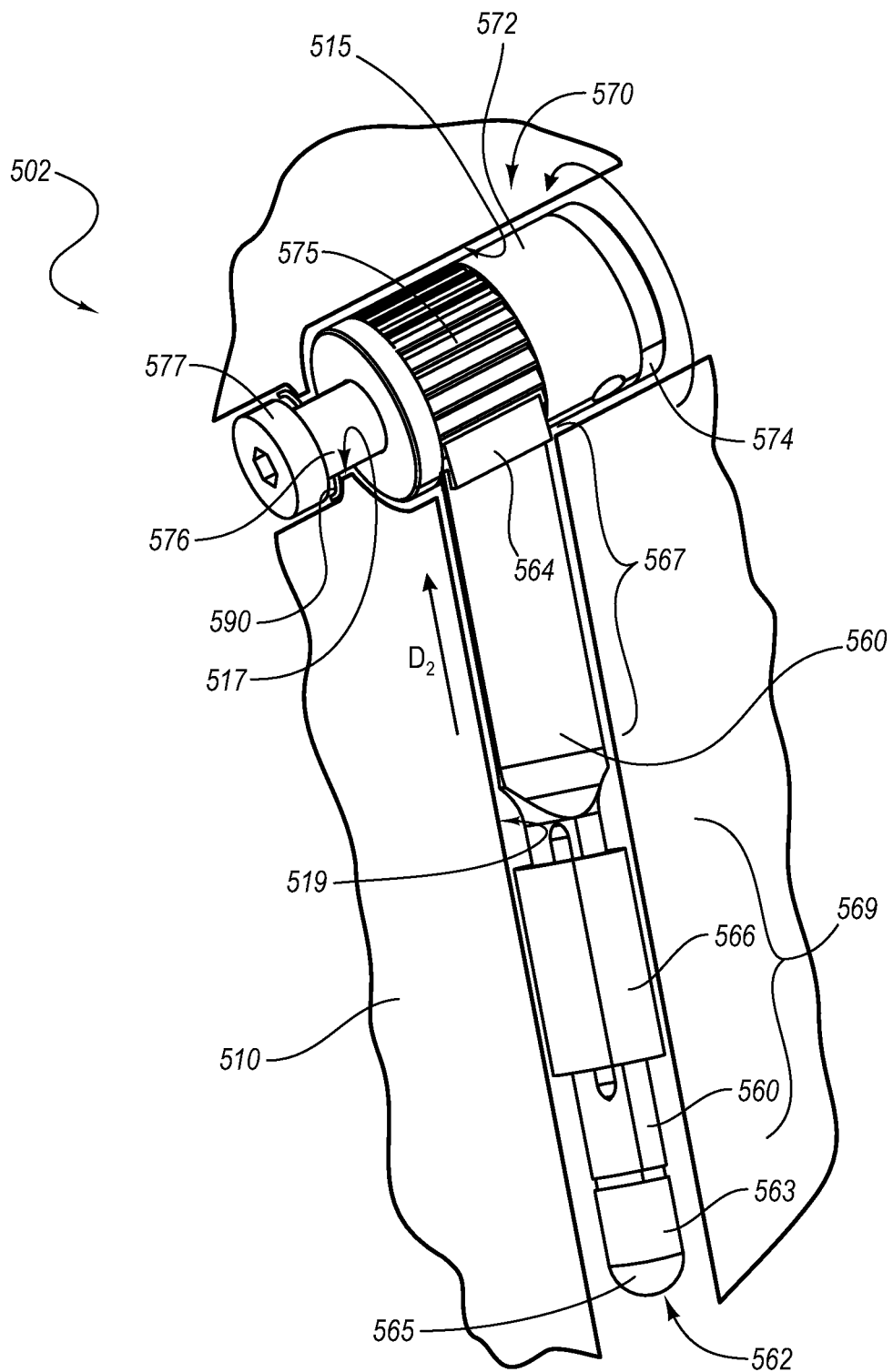
FIG. 12A is a perspective side view of an exemplary cutting element and torque-applying structure according to an additional embodiment.

In at least one embodiment, one or more rotatable cutting elements 570 and/or one or more fixed (i.e., stationary) cutting elements 571 may be mounted to the face or blades of bit body 510 of drill bit 502. Generally speaking, cutting elements 570 and 571 may comprise any cutting element capable of cutting a subterranean formation; including, for example, PDC or other superabrasive cutters. Cutting elements 570 and 571 may also be formed in any number of configurations and of any material or combination of materials. For example, in certain embodiments (and as illustrated in FIG. 12A), cutting element 570 may comprise a superabrasive layer or table 574 bonded to or formed upon a substrate 572. As known in the art, a "superabrasive material," as used herein, may refer to a material exhibiting a hardness exceeding a hardness of tungsten carbide. Optionally, and as with all previous embodiments (namely; cutting elements 170, 270, and 370), cutting elements 570 may comprise a unitary or integrally formed structure comprising, for example, diamond, silicon carbide, boron nitride, or a combination of the foregoing.

FIG. 12A shows a partial, enlarged view of cutting element 570 within drill bit 502 and depicts at least one embodiment of a mechanism for rotating cutting element 570. As with previous embodiments, table 574 in FIG. 12A may be formed of any material or combination of materials used for cutting formations; including, for example, a superhard or superabrasive material such as polycrystalline diamond. Similarly, substrate 572 may comprise any material or combination of materials capable of adequately supporting a superabrasive material during drilling of a subterranean formation; including, for example, cemented tungsten carbide. For example, cutting element 570 may comprise a table 574 comprising polycrystalline diamond bonded to a substrate 572 comprising cobalt-cemented tungsten carbide. In addition, optionally, as explained above, after formation of table 574, a catalyst material (e.g., cobalt, nickel, etc.) may be at least partially removed (e.g., by acid-leaching) from table 574.

Cutting element 570 may be rotatably mounted to bit body 510 of drill bit 502 in any number of ways and configurations. For example, cutting element 570 may be rotatably mounted to drill bit 502 by adhering, brazing, threadedly affixing, welding, or securing cutting element 570 to a first end of a coupling structure 576. Coupling structure 576 generally represents any structure capable of coupling cutting element 570 to the bit body 510 (e.g., the face or blades of body 510) of drill bit 502. In at least one embodiment, coupling structure 576 may comprise a second end 577 that is larger than an aperture 517 defined in drill bit 502 to effectively retain cutting element 570 within a cutting pocket 515 defined in bit body 510 of drill bit 502. Cutting pocket 515 may comprise a recessed space or aperture open to an outside portion of bit 502. A biasing element 590 (e.g., a Belleville washer spring, a coil spring, etc.) may also be positioned between the second end 577 of coupling structure 576 and the bit body 510 of bit 502 to bias cutting element 570 toward cutting pocket 515. Optionally, cutting element 570 may be rotatably mounted to drill bit 502 in a manner similar to that disclosed in U.S. Pat. No. 4,553,615 to Grainger and/or U.S. patent application Ser. No. 11/148,806 to Cooley et al., the entirety of the disclosure of each of which is hereby incorporated by this reference.

In certain embodiments, a separation element (such as separation element 165 in FIG. 4A) may be positioned between cutting pocket 515 and cutting element 570. This separation element may be configured to reduce friction and/or wear between cutting element 570 and cutting pocket 515. In one embodiment, this separation element may be sacrificial (i.e., may be softer than cutting element 570 and/or cutting pocket 515). Separation element 165 may comprise a washer or a layer of material, such as a metal, polymer, or ceramic shim. In another embodiment, a coating, such as diamond, silicon carbide, tungsten carbide, chrome, etc., may be formed (e.g., electroplated, thermally sprayed, sputtered, electrolessly deposited, or formed or deposited) upon at least one of cutting pocket 515 and cutting element 570. In addition, at least one of cutting pocket 515 and cutting element 570 may be coated in the manner detailed in U.S. Provisional Application No. 60/850,969, the entirety of the disclosure of which is hereby incorporated by this reference. Such a configuration may facilitate rotation of cutting element 570 with respect to cutting pocket 515.

As with previous embodiments, cutting element 570 may rotate in response to torque applied to cutting element 570 by a torque-generating assembly. In at least one embodiment, cutting element 570 may rotate within an angle of rotation of less than 360 degrees, or in other words, cutting element 570 may rotate less then one full turn in response to torque from a torque-generating assembly. In certain embodiments, this torque-generating assembly may comprise a cam assembly 580 coupled to drill string 506 (which may comprise a motor), a cam follower assembly 590 in contact with or coupled to cam assembly 580, and a torque-applying structure 560 configured to transmit force from cam assembly 580 to generate torque on cutting element 570, as illustrated in FIG. 11A.

Cam assembly 580, which may be formed in any shape or size and of any material or combination of materials, generally represents any type or form of cam mechanism or structure. For example, as illustrated in FIGS. 13A-13D, cam assembly 580 may comprise a substantially annular-shaped cam body 582 having a cam surface 581. Cam surface 581 of cam body 582 may be formed in any shape or size. For example, cam surface 581 may be a planar surface that is angled, tapered, or inclined with respect to drill string 506. In certain embodiments, cam surface 581 may be formed of a single, unitary structure or material. In an additional embodiment, cam surface 581 may comprise the collective surfaces of a plurality of cam inserts 584 affixed to cam body 582, as illustrated in FIGS. 13A-13D.

Cam inserts 584 may be formed in any shape or size and of any material or combination of materials. For example, as illustrated in FIG. 13B, cam inserts 584 may each comprise a superabrasive layer or table 585 bonded to or formed upon a substrate 583. In an additional embodiment, cam inserts 584 may each comprise a unitary or integrally formed superabrasive structure comprising, for example, diamond, boron nitride, silicon carbide, or a combination of the foregoing.

As with previous embodiments, table 585 in FIG. 13B may be formed of any material or combination of materials; including, for example, a superhard or superabrasive material such as polycrystalline diamond, silicon carbide, boron nitride, diamond, or any superabrasive material. Similarly, substrate 583 may comprise any material or combination of materials capable of adequately supporting a superabrasive material; including, for example, cemented tungsten carbide. For example, cam insert 584 may comprise a table 585 comprising polycrystalline diamond bonded to a substrate 583 comprising cobalt-cemented tungsten carbide. In addition, as explained above, after formation of table 585, a catalyst material (e.g., cobalt, nickel, etc.) may be at least partially removed (e.g., by acid-leaching) from table 583.

Figure 13A:
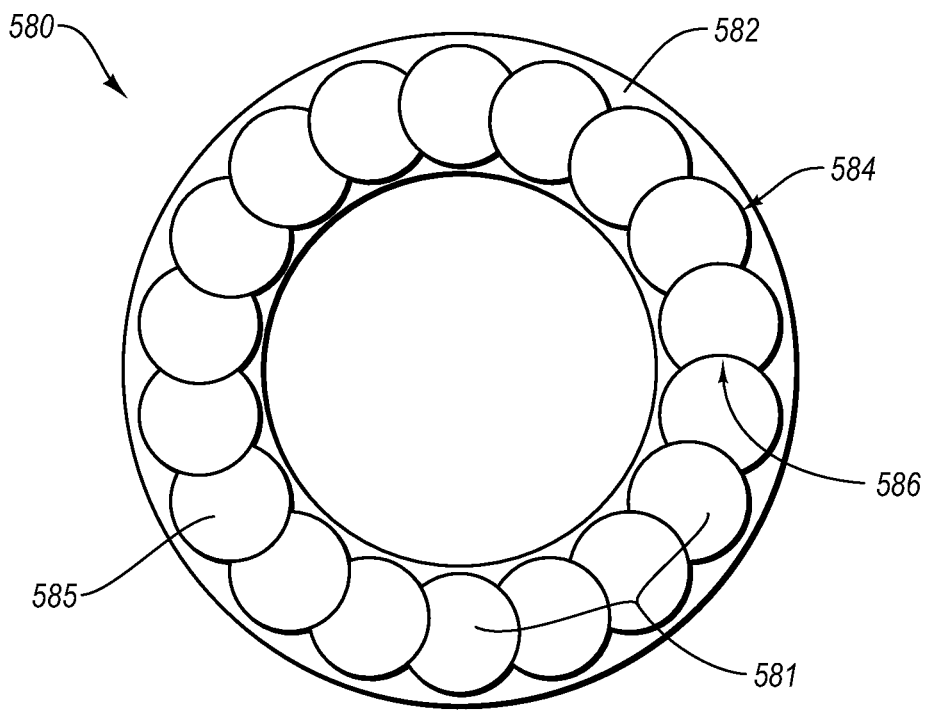
FIG. 13A is a top view of an exemplary cam assembly according to at least one embodiment.
Figure 13B:
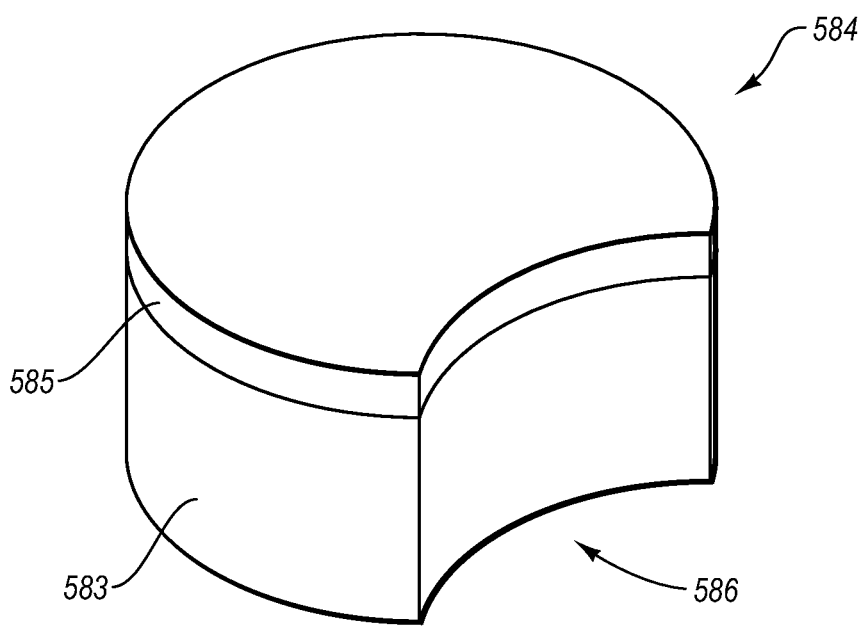
FIG. 13B is a perspective view of an exemplary cam insert according to at least one embodiment.

As seen in FIGS. 13A-13D, each cam insert 584 may be structured and positioned proximate to an adjacent cam insert 584 to form cam surface 581. In certain embodiments, each cam insert 584 may abut and/or partially surround a circumferentially adjacent cam insert 584. For example, as illustrated in FIG. 13B, a recess 586 may be defined along a portion of the circumference of each cam insert 584. As illustrated in FIG. 13A, this recess 586 may be sized to receive at least a portion of an adjacent cam insert 584 to substantially reduce any gaps between adjacent cam inserts 584, which may result in cam surface 581 being substantially continuous and smooth.

Figure 13C:
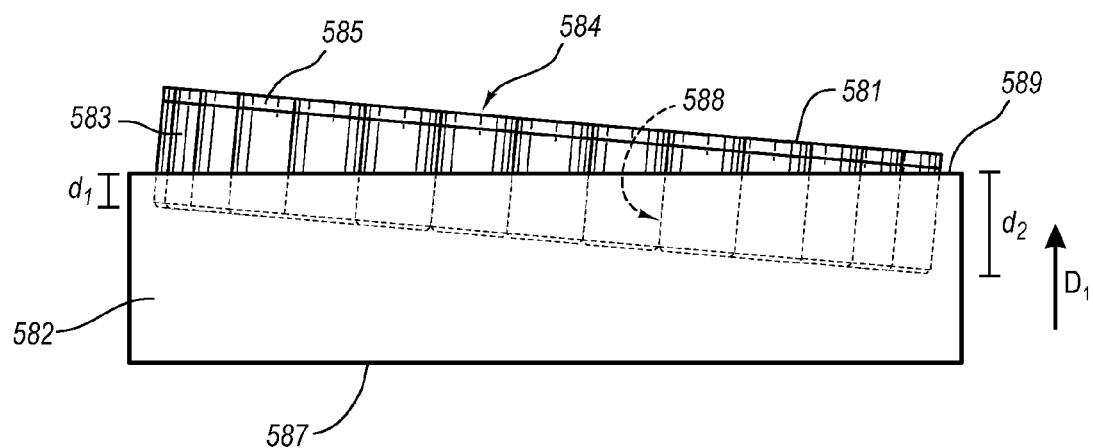
FIG. 13C is a side view of the exemplary cam assembly illustrated in FIG. 13A.
Figure 13D:
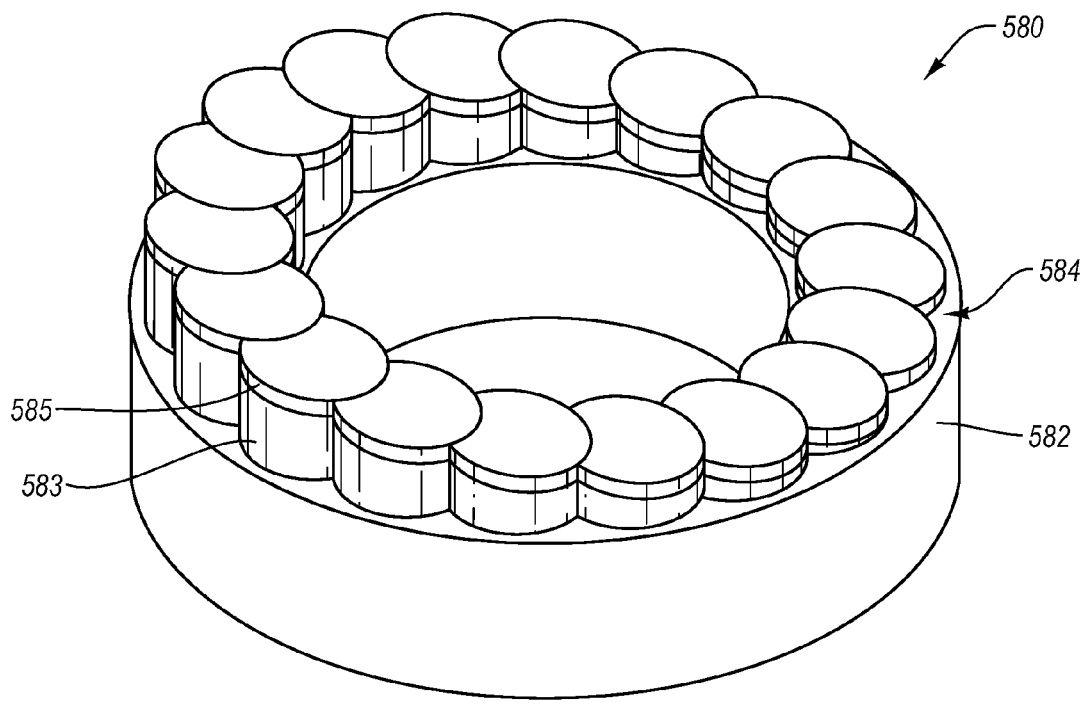
FIG. 13D is a perspective view of the exemplary cam assembly illustrated in FIG. 13A.

In at least one embodiment, each cam insert 584 may be formed to have a height that differs slightly from its circumferentially adjacent inserts, resulting in a generally planar or undulating cam surface (such as the undulating cam surface illustrated in FIG. 8C). In an additional embodiment, each cam insert 584 of cam assembly 580 may be substantially the same size and shape. For example, as illustrated in FIG. 13C, a plurality of substantially identical cam inserts 584 having substantially identical heights may be affixed to a cam body 582 comprising a substantially planar bottom surface 587 and a substantially planar top surface 589. In this exemplary embodiment, each cam insert 584 may be positioned and affixed within an insert pocket 588 defined in cam body 582.

Insert pockets 588 may be defined in any shape and size and to any desired depth. In at least one embodiment, the depth of each insert pocket 588 defined in the top surface 589 of cam body 582 may vary. For example, as illustrated in FIG. 13C, the depth $d_1$ of a first insert pocket 588 may be substantially less than the depth $d_2$ of a second insert pocket 588. In an additional embodiment, the depth of each insert pocket 588 defined in the top surface 589 of cam body 582 may be substantially identical.

Figure 14A:
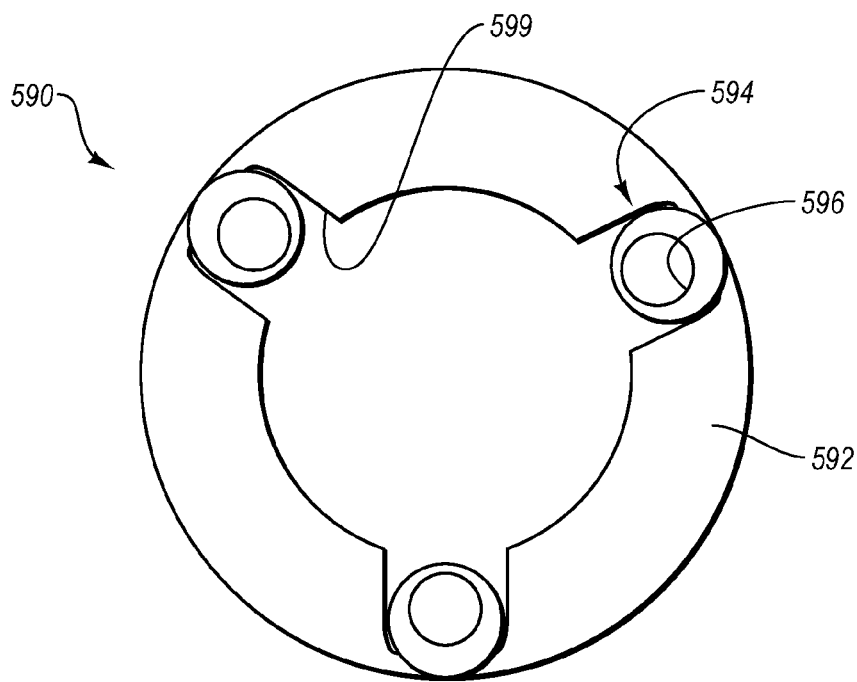
FIG. 14A is a top view of an exemplary cam follower assembly according to at least one embodiment.
Figure 14B:
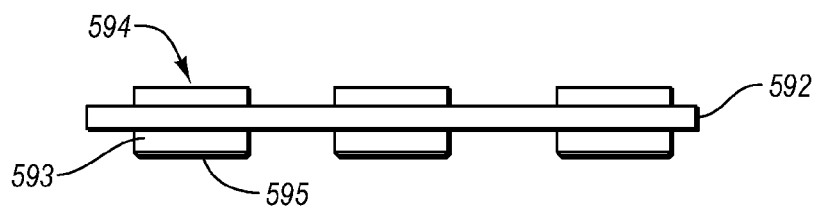
FIG. 14B is a side view of the exemplary cam follower assembly illustrated in FIG. 14A.
Figure 14C:
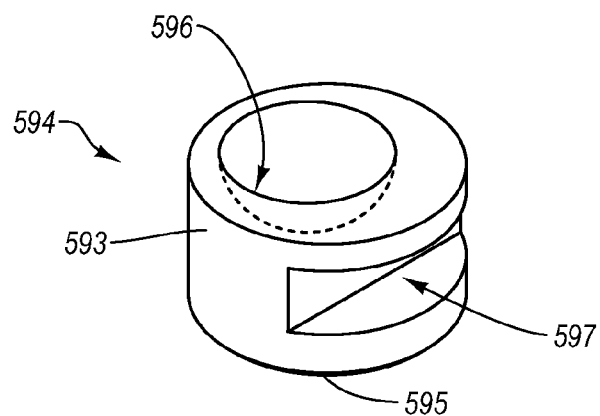
FIG. 14C is a perspective view of an exemplary cam follower element according to at least one embodiment.

FIGS. 14A-14C are top, side, and perspective views, respectively, of an exemplary cam follower assembly 590 according to at least one embodiment. Cam follower assembly 590 generally represents any type or form of structure or assembly for contacting, tracing, or following the cam surface 581 of cam assembly 580. Cam follower assembly 590 may be formed in any shape or size and of any material or combination of materials. For example, as illustrated in FIGS. 14A-14C, cam follower assembly 590 may comprise a plurality of cam follower elements 594, each of which may exhibit a selected shape and size and may comprise any selected material or materials. For example, in at least one embodiment, each cam follower element 594 may comprise a table 595 of superhard or superabrasive material (such as polycrystalline diamond, boron nitride, silicon carbide, etc.) bonded to a substrate 593 (comprising, for example, cemented tungsten carbide). Optionally, cam follower elements 594 may comprise a unitary or integrally formed structure comprising, for example, diamond, silicon carbide, boron nitride, or a combination of the foregoing.

In at least one embodiment, each of the cam follower elements 594 in cam follower assembly 590 may be connected or attached to one another by a connecting structure 592. Connecting structure 592 generally represents any type or form of structure or assembly for connecting or attaching each cam follower element 594 in cam follower assembly 590. Connecting structure 592 may be formed in any shape or size and of any material or combination of materials; including, for example, metal (e.g., tungsten carbide, steel, etc.). Optionally, as shown in FIGS. 14A and 14B, connecting structure 592 may generally resemble a plate or ring. In at least one embodiment, each cam follower element 594 may be adhered, brazed, welded, press-fit, or affixed to connecting structure 592. In an additional embodiment, as illustrated in FIGS. 14A and 14C, each cam follower element 594 may be disposed or captured within a recess 599 defined in connecting structure 592. In certain embodiments, recess 599 may be larger than cam element 594 to allow cam follower element 594 to at least partially move or shift within recess 599. As illustrated in FIGS. 14A and 14C, a portion of connecting structure 592 also may be disposed within a recess 597 defined within each cam follower element 594.

In certain embodiments, each cam follower element 594 may be connected, attached, affixed, in contact with, or coupled to a torque-applying structure. For example, as illustrated in FIGS. 14A and 14C, a recess 596 defined in the top surface of each cam follower element 594 may be structured or defined so as to receive or couple to a portion of a torque-applying assembly. Recess 596 may be formed in any shape or size. For example, as seen in FIGS. 14A, 14C, 15A, and 15B, recess 596 may be generally hemispherical in shape or curved, rounded, radiused, or concave.

Figure 12B:
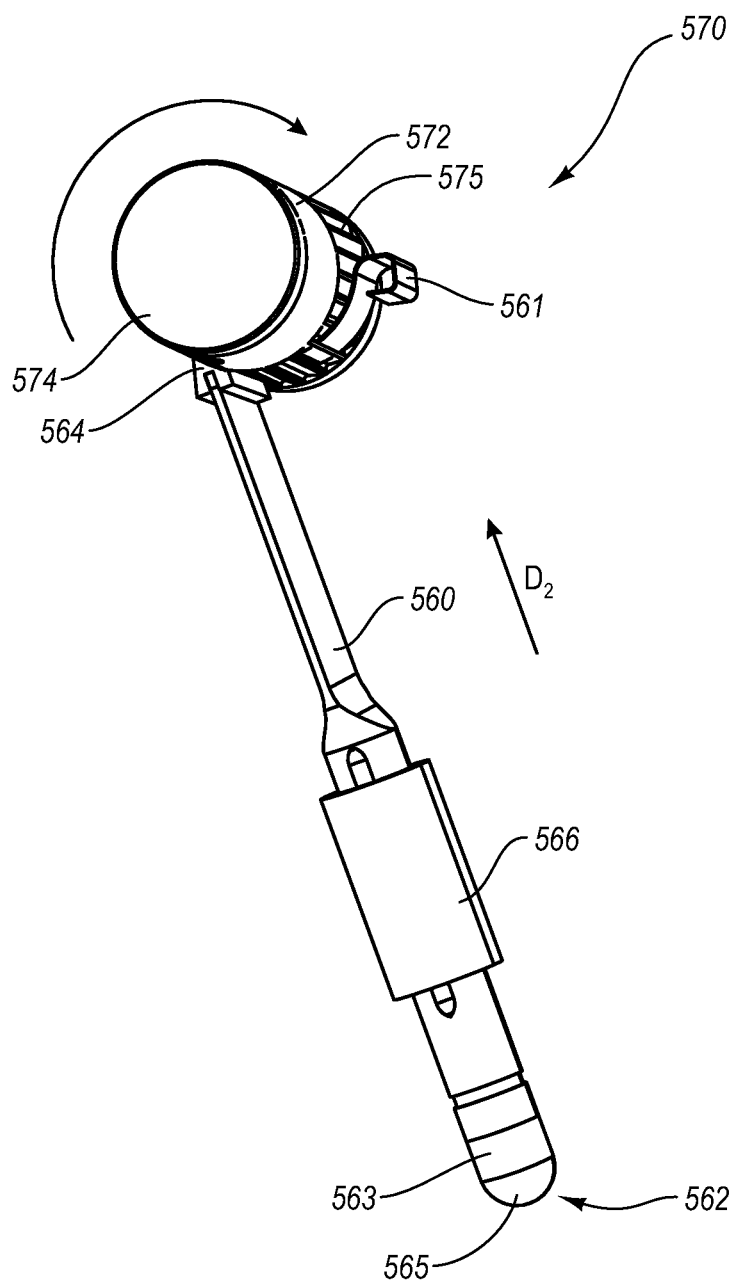
FIG. 12B is an additional perspective view of the exemplary cutting element and torque-applying structure illustrated in FIG. 12A.
Figure 12C:
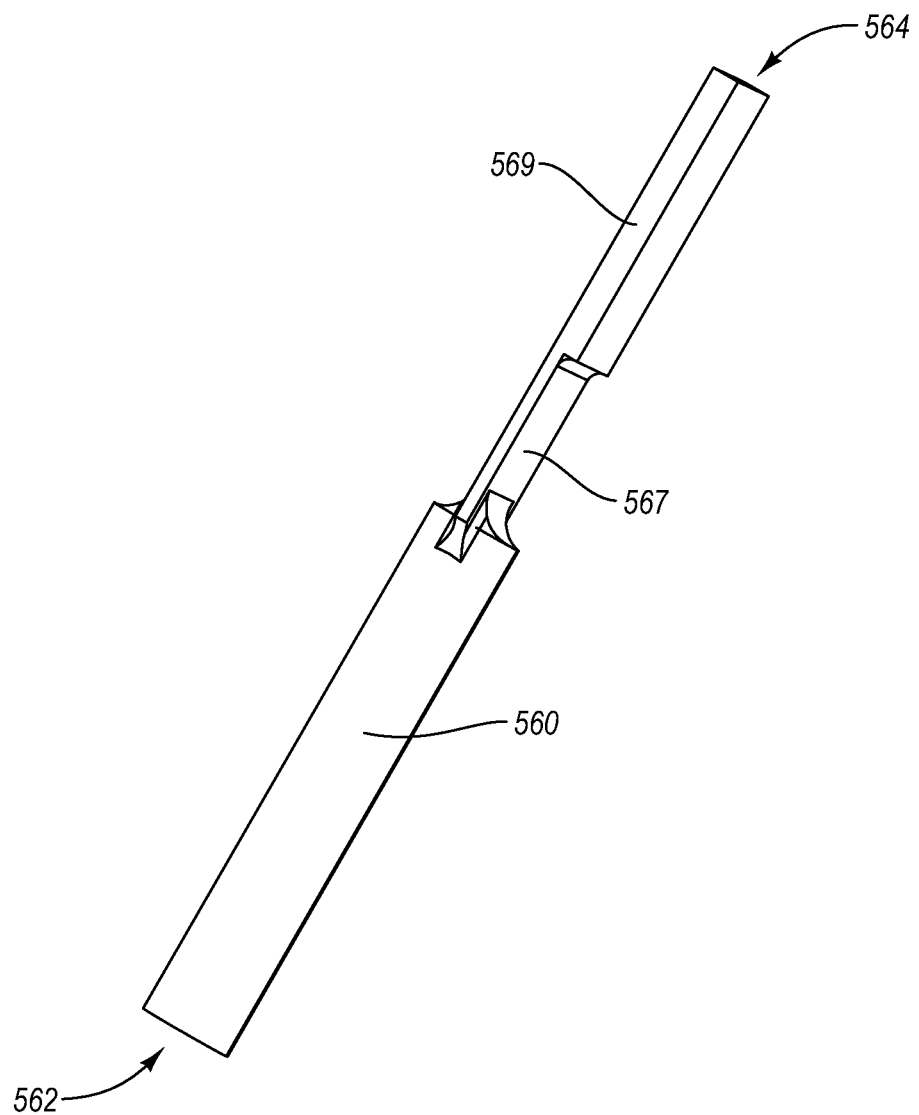
FIG. 12C is a perspective view of a torque-applying structure comprising a flexible portion and a substantially rigid portion according to at least one embodiment.
Figure 15A:
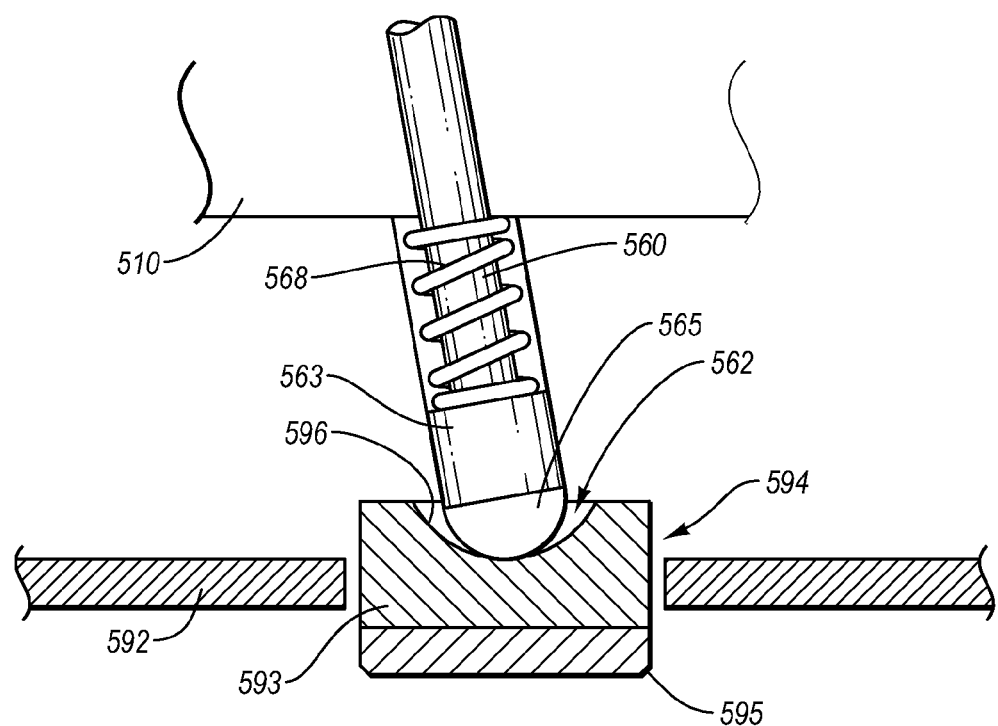
FIG. 15A is a cross-sectional side view of an exemplary cam follower assembly and torque-applying structure according to at least one embodiment.
Figure 15B:
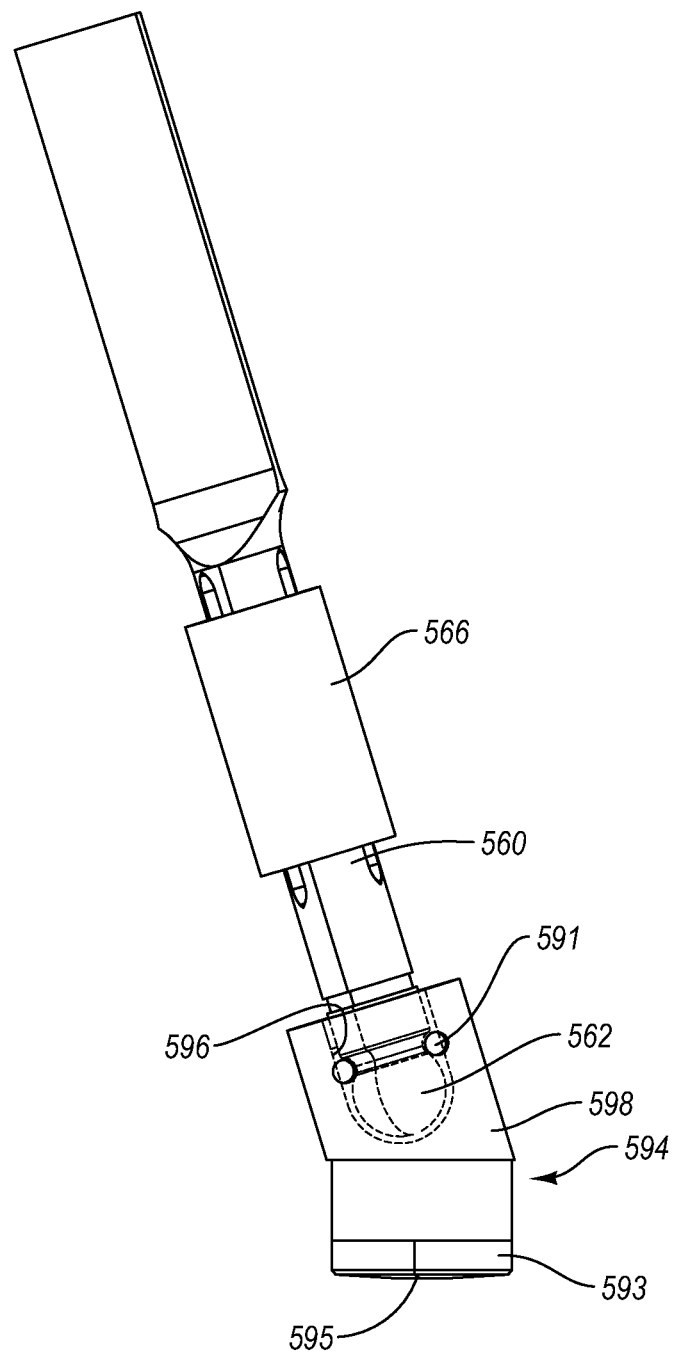
FIG. 15B is a perspective side view of a cam follower assembly and torque-applying structure according to an additional embodiment.

In at least one embodiment, and as illustrated in FIGS. 11A, 15A, and 15B, recess 596 of cam follower element 594 may be structured to receive or couple to a first end 562 of a torque-applying structure 560. Torque-applying structure 560 generally represents any type or form of structure or assembly capable of applying torque to at least a portion of cutting element 570. For example, in the exemplary embodiments illustrated in FIGS. 11A-12C, 15A, and 15B, and as described in greater detail below, torque-applying structure 560 may be a push rod structured to apply a force generated by a torque-generating assembly (comprising, for example, rotary drill bit 502, cam assembly 580, and/or cam follower assembly 590 as discussed in detail below) to cutting element 570, which may result in torque being applied to cutting element 570. In these exemplary embodiments, and as illustrated in FIGS. 12A-12C, torque-applying structure 560 may comprise a first end 562 and a second end 564. First end 562 and second end 564 of torque-applying structure 560 may exhibit selected shapes, sizes and material(s), without limitation. For example, as illustrated in FIGS. 12A-B, 15A, and 15B, first end 562 of torque-applying structure 560 may be generally rounded, domed, or otherwise shaped. In addition, in at least one embodiment, first end 562 may comprise a superhard or superabrasive material having a rounded or ovoid end surface 565 (such as polycrystalline diamond) bonded to a substrate 563 (comprising, for example, cemented tungsten carbide). In an additional embodiment, first end 562 may comprise a unitary or integrally formed structure comprising, for example, diamond, boron nitride, and/or silicon carbide.

In certain embodiments, first end 562 of torque-applying structure 560 may be attached, affixed, connected, coupled to, in contact with, or configured to interact with a portion of cam follower assembly 590. For example, as illustrated in FIGS. 11A, 15A, and 15B, first end 562 of torque-applying structure 560 may be positioned generally within the recess 596 defined cam follower element 594. Further, and as illustrated in FIGS. 11A-12B, second end 564 of torque-applying structure 560 may be coupled to, biased against, mechanically engaged with, or in contact with a portion of cutting element 570.

As detailed above, second end 564 of torque-applying structure 560 may be formed in any shape or size and of any material or combination or materials. For example, second end 564 may be structured to abut against, engage, or be received by engaging features 575 of cutting element 570. As with previous embodiments, engaging features 575 may be any structure capable of engaging, receiving, contacting, or interacting with an opposing structure. Examples of engaging features 575 include, without limitation, recesses, protuberances, gear teeth, or any other suitable structure or aperture.

As detailed above, torque-applying structure 560 may comprise any material or combination of materials. For example, as illustrated in FIG. 12C, torque-applying structure 560 may comprise a flexible portion 567 and a substantially rigid portion 569. In certain embodiments, flexible portion 567 may bend or flex while applying torque to cutting element 570, while rigid portion 569 may exhibit limited or no deformation. In addition, portions of torque-applying structure 560 may exhibit an alternate selected flexibility. For example, a central portion of torque-applying structure 560 may exhibit limited or no deformation, while an end portion of torque-applying structure 560 may bend or flex while applying torque to cutting element 570. Torque-applying structure 560 may also be attached, connected, disposed within, or coupled to bit body 510 of rotary bit 502. For example, as illustrated FIGS. 11A and 12A, torque-applying structure 560 may be disposed within a passageway 519 defined in bit body 510 of rotary bit 502. As illustrated in FIG. 12A, optionally, torque-applying structure 560 may also comprise a bushing member 566 positioned between the interior of bit body 510 and torque-applying structure 560. Such a configuration may be structured to reduce friction between bit body 510 and torque-applying structure 560.

In at least one embodiment, rotary drill bit 502 may be structured to rotate relative to, and substantially independent of, drill string 506 (and cam assembly 580 coupled thereto). Accordingly, because torque-applying structure 560 may be disposed within or coupled to bit body 510 of bit 502, torque-applying structure 560 may also rotate, in conjunction with drill bit 502, relative to cam assembly 580 and drill string 506. In such an embodiment, the rotating motion of drill bit 502 and torque-applying structure 560 coupled thereto may cause cam follower assembly 590 to rotate or change position relative to cam assembly 580. For example, as detailed above, first end 562 of torque-applying structure 560 may be attached, affixed, connected, coupled to, in contact with, or engaged with a portion of cam follower assembly 590 (e.g., cam follower elements 594). Accordingly, as drill bit 502 (and torque-applying structure 560 coupled thereto) rotates, the first end 562 of torque-applying structure 560 may cause cam follower assembly 590 to rotate relative to cam assembly 580.

As detailed above, cam follower assembly 590 may be structured to contact, trace, or follow the cam surface 581 of cam assembly 580. For example, in the exemplary embodiment illustrated in FIG. 11A, cam follower elements 594 of cam follower assembly 590 may generally contact and thus follow or trace cam surface 581 of cam assembly 580. In at least one embodiment, as cam follower assembly 590 traces or follows cam surface 581 of cam assembly 580 during rotation of rotary drill bit 502, the rise and fall (with respect to direction $D_1$ in FIG. 1) of cam surface 581 may also cause torque-applying structure 560 to be lowered and raised in a generally cyclic or reciprocating motion. More particularly, as shown in FIG. 12A, torque-applying structure 560 may reciprocate toward and away from cutting element 570 during rotation of drill bit 502, thus causing the second end 564 of torque-applying structure 560 to engage and disengage, in turn, engaging features 575 of cutting element 570. In at least one embodiment, torque-applying structure 560 may be structured so that, as second end 564 of torque-applying structure 560 engages an engaging feature 575 of cutting element 570, torque-applying structure 560 applies torque to cutting element 570 to cause cutting element 570 to rotate within cutting pocket 515 of drill bit 502. Accordingly, the exemplary configuration illustrated in FIG. 11A may utilize the rotary motion of drill bit 502 to apply torque to cutting element 570.

In certain embodiments, cam assembly 580, cam follower assembly 590, torque-applying structure 560, and/or cutting element 570 may be configured so that cutting element 570 rotates in a selected manner (e.g., over selected periodic increments, over a selected angle, in a selected direction, or combination of the foregoing). More specifically, for example, as illustrated in FIGS. 11A and 12A, the second end 564 of torque-applying structure 560 may engage and disengage, in turn, engaging features 575 of cutting element 570 as the rotary drill bit 502 rotates relative to cam assembly 580 and drill string 506, periodically applying torque to cutting element 570 to cause cutting element 570 to rotate within cutting pocket 515 of drill bit 502. For example, torque-applying structure 560 may engage and apply torque to (and thus cause the rotation of) cutting element 570 as cam follower elements 594 (and thus torque-applying structure 560) rise, in direction $D_1$ in FIG. 11A, in response to an inclined portion of cam surface 581 of cam assembly 580. Subsequently, torque-applying structure 560 may disengage (and thus cease application of torque to) cutting element 570 as cam follower elements 594 of cam follower assembly 590 are lowered (i.e., moved in a generally opposite direction to direction $D_1$ shown in FIG. 11A) in response to a declined portion of cam surface 581 of cam assembly 580.

In at least one embodiment, cutting element 570 may be inhibited or limited from rotating in a direction opposite to the intended direction of rotation caused by torque applied by a torque-applying structure. For example, as illustrated in FIG. 12B, a limiting member 561 may be biased toward and may engage engaging features 575 of cutting element 570 to inhibit cutting element 570 from rotating in a direction opposite to the intended direction of rotation caused by torque applied by torque-applying structure 560. Limiting member 561 may be any structure or assembly structured for limiting the rotation of cutting element 570 in an undesired direction. In at least one embodiment, limiting member 561 may be housed in a recess or aperture defined in bit body 510 of drill bit 502.

In at least one embodiment, and as illustrated in FIG. 15A, torque-applying structure 560 may be biased towards cam follower assembly 590 so that, when cam follower elements 594 of cam follower assembly 590 are lowered in response to a declined portion of the cam surface 581 of cam assembly 580, torque-applying structure 560 remains in contact with cam follower elements 594 of cam follower assembly 590. In the exemplary embodiment illustrated in FIG. 15A, torque-applying structure 560 may be biased towards cam follower element 594 by a biasing element 568. Biasing element 568 generally represents any type or form of structure capable of biasing torque-applying structure 560 towards cam follower element 594; including, for example, a spring or similar structure. In certain embodiments, biasing element 568 may be in contact with both bit body 510 of drill bit 502 and the first end 562 (e.g., substrate 563) of torque-applying structure 560.

As detailed above, first end 562 of torque-applying structure 560 may be attached, affixed, connected, coupled to, in contact with, or configured to interact with a portion of cam follower assembly 590, such as cam follower elements 594, in any number of ways. For example, as illustrated in FIG. 15B, in at least one embodiment the first end 562 of torque-applying structure 560 may be disposed and retained within a recess 596 defined within an inclined portion 598 of cam follower element 594. In certain embodiments, one or more retention elements 591 may retain first end 562 of torque-applying structure 560 within portion 598 of cam follower element 594.

As detailed above, and as illustrated in FIGS. 15A and 15B, a recess 596 defined in each cam follower element 594 may be structured to receive or couple to the first end 562 of torque-applying structure 560. Recess 596 may exhibit any selected shape and size. For example, as seen in FIGS. 14A, 14C, 15A, and 15B, recess 596 may be generally hemispherical in shape or curved, rounded, or radiused. This exemplary configuration may allow first end 562 of torque-applying structure 560 to pivot or swivel within recess 596 as cam follower elements 594 rise and fall (generally with respect to direction $D_1$ in FIG. 11A) while tracing or following the cam surface 581 of cam assembly 580.

The exemplary configuration of drilling system 500 illustrated in FIG. 11A may provide a number of advantages and benefits. For example, if a surface area of cam follower elements 594 is greater than a surface area of the first end 562 of torque-applying structure 560, cam follower elements 594 may decrease the force and/or stress applied to cam surface 581 of cam assembly 580 (e.g., cam inserts 584). Such a configuration may slow the rate of wear and increase the life of cam assembly 580 (e.g., cam surface 581 and/or cam inserts 584). In addition, connecting structure 592 of cam follower assembly 590 may increase the stability of drilling system 500 by keeping cam follower elements 594 in general alignment with both torque-applying structure 560 and cam assembly 580.

Figure 16A:
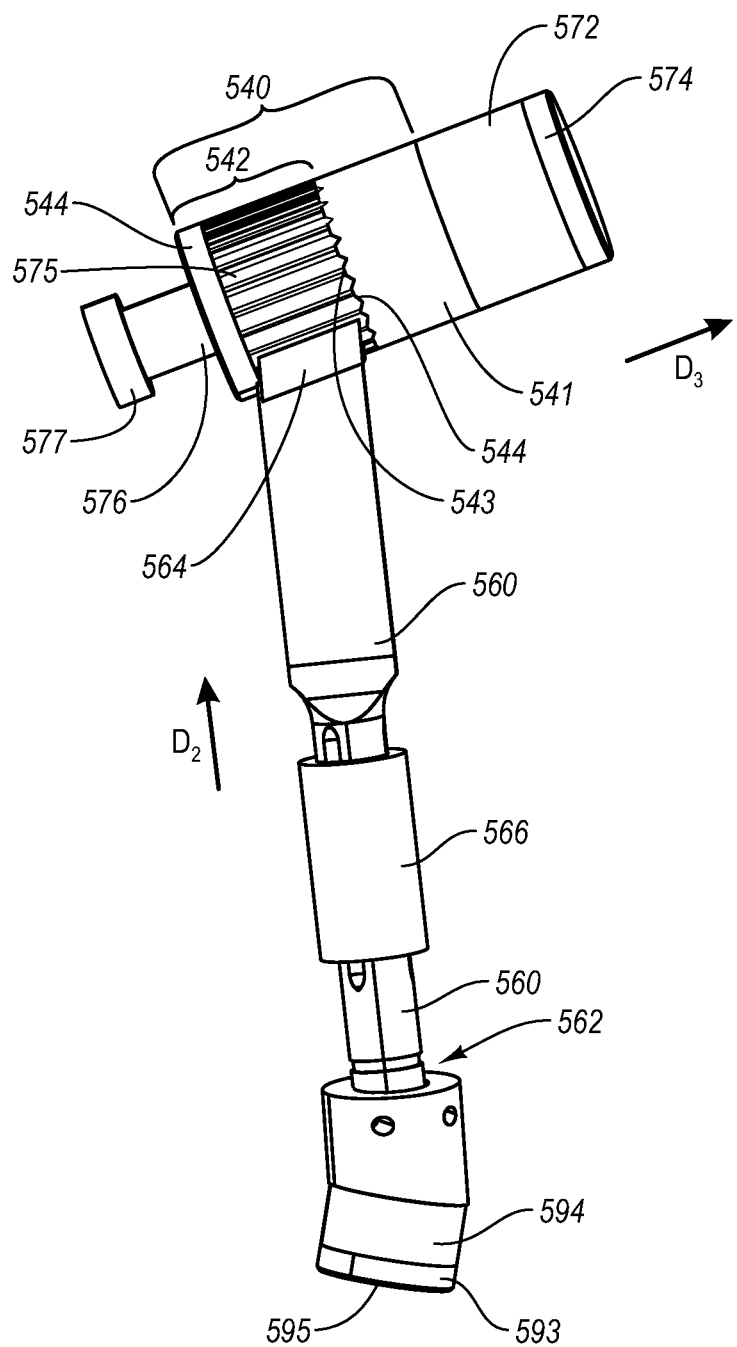
FIG. 16A is a perspective side view of an exemplary cutting element and torque-applying structure according to an additional embodiment.
Figure 16B:
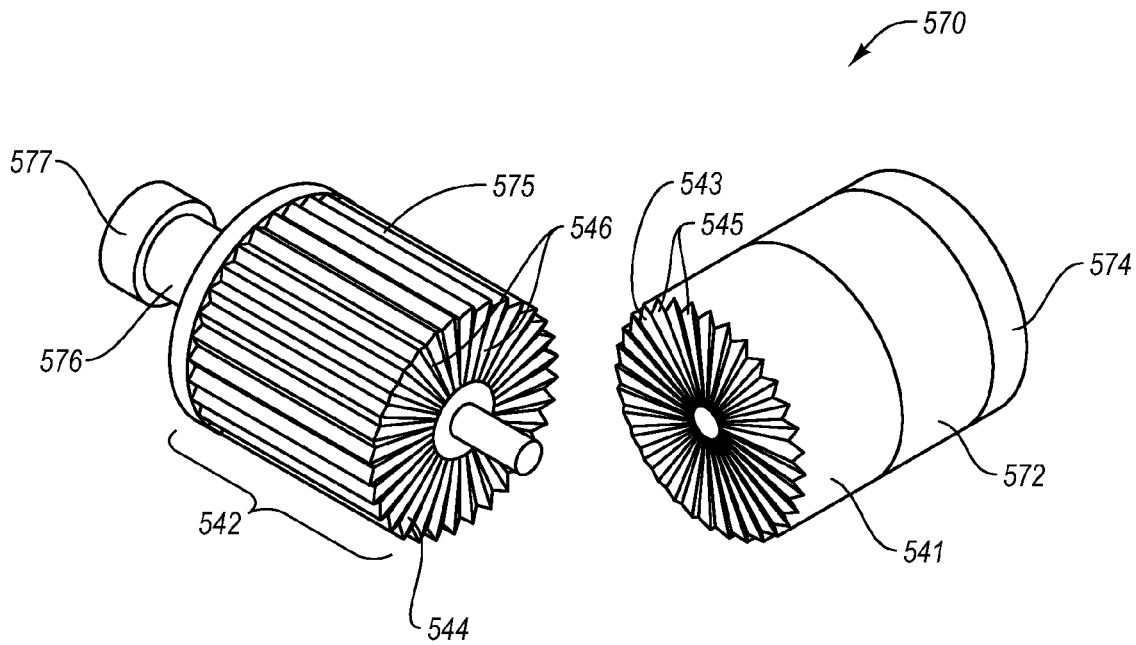
FIG. 16B is an illustration of the exemplary cutting element and torque-applying structure illustrated in FIG. 16A.
Figure 16C:
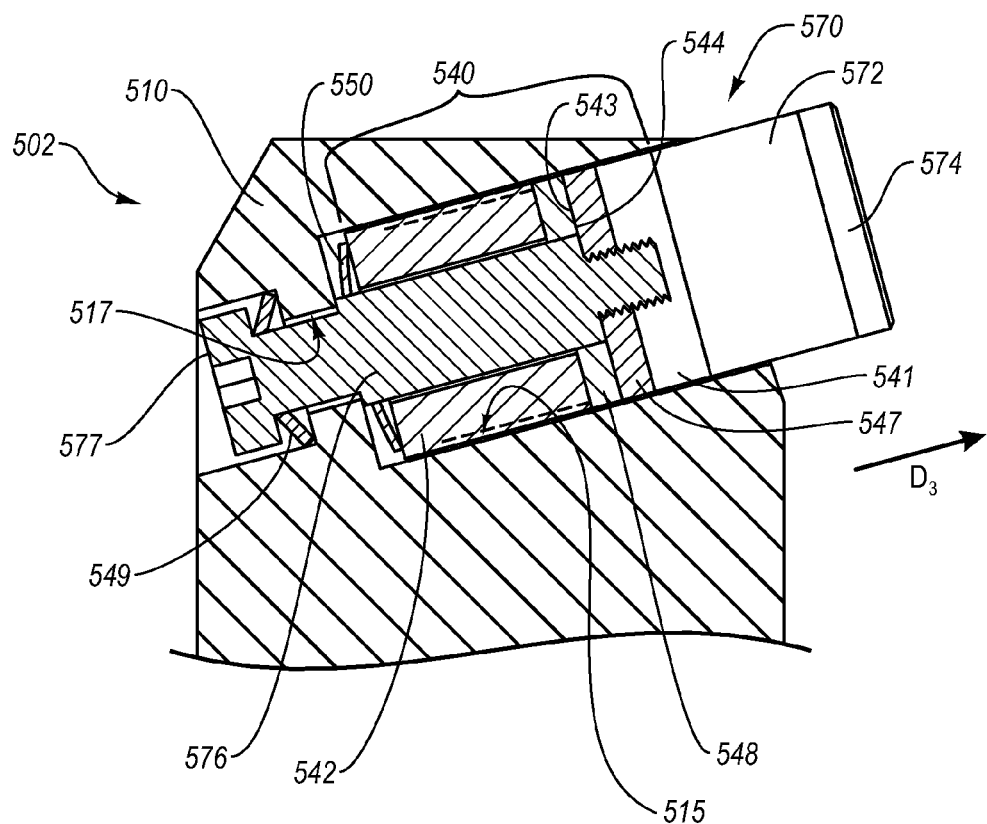
FIG. 16C is a cross-sectional side view of a cutting element according to an additional embodiment.

FIGS. 16A-16C illustrate an exemplary cutting element 570 and torque-applying structure 560 according to at least one additional embodiment. As with previous embodiments, cutting element 570 may be formed of any material or combination or materials suitable for cutting rock or other subterranean formations. For example, cutting element 570 may be substantially comprised of a selected material (e.g., a superabrasive material without a substrate). Alternatively, in at least one example, and as illustrated in FIGS. 16A-16C, cutting element 570 may comprise a superabrasive layer or table 574 bonded to or formed upon a substrate 572. Table 574 may be formed of any material or combination of materials; including, for example, a superhard or superabrasive material, such as polycrystalline diamond. Similarly, substrate 572 may comprise any material capable of adequately supporting a superabrasive material during drilling of a subterranean formation; including, for example, cemented tungsten carbide.

In at least one example, cutting element 570 may be bonded, adhered, or attached to a clutch structure 540. In one embodiment, clutch structure 540 may be integrally formed with, or represent a portion of, cutting element 570. For example, substrate 572 may comprise a clutch structure 540, as opposed to being adhered, bonded, or attached to clutch structure 540 that is external to substrate 572. Clutch structure 540 generally represents any type or form of mechanical device or structure for selectively connecting and/or disconnecting a force or torque generating system and cutting element 570. In other words, clutch structure 540 may be configured to selectively allow or inhibit applications of a force or a torque to cutting element 570, by disengaging when a specified level of torque is reached (e.g., to protect a torque-applying member 560 from excessive force, etc.). As illustrated in FIGS. 16A-16C, clutch structure 540 may comprise a first portion 541 and a second portion 542. In certain embodiments, first portion 541 may be at least temporarily coupled to second portion 542 by frictionally contacting, interlocking with, meshing with, engaging, or contacting second portion 542.

As illustrated in FIGS. 16A-16C, first portion 541 may comprise a first engaging surface 543 structured to frictionally contact and/or mechanically engage, a second engaging surface 544 provided on second portion 542. In the exemplary embodiment illustrated in FIG. 16B, first engaging surface 543 may comprise at least one first engaging structure 545 structured to mechanically engage at least one complimentary second engaging structure 546 provided on second engaging surface 544. First engaging structure 545 and second engaging structure 546, each of which generally represents any type or form of structure capable of engaging a corresponding structure, may be formed in any geometrical shape or size. For example, as illustrated in FIG. 16B, a plurality of tooth-shaped second engaging structures 546 provided on second portion 542 may be configured to interlock with, mesh with, engage, or contact a plurality of corresponding first engaging structures 545 provided on first portion 541.

In an additional embodiment, first portion 541 and second portion 542 may comprise disc-shaped friction members capable of being brought into contact with one another by one or more biasing members (e.g., one or more springs, spring washers, etc.). In this exemplary embodiment, as illustrated in FIG. 16C, a first friction material 547 may be formed on first portion 541, while a second friction material 548 may be formed on second portion 542. Friction materials 547 and 548 may comprise any material or combination of materials capable of frictionally engaging an opposing material or structure. As illustrated in FIG. 16C, at least one spring element 550 (e.g, one or more springs, coil springs, Belleville washer springs, etc.) may be positioned between a front surface of cutting pocket 515 (surface facing in direction $D_3$) and a back surface of second portion 542 (surface facing opposite direction $D_3$) to bring first engaging surface 543 of first friction material 547 into contact with second engaging surface 544 of second friction material 548. In certain embodiments, when the first engaging surface 543 of first friction material 547 is brought into contact with the second engaging surface 544 of second friction material 548, first portion 541 may be coupled to second portion 542, enabling rotation of cutting element 570 by torque-applying structure 560. At least one biasing element 549 (e.g, one or more springs, coil springs, Belleville washer springs, etc.) may also be positioned between second end 577 of coupling structure 576 and bit body 510 of bit 502 to bias cutting element 570 toward cutting pocket 515 (in a direction generally opposite to direction $D_3$ as shown in FIG. 16C).

In at least one embodiment, first portion 541 of clutch 540 may at least partially disengage from second portion 542 of clutch 540 when a resistive force transmitted to first portion 541 exceeds the mechanical engagement force between first portion 541 and second portion 542. As explained above, one or more torque-generating and/or torque-applying structures or assemblies may be configured to apply torque to cutting element 570. For example, as illustrated in FIG. 16A, second end 564 of torque-applying structure 560 may apply torque to second portion 542 of clutch portion 540. Because second portion 542 is mechanically engaged with first portion 541, the torque applied by torque-applying structure 560 to second portion 542 may cause second portion 542 and, in turn, first portion 541 (and accordingly cutting element 570) to rotate. However, in certain situations, a resistive force (e.g., cutting forces, friction, etc.) applied to cutting element 570 (e.g., a cutting force applied to table 574 of cutting element 570 by a subterranean formation) may inhibit or prevent rotation of cutting element 570. In an example where rotation of cutting element 570 is inhibited or prevented, second portion 542 and first portion 541 may disengage from one another at a selected force or torque, thus allowing second portion 542 to continue to rotate in response to torque applied by torque-applying structure 560 while first portion 541 remains stationary. When rotation of cutting element 570 is inhibited, causing second portion 542 to disengage from first portion 541, spring element 550 may compress to allow second portion 542 to rotate in cutting pocket 515 independently of first portion 541.

In at least one embodiment, as illustrated in FIG. 16B, the geometrical shape of first engaging structures 545 and second engaging structures 546 may allow second portion 542 to slip or disengage from first portion 541 of clutch 540 under selected conditions. In other words, the geometrical shape of first engaging structures 545 and second engaging structures 546 may be configured to provide a selected minimum force or torque at which second portion 542 may disengage from first portion 541. In addition, a biasing element may be provided to apply a selected amount of force between first portion 541 and second portion 542.

In an additional embodiment, first friction material 547 and second friction material 548 may be configured to provide a selected minimum force at which second portion 542 may disengage from first portion 541. For example, as illustrated in FIG. 16C, first friction material 547 and second friction material 548 may provide sufficient frictional force to maintain first engaging surface 543 in contact with second engaging surface 544 during the rotation of second portion 542 by torque-applying structure 560 up to a selected minimum force or torque. The exemplary embodiments illustrated in FIGS. 16A-16C may thus prevent damage to one or more portions of the drilling system by allowing second portion 542 to continue to rotate in response to torque applied to second portion 542, while permitting first portion 541 to remain stationary.

Figure 17:
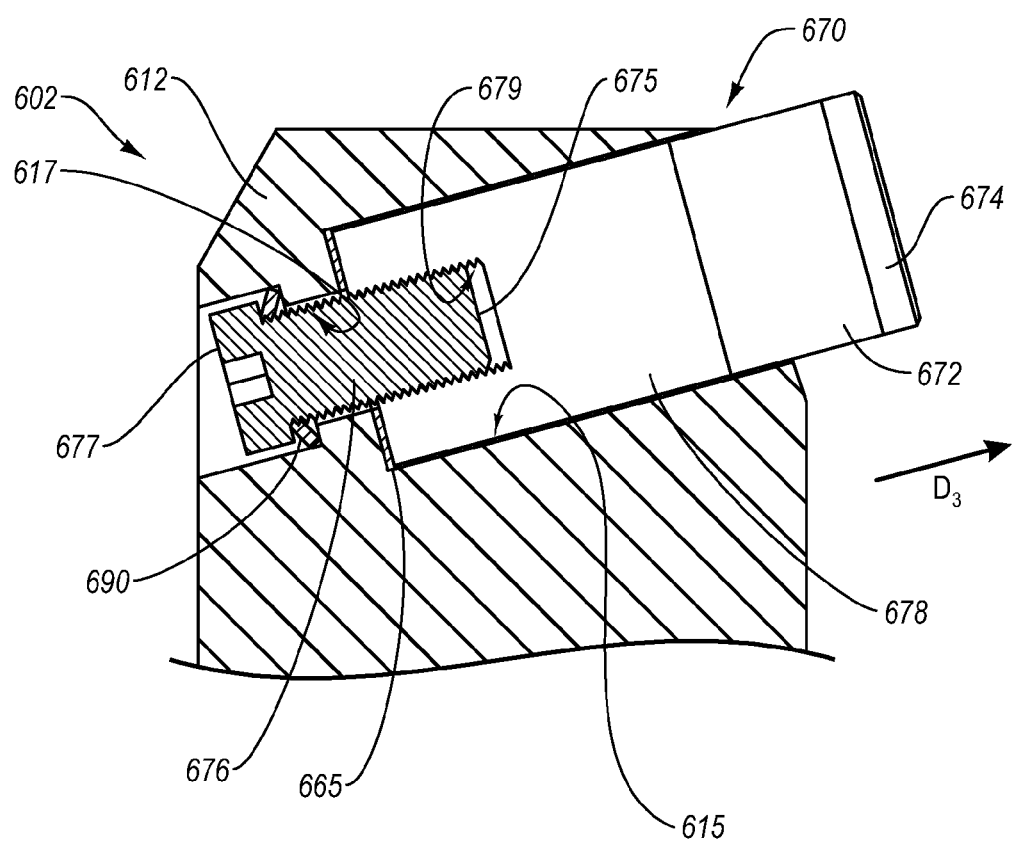
FIG. 17 is a cross-sectional side view of an exemplary cutting element according to an additional embodiment.

FIG. 17 is a cross-sectional side view of an exemplary cutting element 670 according to an additional embodiment. As with previous embodiments, cutting element 670 may be formed of any material or combination or materials used for cutting formations. For example, cutting element 670 may comprise any suitable material in a desired configuration or a plurality of materials, without limitation. In at least one example, and as illustrated in FIG. 17, cutting element 670 may comprise a superabrasive layer or table 674 bonded to or formed upon a substrate 672. Table 674 may be formed of any suitable superabrasive material; including, for example, polycrystalline diamond. Similarly, substrate 672 may comprise any material or combination of materials capable of adequately supporting a superabrasive material (e.g., during drilling of a subterranean formation); including, for example, materials such as cemented tungsten carbide.

In at least one example, substrate 672 of cutting element 670 may be adhered, brazed, welded, or affixed to a base member 678. Base member 678 may be formed in any shape or size and of any material or combination or materials. For example, base member 678 may comprise one or more metals, such as, for example, steel. In certain embodiments, the materials comprising substrate 672 of cutting element 670 may be chosen based on the coefficient of thermal expansion of the material or materials comprising base member 678. For example, substrate 672 may comprise tungsten carbide having a concentration of cobalt that results in substrate 672 having a coefficient of thermal expansion that generally corresponds to a coefficient of thermal expansion of base member 678.

In at least one embodiment, a recess 679 may be defined in base member 678. As illustrated in FIG. 17, recess 679 may comprise threads structured to receive and engage coupling structure 676, which may also be threaded (e.g., a first end 675 of coupling structure 676 may be threaded into recess 679 of base member 678). Coupling structure 676 generally represents any type or form of structure capable of coupling cutting element 670 to bit body 610 (e.g., the face or blades of body 610). In at least one embodiment, coupling structure 676 may comprise a second end 677 that is larger than an aperture 617 defined in bit body 610 so that, once first end 675 of coupling structure 676 is threaded into recess 679, cutting element 670 may be effectively retained within a cutting pocket 615 defined in bit body 610 of drill bit 602. A biasing element 690 (e.g., a Belleville washer spring, a coil spring, etc.) may also be positioned between the second end 677 of coupling structure 676 and the bit body 610 of drill bit 602 to bias cutting element 670 toward cutting pocket 615.

As shown in FIG. 17, a separation element 665 (e.g., a washer or other element) may be positioned between a front surface of cutting pocket 615 (e.g., a surface facing generally in direction $D_3$) and a back surface of cutting element 670 (e.g., a surface facing in a direction generally opposite to direction $D_3$). Separation element 665 may comprise a washer or a layer of material, such as a metal or ceramic shim. In another embodiment, separation element 665 may be configured to reduce friction and/or wear between cutting element 670 and cutting pocket 615. Optionally, separation element 665 may be sacrificial (i.e., may be softer than cutting element 670 and/or cutting pocket 615).

In another embodiment, a coating, such as diamond, silicon carbide, chrome, tungsten carbide, etc., may be deposited (e.g., electroplated, thermally sprayed, sputtered, electrolessly deposited, or formed or deposited) upon at least a portion of cutting pocket 615 and/or cutting element 670. For example, at least a portion of base member 678 may be coated with an erosion resistant material, such as a homogeneous, binder-free tungsten carbide material. In at least one embodiment, this erosion resistant material may increase the hardness of, slow the wear of, and increase the overall life of base member 678.

Figure 18A:
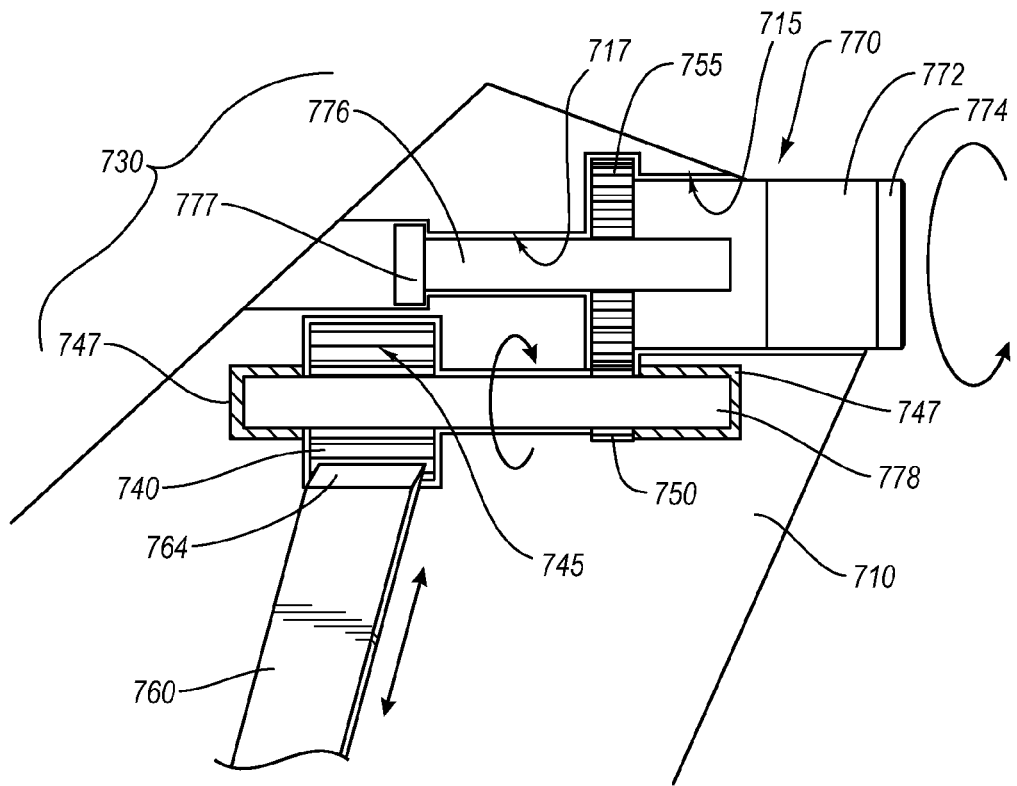
FIG. 18A is a cross-sectional side view of an exemplary cutting element, torque-amplifying assembly, and torque-applying structure according to at least one embodiment.

FIG. 18A is a cross-sectional side view of an exemplary cutting element 770, torque-amplifying assembly 730, and torque-applying structure 760 according to at least one embodiment. Cutting element 770 generally represents any type or form of cutting element capable of cutting a subterranean formation; including, for example, PDC cutters. As with previous embodiments, cutting element 770 may be formed in any number of configurations and of any material or combination or materials. For example, in certain embodiments (and as illustrated in FIG. 18A), cutting element 770 may comprise a layer or table 774 bonded to or formed upon a substrate 772. Optionally, as with all previous embodiments, cutting element 770 may comprise a superabrasive structure formed without a substrate, the superabrasive material comprising, for example, diamond, silicon carbide, boron nitride, or a combination of the foregoing. Cutting element 770 may also comprise a superabrasive table bonded to a substrate.

Table 774 in FIG. 18A may comprise any material or combination of materials used for cutting formations; including, for example, a superhard or superabrasive material such as polycrystalline diamond. Similarly, substrate 772 may comprise any material or combination of materials capable of adequately supporting a superabrasive material during drilling of a subterranean formation; including, for example, cemented tungsten carbide. For example, cutting element 770 may include a table 774 comprising polycrystalline diamond bonded to a substrate 772 comprising cobalt-cemented tungsten carbide.

In another aspect of the invention, a torque-amplifying assembly may be employed. A torque-amplifying assembly may be any type or form of structure or assembly capable of amplifying, multiplying, or increasing a torque. In at least one embodiment, at least a portion of an exemplary torque-amplifying assembly 730 may be disposed within or coupled to a portion of bit body 710 (e.g., the blades of bit body 710). For example, as illustrated in FIG. 18A, torque-amplifying assembly 730 may be disposed within an aperture or a plurality of apertures or recesses defined in bit body 710.

In at least one embodiment, torque-amplifying assembly 730 may comprise a harmonic gear or planetary gear system. For example, torque-amplifying assembly 730 may comprise a first gear and at least a second gear. As illustrated in FIG. 18A, torque-amplifying assembly 730 may comprise a first gear 750 engaged or mechanically coupled to a second gear 755. First gear 750 and second gear 755, which generally represent any type or form of gear structure or assembly, may be formed in any selected shape and size and may comprise any suitable material. In at least one embodiment, first gear 750 may be coupled to a torque-generating assembly (such as, for example, cam assembly 580 and cam follower assembly 590 in FIG. 11A) via a torque-applying structure (such as, for example, torque-applying structure 760). First gear 750 may be coupled to a torque-generating assembly in any number of ways and in any number of configurations. In one example, first gear 750 may be affixed, connected, or attached to a shaft 778 disposed within bit body 710. In at least one embodiment, one or more shaft bearings or bushings 747 may be operably coupled to shaft 778 (e.g., the ends of shaft 778) to allow shaft 778 to rotate within bit body 710.

In at least one embodiment, as illustrated in FIG. 18A, shaft 778 may be integrally formed with, or affixed or attached to, a rotatable structure 740. Rotatable structure 740 represents any type or form of mechanism configured to allow rotation in a selected direction and limit rotation in an opposite direction (e.g., a ratchet structure, etc.). Such a mechanism may cause rotation in the selected direction to occur in steps or intervals. In at least one additional embodiment, rotatable structure 740 may comprise one or more engaging features 745. As with previous embodiments, engaging features 745 generally represent any type or form of structure or recess capable of engaging or receiving an opposing structure, such as the second end 764 of torque-applying structure 760. Examples of engaging features 745 include, without limitation, recesses, protuberances, gear teeth, or any other suitable structure or aperture.

In at least one embodiment, second gear 755 of torque-amplifying assembly 730 may be adhered, brazed, welded, affixed, or coupled to cutting element 770. For example, as illustrated in FIG. 18A, second gear 755 may be brazed to the bottom surface of substrate 772 of cutting element 770. In addition, as illustrated in FIG. 18A, second gear 755 and cutting element 770 may be coupled to bit body 710 (e.g., a blade of bit body 710) by a coupling structure 776. Coupling structure 776 may be any type or form of structure capable of coupling cutting element 770 and/or second gear 755 to bit body 710 (e.g., the face or blades of bit body 710). In at least one embodiment, coupling structure 776 may comprise a second end 777 that is larger than an aperture 717 defined in bit body 710 so that, once the first end of coupling structure 776 is attached to cutting element 770, cutting element 770 may be effectively retained within a cutting pocket 715 defined in bit body 710. A biasing element (such as biasing element 590 in FIG. 12A) may optionally be positioned between the second end 777 of coupling structure 776 and bit body 710 to bias cutting element 770 toward cutting pocket 715.

In at least one embodiment, first gear 750 may rotate in response to torque applied by a torque-applying structure (such as, for example, torque-applying structure 760). For example, second end 764 of torque-applying structure 760 may engage engaging features 745 and apply torque generated by a torque-generating assembly to rotatable structure 740, causing rotatable structure 740, shaft 778, and first gear 750 coupled thereto to rotate in a first direction. As illustrated in the side view of FIG. 18B, the rotary motion of first gear 750 may in turn cause second gear 755 (and cutting element 770 affixed thereto) to rotate in a second direction that is opposite to the first direction of rotation of first gear 750.

Figure 18B:
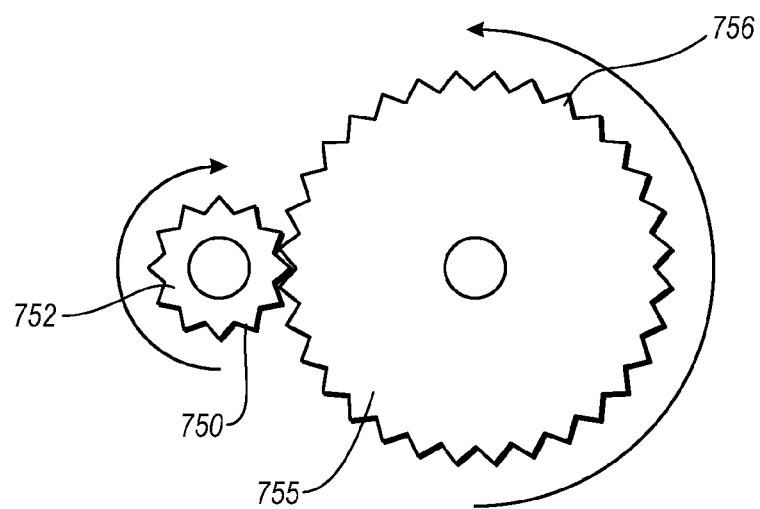
FIG. 18B is a cross-sectional view of a portion of the exemplary torque-amplifying structure illustrated in FIG. 18A.

In at least one embodiment, the gear ratio between first gear 750 and second gear 755 may be chosen so that the amount of torque applied to cutting element 770 via second gear 755 is increased. For example, as illustrated in FIG. 18B, the number of teeth 756 on second gear 755 may be greater than the number of teeth 752 on first gear 750. In certain embodiments, the greater number of teeth and greater radius or size of second gear 755 may slow the speed of rotation of second gear 755 (and thus cutting element 770 attached thereto), while increasing the amount of torque (in relation to torque applied to first gear 750) that is applied to cutting element 770. The exemplary torque-amplifying assembly 730 illustrated in FIGS. 18A and 18B may thus increase the amount of torque generated by a torque-generating assembly that is ultimately applied to cutting element 770.

Figure 19:
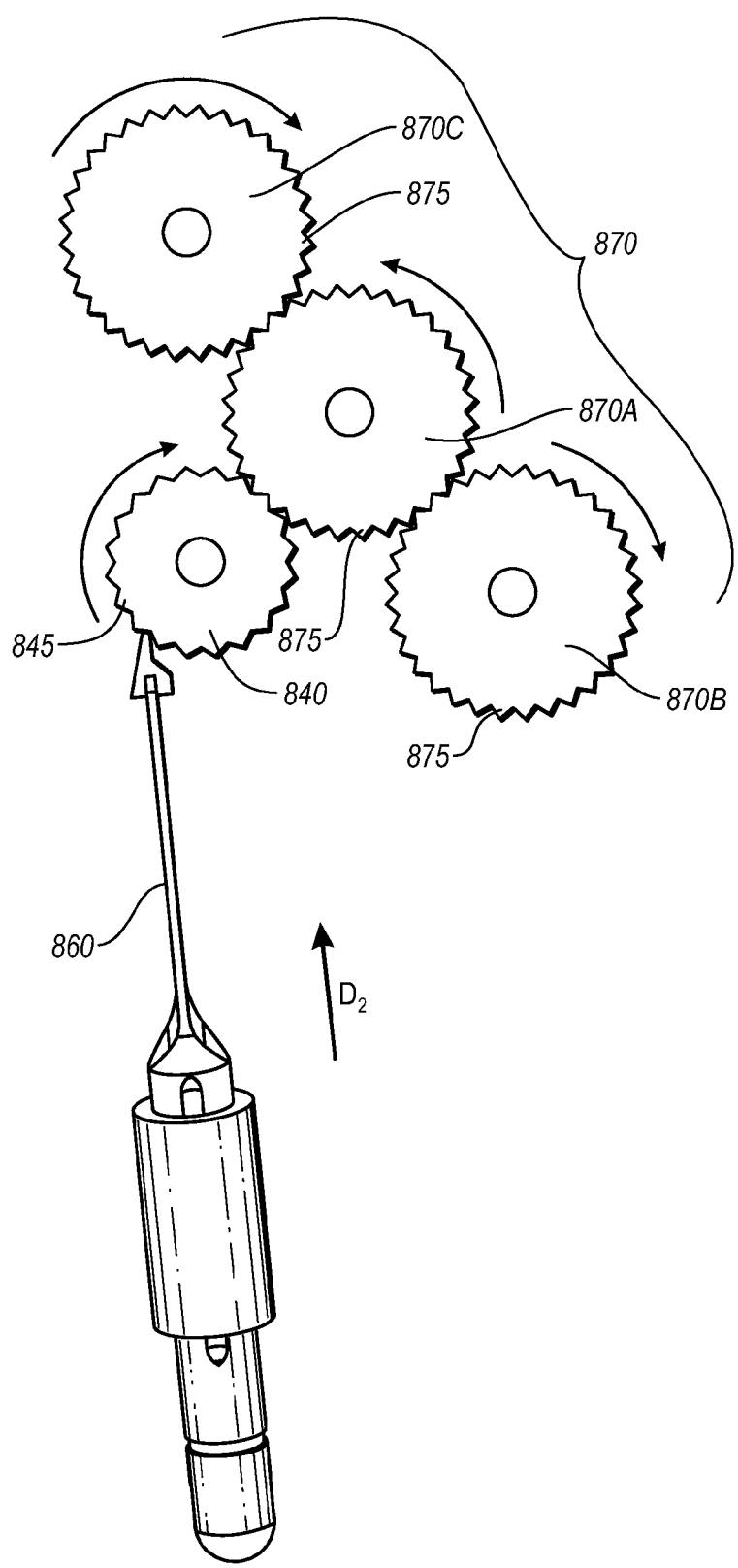
FIG. 19 is a perspective side view of an exemplary cutting element assembly and torque-applying structure according to an additional embodiment.

FIG. 19 is a perspective side view of an exemplary cutting element assembly 870 and torque-applying structure 860 according to at least one additional embodiment. As seen in FIG. 19, in certain embodiments, cutting element assembly 870 may comprise at least two cutting elements; namely, 870A, 870B, and 870C. Cutting elements 870A, 870B, and 870C may comprise any type or form of cutting element capable of cutting a subterranean formation; including, for example, PDC cutters (e.g. cutting element 570 in FIG. 11A). For example, in certain embodiments, cutting elements 870A, 870B, and 870C may comprise a superabrasive layer or table bonded to or formed upon a substrate. Optionally, cutting elements 870A, 870B, and 870C may be initially formed without a substrate and may include, for example, diamond, silicon carbide, boron nitride, a combination of the foregoing, etc. In certain embodiments, cutting elements 870A, 870B, and 870C may be rotatably mounted to a bit body of a drill bit (such as, for example, bit body 510 of drill bit 502 in FIG. 11A).

In at least one embodiment, cutting element 870A may contact or engage engaging features 845 of torque-applying wheel 840. For example, cutting element 870A may comprise one or more engaging features 875 configured or structured to engage one or more engaging features 845 provided on torque-applying wheel 840. As with previous embodiments, engaging features 875 and engaging features 845 each generally represent any type or form of structure or recess capable of engaging or receiving a complementary structure. Examples of engaging features 875 and engaging features 845 include, without limitation, recesses, protuberances, gear teeth, or any other suitable structure or aperture. Torque-applying wheel 840 may generally represent any mechanism configured to apply torque to a structure. In certain embodiments, torque-applying wheel 840 may be configured to rotate in a selected direction and limit rotation in an opposite direction. Such a mechanism may cause rotation in the selected direction to occur in steps or intervals. In at least one embodiment, torque-applying wheel 840 may rotate in response to torque applied by torque-applying structure 860. As illustrated in FIG. 19, the rotary motion of torque-applying wheel 840 may in turn cause cutting element 870A to rotate in a direction opposite to the direction of rotation of torque-applying wheel 840.

In at least one embodiment, cutting element 870A may also contact or engage at least one additional cutting element, such as cutting element 870B and/or cutting element 870C. For example, as illustrated in FIG. 19, the engaging features 875 provided on cutting element 870A may engage or contact engaging features 875 provided on cutting element 870B and/or cutting element 870C. As illustrated in FIG. 19, cutting element 870A may cause, in response to torque applied by torque-applying wheel 840, cutting element 870B and/or cutting element 870C to rotate in a direction that is opposite to the direction of rotation of cutting element 870A. Thus, as illustrated in FIG. 19, a single torque-applying structure 860 (such as, for example, a push rod) and rotatable structure (such as, for example, torque-applying wheel 840) may be used to apply torque to, and rotate, more than one cutting element (such as cutting elements 870A, 870B, and/or 870C).

Figure 20:
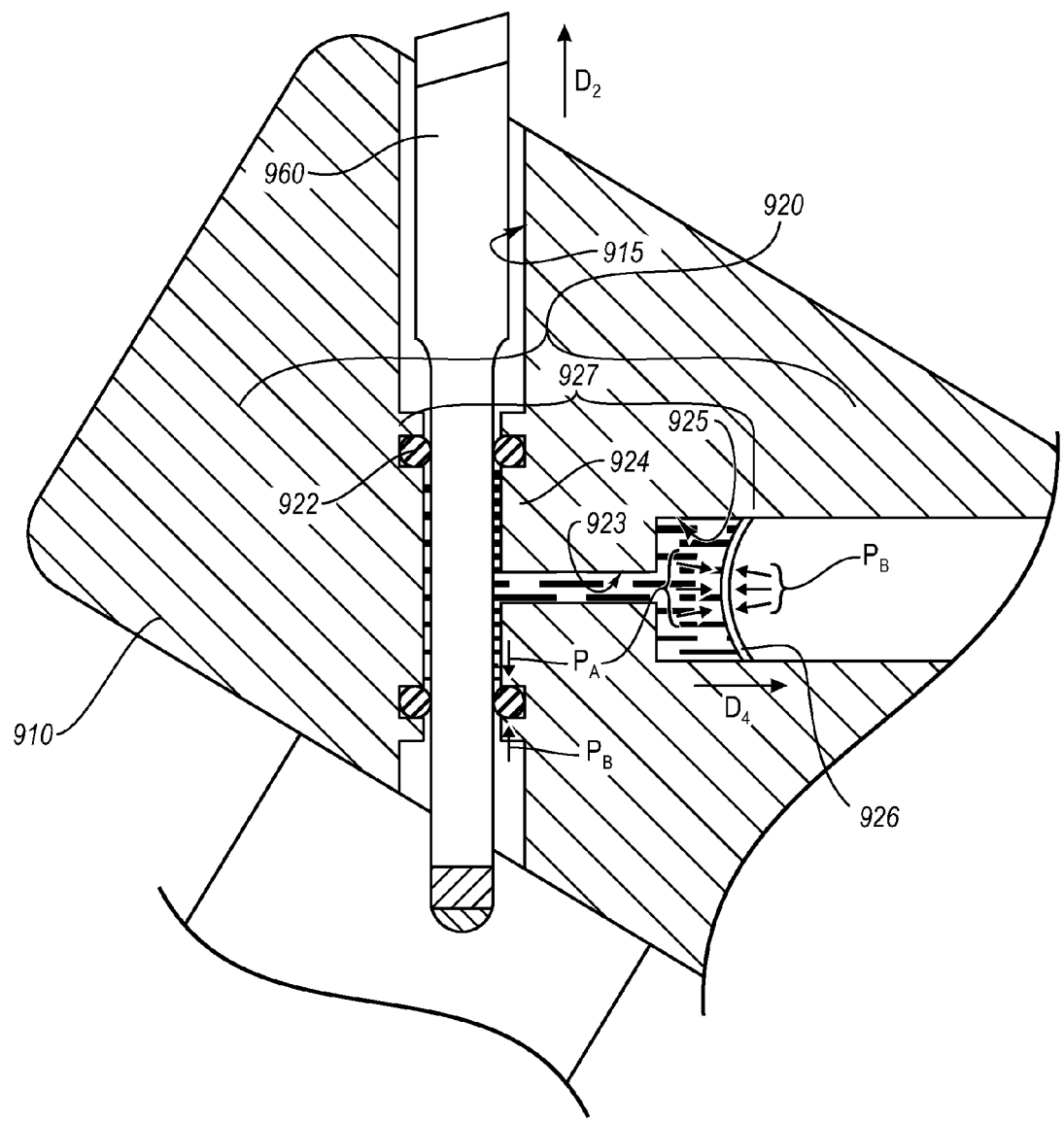
FIG. 20 is a cross-sectional side view of an exemplary bit body and torque-applying structure according to an additional embodiment.

FIG. 20 is a cross-sectional side view of an exemplary drill bit body 910 and torque-applying structure 960 according to an additional embodiment. Torque-applying structure 960 generally represents any structure or assembly capable of applying torque to at least a portion of a cutting element. For example, as illustrated in FIG. 20, torque-applying structure 960 may be a push rod structured to apply torque to a cutting element (such as, for example, cutting element 570 in FIG. 11A).

In at least one embodiment, torque-applying structure 960 may be attached, connected, disposed within, or coupled to bit body 910. For example, as illustrated in FIG. 20, torque-applying structure 960 may be disposed within a passageway 915 defined in bit body 910. In certain embodiments, torque-applying structure 960 may also be coupled to a pressure-compensating assembly 920. Pressure-compensating assembly 920 generally represents any structure or assembly capable of at least partially compensating for, or equalizing, differences in pressure external to a sealed chamber (typically containing a lubricant) within bit body 910.

In further detail, as illustrated in FIG. 20, pressure-compensating assembly 920 may comprise a lubricating fluid 924 disposed within a chamber 927 defined by at least a portion of a reservoir 925, at least a portion of passageway 915 between seal members 922, and a conduit 923 connecting reservoir 925 and passageway 915. In at least one embodiment, lubricating fluid 924 may be retained within chamber 927 by at least one seal member 922. Seal members 922, which may exhibit any shape and/or size and may comprise any suitable material, may be any sealing structure or assembly capable of forming a mechanical seal. For example, in at least one embodiment, at least one of seal members 922 may comprise an elastomeric o-ring, a metal seal, or the like. In certain embodiments, at least one of seal members 922 may prevent debris from entering chamber 927.

As illustrated in FIG. 20, reservoir 925 may comprise an opening defined in bit body 910 that is connected to passageway 915 by conduit 923. In at least one embodiment, reservoir 925 may be open to an external portion of bit body 910. In addition, pressure-compensating assembly 920 may comprise a dynamic member 926 disposed within reservoir 925 that separates lubricating fluid 924 in chamber 927 from a portion of reservoir 925 that is open to an external portion of bit body 910. Dynamic member 926 may represent any structure or assembly capable of flexing, bending, moving, or accommodating differences between a pressure external to bit body 910 and a pressure within chamber 927. In at least one embodiment, dynamic member 926 may comprise a flexible diaphragm that flexes in response to a difference in pressure on either side of dynamic member 926. For example, a dynamic member 926 comprising a flexible diaphragm may flex or otherwise deform in response to a difference between an internal pressure $P_A$ and a pressure $P_B$ external to bit body 910. More particularly, as illustrated in FIG. 20, a dynamic member 926 comprising a flexible diaphragm may flex generally in a direction $D_4$ when pressure $P_A$ exceeds pressure $P_B$, and alternatively, may flex generally in a direction opposite direction $D_4$ when pressure $P_B$ exceeds pressure $P_A$.

In an additional embodiment, dynamic member 926 may comprise a piston that moves in response to a pressure differential between pressure $P_A$ and pressure $P_B$. Specifically, a dynamic member 926 comprising a piston may move in direction $D_4$ when pressure $P_A$ exceeds pressure $P_B$, and alternatively, may move in a direction opposite direction $D_4$ when pressure $P_B$ exceeds pressure $P_A$. Accordingly, dynamic member 926 may at least partially compensate for, or at least partially equalize, a difference between internal pressure $P_A$ and a pressure $P_B$ external to bit body 910.

Figure 21A:
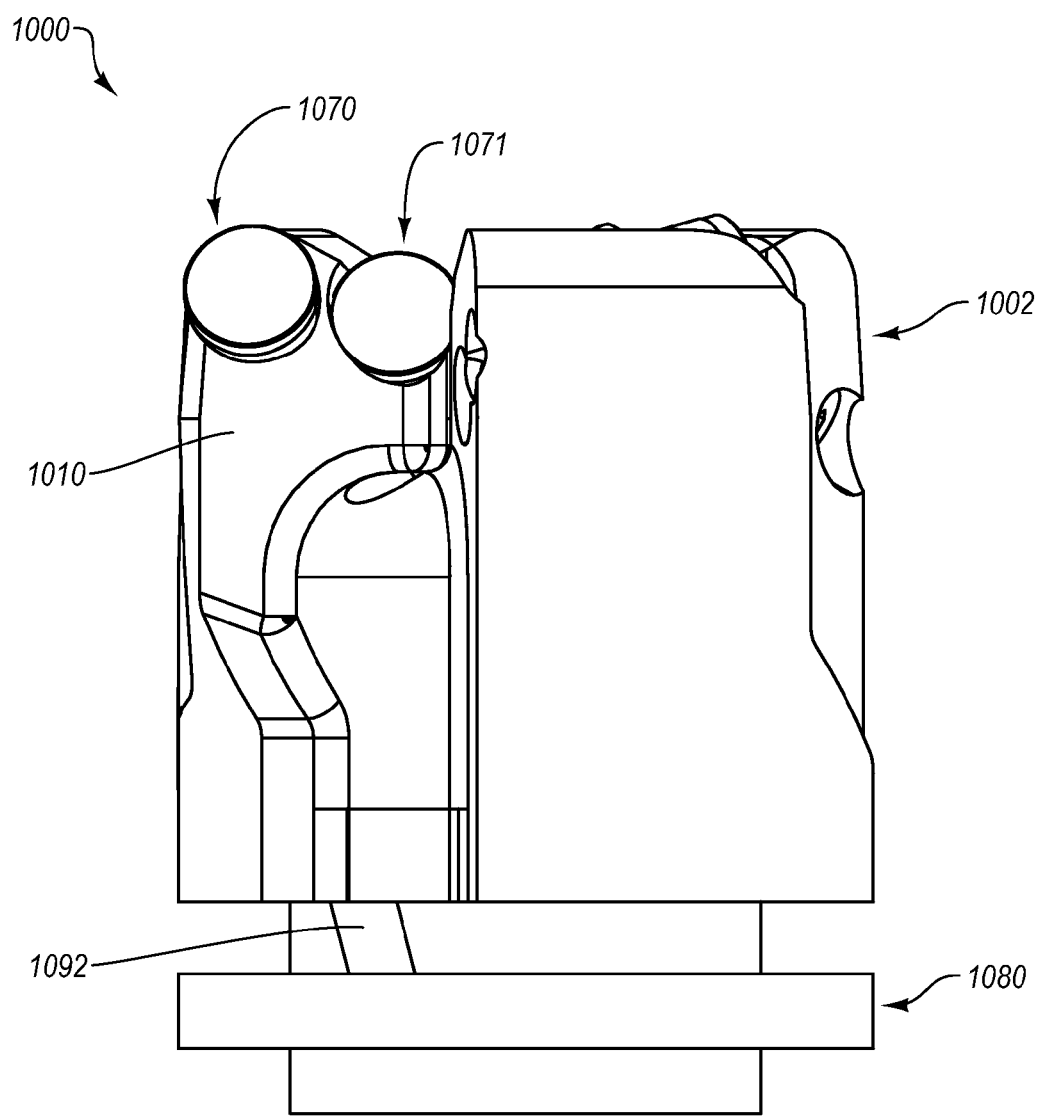
FIG. 21A is a side view of an exemplary drilling system according to an additional embodiment.

FIGS. 21A-21F illustrate an exemplary drilling system 1000 according to at least one additional embodiment. As illustrated in FIG. 21A, exemplary drilling system 1000 may comprise a drill bit 1002 having a bit body 1010. Drill bit 1002 may represent any type of earth-boring or drilling tool; including, for example, core bits, roller-cone bits, fixed-cutter bits, eccentric bits, bi-center bits, reamers, reamer wings, and the like. Drill bit 1002 may also be formed in any number of ways and of any suitable material. For example, drill bit 1002 may be machined from steel or may be manufactured by infiltrating a binder into a tungsten carbide particulate, as described above.

Figure 21B:
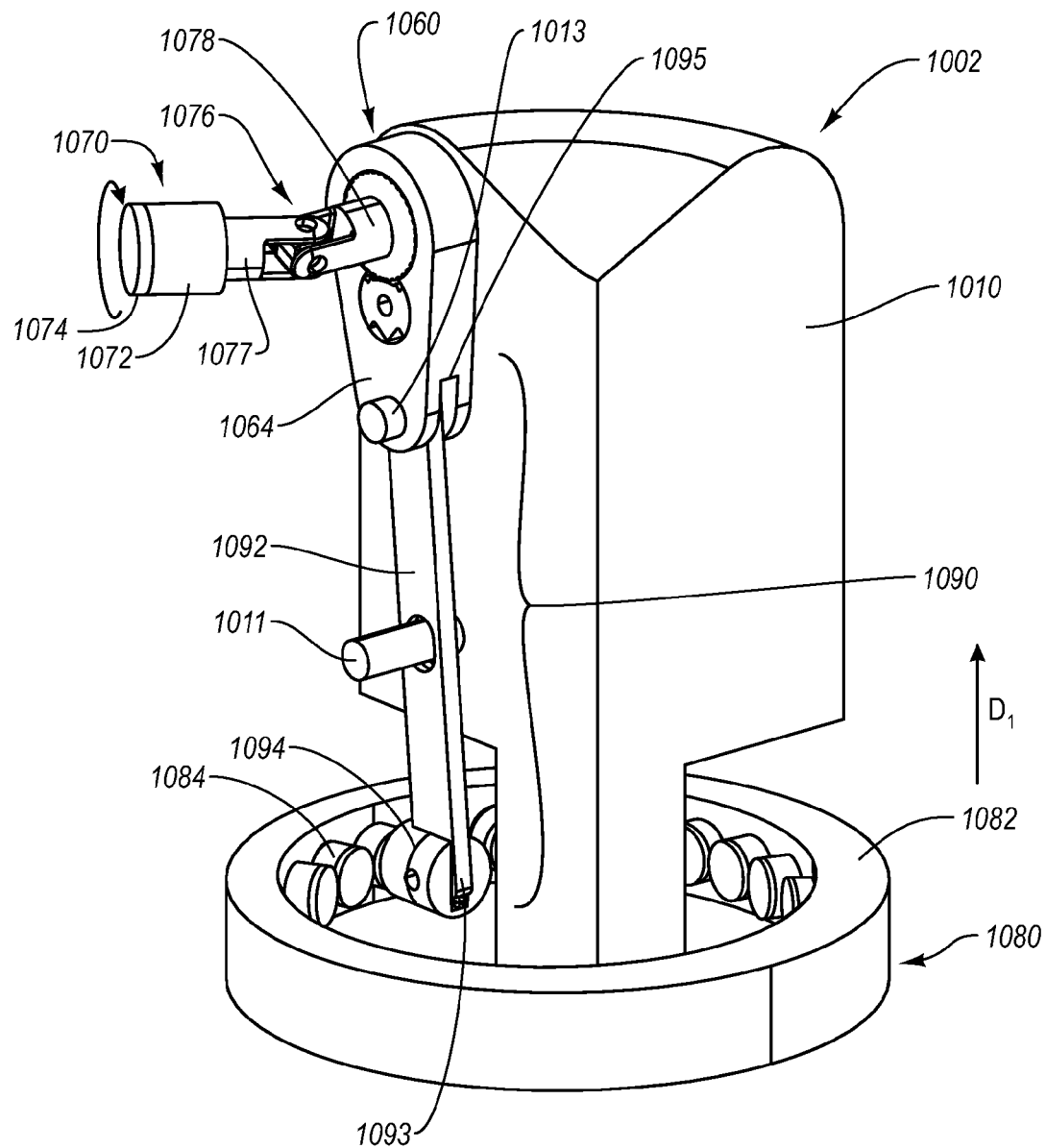
FIG. 21B is a cutaway perspective view of a portion of the exemplary drilling system illustrated in FIG. 21A.

As shown in FIG. 21A, one or more rotatable cutting elements 1070 and/or one or more fixed (i.e., stationary) cutting elements 1071 may be mounted to the face or blades of bit body 1010 of drill bit 1002. Generally speaking, cutting elements 1070 and 1071 may comprise any cutting element capable of cutting a subterranean formation. As with previous embodiments, cutting elements 1070 and 1071 may be formed of any material or combination or materials suitable for cutting formations. For example, as illustrated in FIG. 21B, cutting element 1070 may comprise a superabrasive layer or table 1074 bonded to or formed upon a substrate 1072. Table 1074 may be formed of any material or combination of materials; including, for example, a superhard or superabrasive material, such as polycrystalline diamond. Similarly, substrate 1072 may comprise any material capable of adequately supporting a superabrasive material during drilling of a subterranean formation; including, for example, cemented tungsten carbide.

Cutting element 1070 may be rotatably mounted to bit body 1010 of drill bit 1002 in any number of ways and configurations. For example, as illustrated in FIG. 21B, cutting element 1070 may be rotatably mounted to drill bit 1002 by adhering, brazing, threadedly affixing, welding, or securing cutting element 1070 to a first end 1077 of a connecting member 1076. In at least one embodiment, and as described in greater detail below, a second end 1078 of connecting member 1076 may be coupled to a torque-generating assembly. Cutting element 1070 may be positioned within a cutting pocket (such as cutting pocket 515 in FIG. 12A) comprising a recessed space or aperture open to an outside portion of bit 1002.

In at least one embodiment, cutting element 1070 may rotate in response to torque generated and applied to cutting element 1070 by a torque-generating assembly. In the exemplary embodiment illustrated in FIGS. 21A-21F, this torque-generating assembly may comprise a cam assembly 1080 coupled to a drill string (such as, for example, drill string 506 in FIG. 11A), a cam follower assembly 1090 in contact with or coupled to the cam assembly 1080, and a torque-applying structure 1060 configured to transmit force from cam assembly 1080 to apply torque to cutting element 1070.

In at least one embodiment, cam assembly 1080 may comprise a substantially annular-shaped cam body 1082. For example, as illustrated in FIG. 21E, cam body 1082 may be formed in the general shape of an annulus with an external surface 1087 and an internal surface 1089. In certain embodiments, the radial width of cam body 1082 between external surface 1087 and internal surface 1089 may vary at different points on cam body 1082. In certain embodiments, as illustrated in FIG. 21E, a radius of internal surface 1089 and/or a radius of cam surface 1081 may vary as a function of angle θ with respect to an axis of rotation 1003 around which rotary drill bit 1002 may rotate. For example, radius $R_1$ of cam surface 1081 at angle $\theta_1$ may differ from radius $R_2$ of cam surface 1081 at $\theta_2$ (radius $R_1$ and $R_2$ are measured from the axis of rotation 1003 to cam surface 1081, as shown in FIG. 21E).

As illustrated in FIG. 21E, cam body 1082 of cam assembly 1080 may comprise a cam surface 1081. In certain embodiments, cam surface 1081 may be formed of a single, unitary structure or material. In an additional embodiment, cam surface 1081 may comprise the collective surfaces of a plurality of cam inserts 1084 affixed to the internal surface 1089 of cam body 1082, as illustrated in FIGS. 21E and 21F. Cam inserts 1084 may be formed in any number of configurations and of any material or combination of materials. For example, in the exemplary embodiment illustrated in FIG. 21E, cam inserts 1084 may comprise a superabrasive insert or compact comprising a superabrasive layer or table 1085 bonded to or formed upon a substrate 1083. In an additional embodiment, cam inserts 1084 may each comprise a unitary or integrally formed superabrasive structure comprising, for example, diamond, silicon carbide, boron nitride, or a combination of the foregoing.

As with previous embodiments, table 1085 of cam inserts 1084 may be formed of any material or combination of materials; including, for example, a superhard or superabrasive material such as polycrystalline diamond, silicon carbide, boron nitride, diamond, or any superabrasive material. Similarly, substrate 1083 may comprise any material or combination of materials capable of adequately supporting a superabrasive material; including, for example, cemented tungsten carbide. For example, cam insert 1084 may comprise a table 1085 comprising polycrystalline diamond bonded to a substrate 1083 comprising cobalt-cemented tungsten carbide. In addition, as explained above, after formation of table 1085, a catalyst material (e.g., cobalt, nickel, etc.) may be at least partially removed (e.g., by acid-leaching) from table 1083.

As seen in FIGS. 21E and 21F, each cam insert 1084 may be structured and positioned proximate to an adjacent cam insert 1084 to form cam surface 1081. In an additional embodiment, each cam insert 1084 may abut (e.g., along an arcuate side surface, along a concave side surface, etc.) and/or partially surround a circumferentially adjacent cam insert 1084. Each cam insert 1084 may be formed in any shape or size. For example, cam inserts 1084 may be generally rounded or generally rectangular or formed in any other shape. Cam inserts may be machined to form a substantially cylindrical cam 1081.

In at least one embodiment, cam inserts 1084 of cam assembly 1080 may differ slightly in size and shape from each other. In an additional embodiment, each cam insert 1084 may be formed to have a height substantially the same as its circumferentially adjacent inserts. For example, as illustrated in FIG. 21E, a plurality of substantially identical cam inserts 1084 having substantially identical heights may be affixed to a cam body 1082. In this exemplary embodiment, each cam insert 1084 may be positioned and affixed within a cam insert pocket 1088 defined in the cam body 1082. Cam insert pockets 1088 may be defined in any shape and size and to any desired depth. In one embodiment, the depth $d_3$ of each cam insert pocket 1088 defined in cam body 1082 may vary. In an additional embodiment, the depth $d_3$ of each cam insert pocket 1088 defined in cam body 1082 may be substantially identical, as illustrated in FIG. 21E.

Figures 21C, 21D:
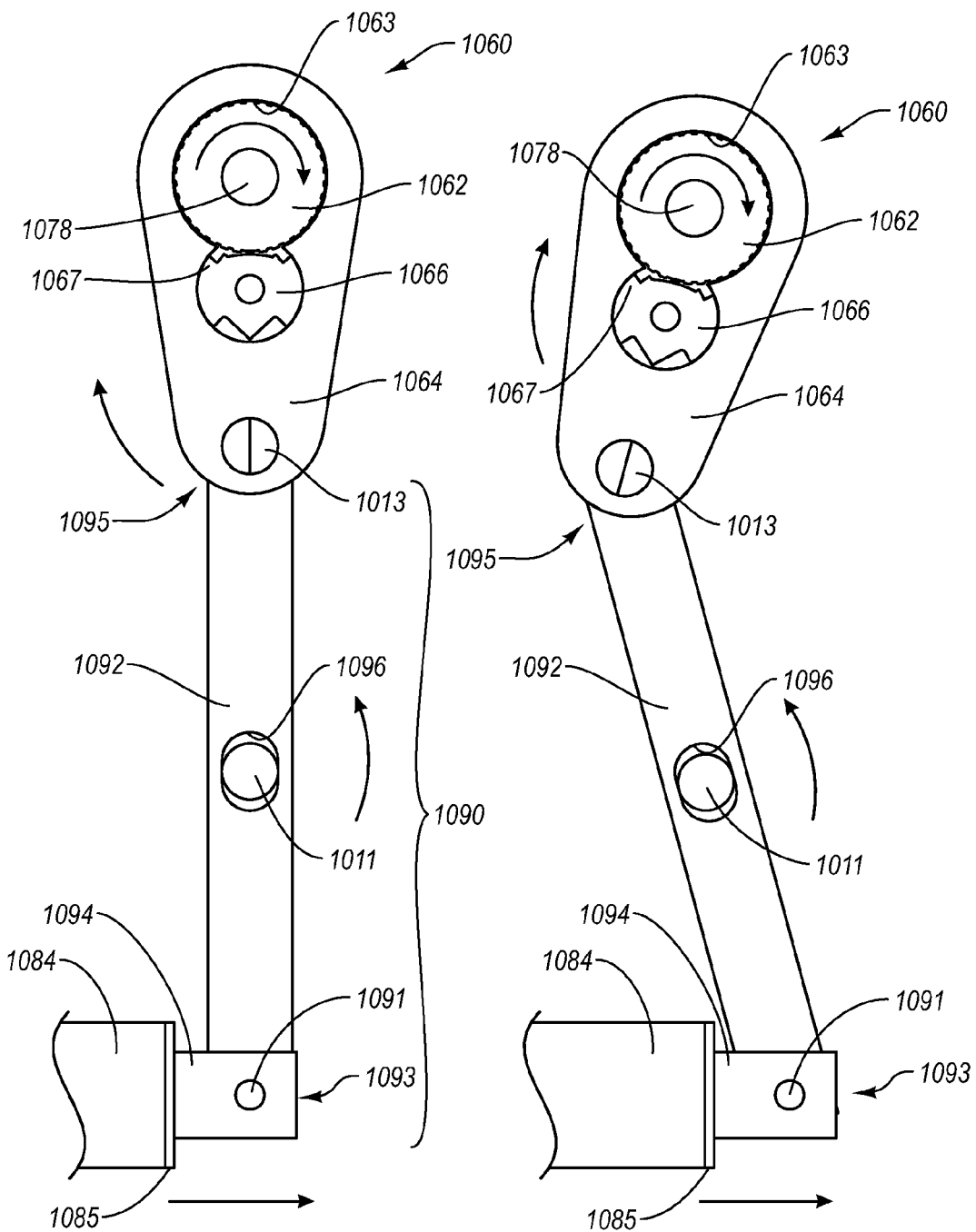
FIG. 21C is a perspective side view of a portion of the exemplary drilling system illustrated in FIG. 21A.
FIG. 21D is a perspective side view of a portion of the exemplary drilling system illustrated in FIG. 21A.
Figure 21E:
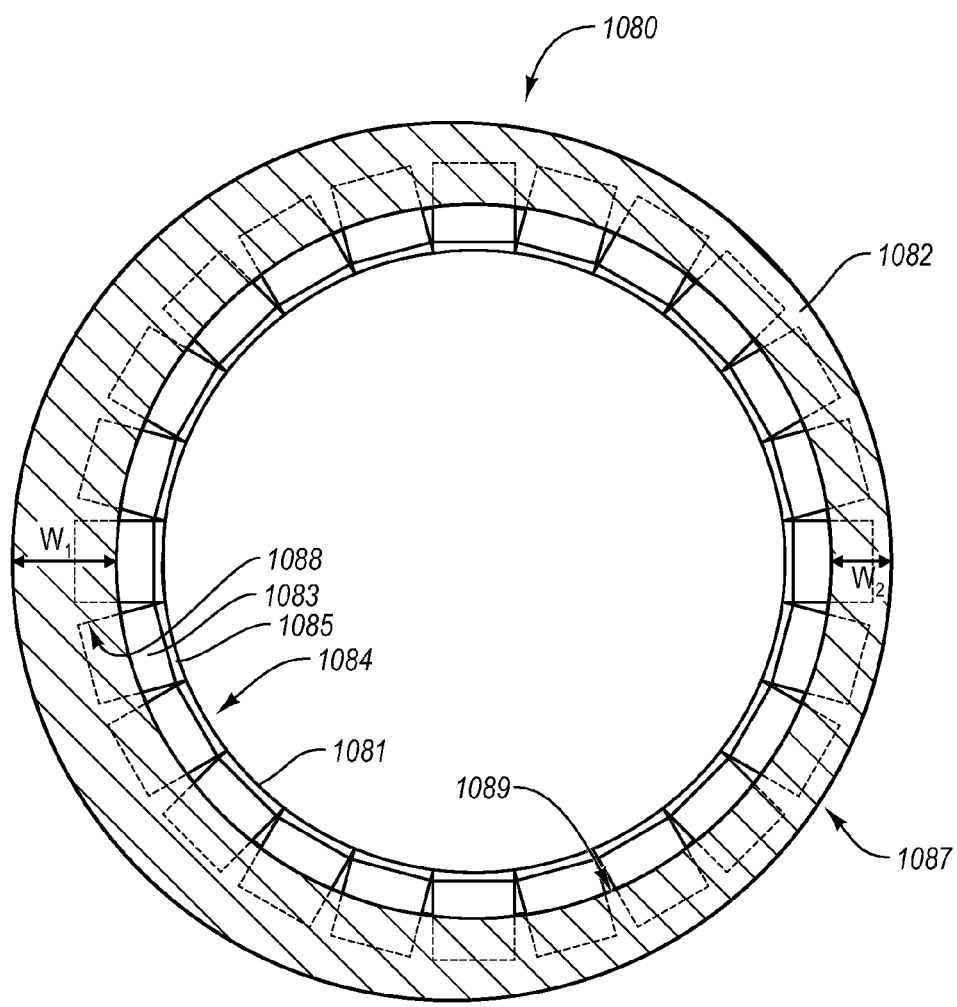
FIG. 21E is a top view of an exemplary cam assembly according to at least one embodiment.
Figure 21F:
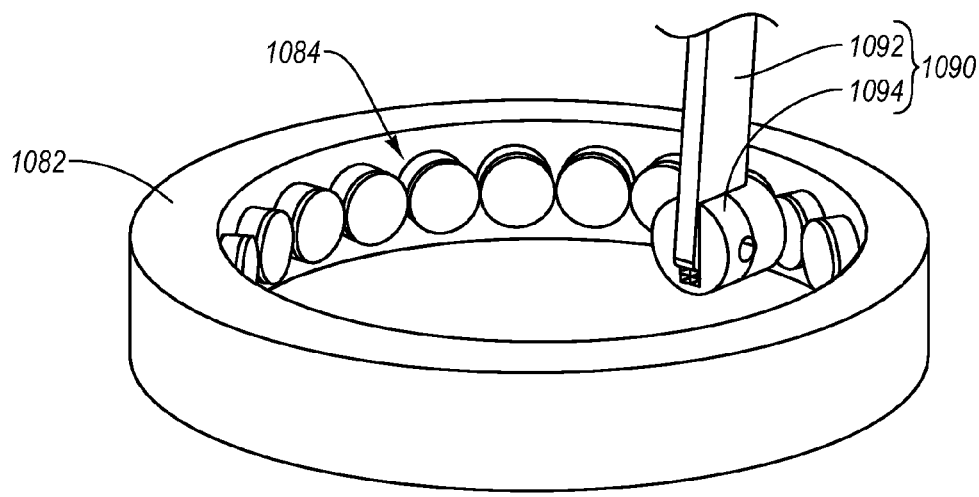
FIG. 21F is a perspective view of the exemplary cam assembly illustrated in FIG. 21F.

In at least one embodiment, and as illustrated in FIGS. 21C, 21D, and 21F, at least a portion of a cam follower assembly 1090 may be in contact with or coupled to cam surface 1081 of cam assembly 1080. Cam follower assembly 1090 generally represents any type or form of structure or assembly for contacting, tracing, or following the cam surface 1081 of cam assembly 1080. As illustrated in FIGS. 21B-21D and 21F, cam follower assembly 1090 may comprise a pivot arm 1092 having a first end 1093 and a second end 1095. In at least one embodiment, pivot arm 1092 may be pivotably mounted to bit body 1010 of bit 1002. For example, as illustrated in FIGS. 21B-21D, pivot arm 1092 may be pivotably mounted to bit body 1010 by inserting a pivot member 1011 attached to, or integrally formed with, bit body 1010 through a recess 1096 defined in pivot arm 1092.

As illustrated in FIGS. 21B-21D, cam follower assembly 1090 may also comprise at least one cam follower element 1094 rotatably attached to first end 1093 of pivot arm 1092 by a pin 1091. Cam follower element 1094 may be formed in any shape or size and may comprise any material or combination of materials. For example, in at least one embodiment, cam follower element 1094 may comprise a table of superhard or superabrasive material (such as polycrystalline diamond, silicon carbide, boron nitride, or the like) bonded to a substrate (comprising, for example, cemented tungsten carbide). In an additional embodiment, cam follower element 1094 may comprise a unitary or integrally formed structure comprising, for example, diamond, boron nitride, silicon carbide, or a combination of the foregoing.

As illustrated in FIGS. 21B-21D, second end 1095 of pivot arm 1092 of cam follower assembly 1090 may be connected, attached, affixed, or coupled to torque-applying structure 1060. For example, as illustrated in these figures, second end 1095 of pivot arm 1092 may be rotatably attached to torque-applying structure 1060 by a connecting structure 1013 inserted through apertures defined in both a body 1064 of torque-applying structure 1060 and the second end 1095 of pivot arm 1092.

Torque-applying structure 1060, which may be formed in any shape or size and of any material or combination of materials, generally represents any type or form of device or structure capable of applying torque to at least a portion of a cutting element. For example, torque-applying structure 1060 may comprise a ratchet device or any mechanical device or mechanism capable of rotating a cutting element. As illustrated in FIGS. 21C and 21D, torque-applying structure 1060 may comprise body 1064, a torque-applying wheel 1062, and a pawl 1066. In at least one embodiment, torque-applying wheel 1062, which may be formed in any shape and size and of any material, may be rotatably housed within a recess defined in body 1064 of torque-applying structure 1060. Torque-applying wheel 1062 also may be attached or connected to second end 1078 of connecting member 1076 and configured to rotate independent of, and relative to, body 1064 of torque-applying structure 1060. In contrast, pawl 1066 may be fixedly attached to, or integrally formed with, body 1064 of torque-applying structure 1060. As illustrated in FIGS. 21C-21D, and as described in greater detail below, pawl 1066 may comprise at least one engaging structure 1067 configured to engage one or more engaging structures 1063 formed on torque-applying wheel 1062.

In at least one embodiment, torque-applying structure 1060 may be structured to apply a torque generated by a torque-generating assembly (comprising, for example, rotary drill bit 1002, cam assembly 1080, and/or cam follower assembly 1090) to cutting element 1070. For example, in certain embodiments bit body 1010 of rotary drill bit 1002 may be structured to rotate relative cam assembly 1080, which may, as explained above, be coupled to a drill string (such as drill string 506 in FIG. 11A). Since torque-applying structure 1060 and cam follower assembly 1090 may be disposed within or coupled to bit body 1010 of drill bit 1002, torque-applying structure 1060 and cam follower assembly 1090 may also rotate, in conjunction with drill bit 1002, relative to cam assembly 1080.

As detailed above, cam follower assembly 1090 may be structured to contact, trace, or follow cam surface 1081 of cam assembly 1080 as drill bit 1002 rotates relative to cam assembly 1080. For example, in the exemplary embodiment illustrated in FIGS. 21C, 21D, and 21E, cam follower 1094 may contact and thus follow or trace the plurality of cam inserts 1084 that comprise the cam surface 1081 of cam assembly 1080. In at least one embodiment, an axis of rotation 1003 around which rotary drill bit 1002 rotates may intersect the center of a generally circular shape defined by external surface 1087 of cam body 1082. Accordingly, as cam follower 1094 of cam follower assembly 1090 traces or follows the cam surface 1081 of cam assembly 1080 during rotation of rotary drill bit 1002, cam follower element 1094 may reciprocate (i.e., radially inwardly and radially outwardly) relative to pivot member 1011 as a result of differences in the proximity of cam surface 1081 to the axis of rotation 1003 of rotary drill bit 1002. In other words, as rotary drill bit 1002 (and cam follower assembly 1090 coupled thereto) rotates relative to cam assembly 1080, the proximity of cam surface 1081 to the axis of rotation 1003 of rotary drill bit 1002 may change, which may in turn cause cam follower element 1094 to reciprocate relative to pivot member 1011, as illustrated in FIGS. 21C and 21D. As detailed above, the proximity of cam surface 1081 to the axis of rotation 1003 of rotary drill bit 1002 may vary based on the varying radial position or radial width (as defined by external surface 1087 and internal surface 1089) of cam body 1082, as illustrated in FIG. 21E, and/or as a result of differences in the height of cam inserts 1084 and/or cam insert pockets 1088.

As illustrated in FIGS. 21C and 21D, the reciprocating motion of cam follower element 1084 may cause pivot arm 1092 of cam follower element 1090 to pivot about pivot member 1011, as well as connecting structure 1013 and pin 1091, which may in turn cause body 1064 of torque-applying structure 1060 and pawl 1066 to rotate in a first direction. As body 1064 and pawl 1066 rotate, engaging structures 1067 of pawl 1066 may engage one or more engaging structures 1063 formed on torque-applying wheel 1062, causing torque-applying wheel 1062 (and second end 1068 of connecting member 1076 connected thereto) to rotate in a second direction opposite to the first direction. As torque-applying wheel 1062 rotates, connecting member 1076, which is attached to torque-applying wheel 1062, may transfer torque to cutting element 1070, causing cutting element 1070 to rotate. Accordingly, the exemplary embodiments illustrated in FIGS. 21A-21F may utilize the rotary motion of drill bit 1002 to apply torque to cutting element 1070.

Connecting member 1076 may comprise any type of connecting member capable of transferring torque from torque-applying wheel 1062 to cutting element 1070; including, for example, a universal joint as illustrated in FIG. 21B. In addition, in at least one embodiment, cutting element 1070 may be inhibited or limited from rotating in a direction opposite to the direction of torque applied by torque-applying wheel 1062. For example, a limiting member, such as a spring or other mechanism, may be biased toward and engage engaging features 1063 of torque-applying wheel 1062 to inhibit cutting element 1070 from rotating in a direction opposite to the direction of torque applied by torque-applying wheel 1062. In certain embodiments, this limiting member may be housed in a recess or aperture defined in body 1064 of torque-applying structure 1060.

Figure 22A:
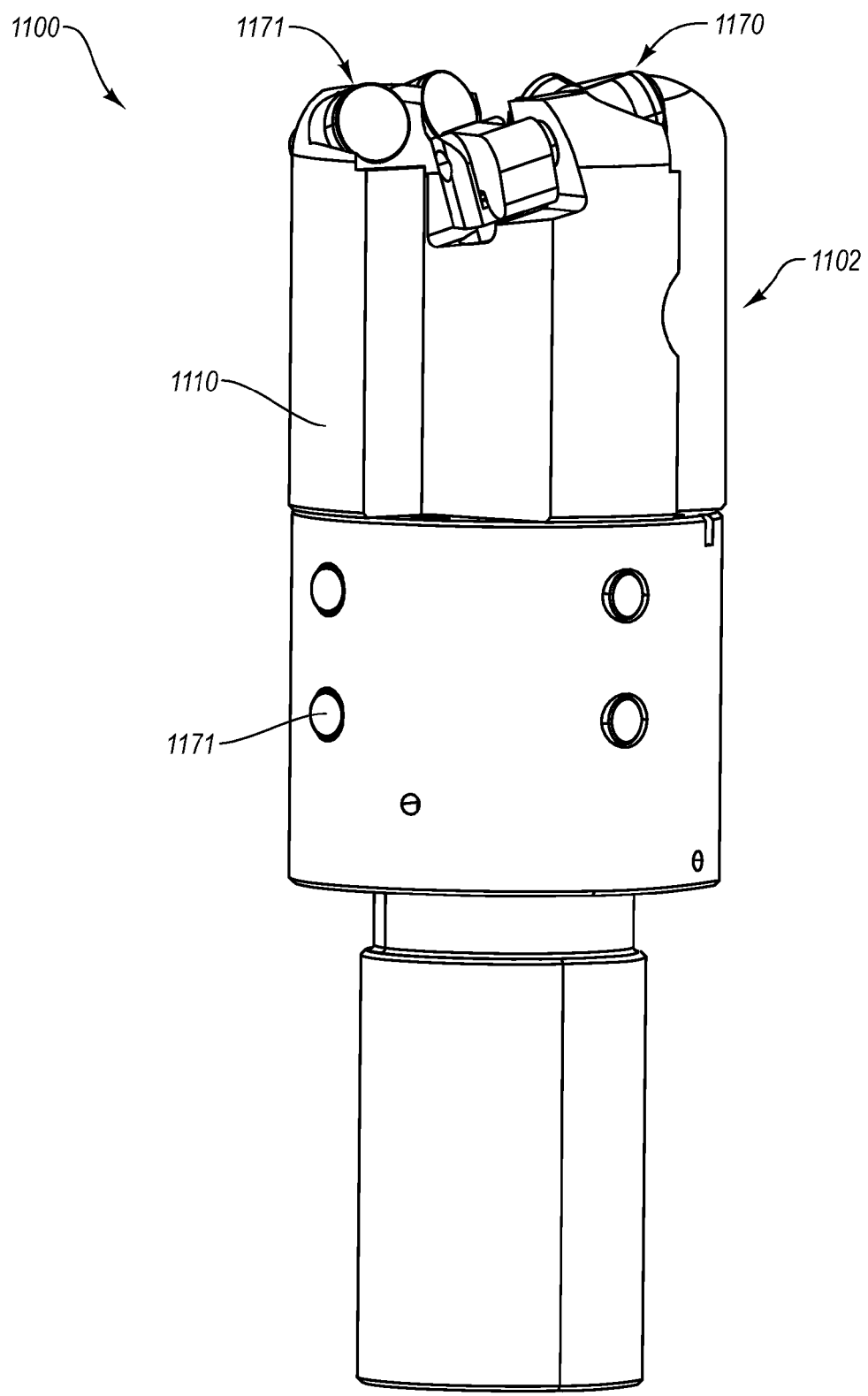
FIG. 22A is a side view of an exemplary drilling system according to an additional embodiment.
Figure 22B:
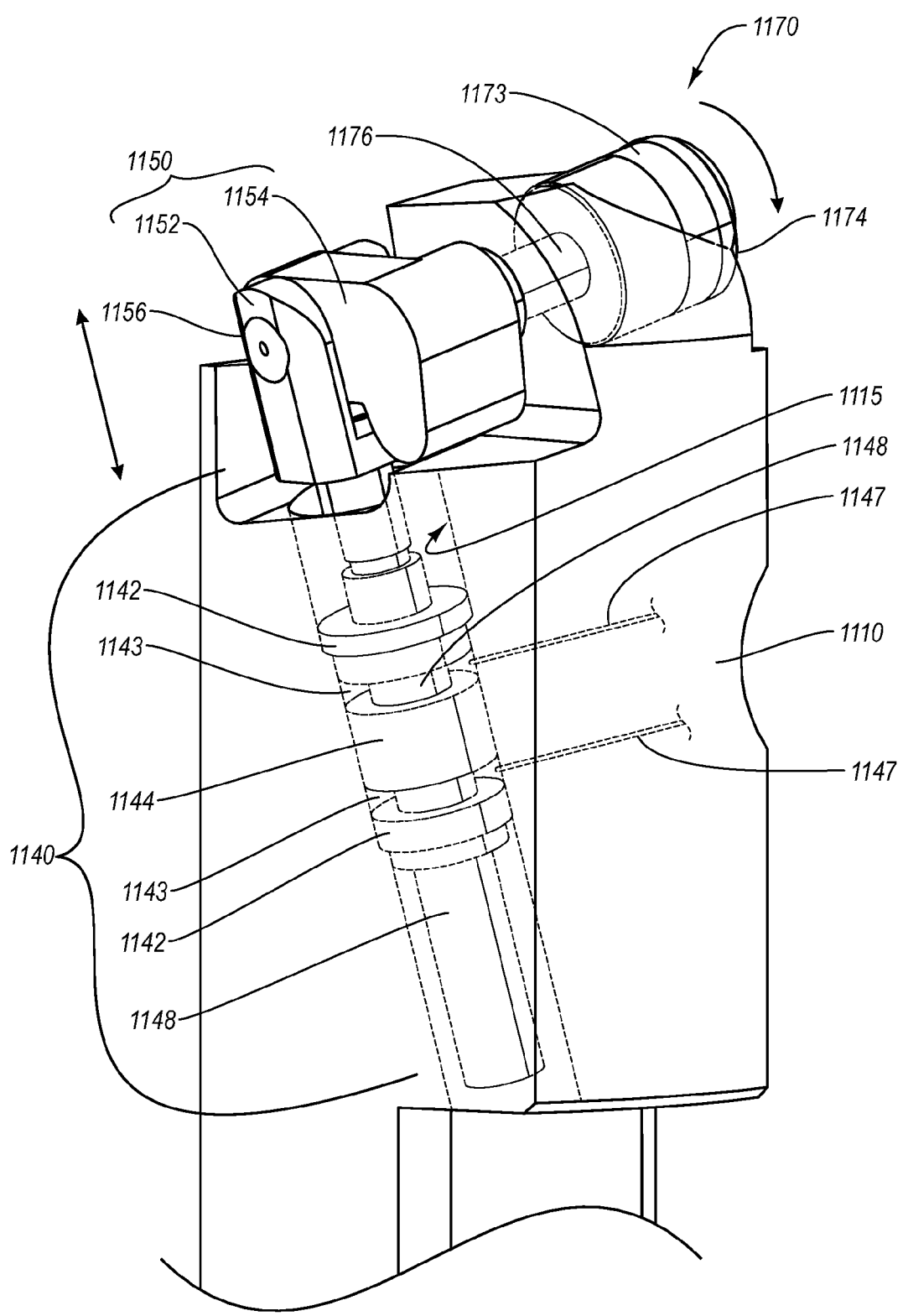
FIG. 22B is a perspective side view of an exemplary hydraulic actuator assembly according to an additional embodiment.

FIGS. 22A and 22B illustrate an exemplary drilling system 1100 according to an additional embodiment. As illustrated in FIG. 22A, exemplary drilling system 1100 may comprise a drill bit 1102 having a bit body 1110. Drill bit 1102 may represent any type of earth-boring or drilling tool; including, for example, core bits, roller-cone bits, fixed-cutter bits, eccentric bits, bicenter bits, reamers, reamer wings, and the like. Drill bit 1102 may also be formed in any number of ways and of any type of material or combination or materials. For example, drill bit 1102 may be machined from steel or may be manufactured by infiltrating a binder into a tungsten carbide particulate, as described above.

In certain embodiments, one or more rotatable cutting elements 1170 and/or one or more fixed (i.e., stationary) cutting elements 1171 may be mounted to the face or blades of bit body 1110 of drill bit 1102. Generally speaking, cutting elements 1170 and 1171 may comprise any cutting element capable of cutting a subterranean formation. As with previous embodiments, cutting elements 1170 and 1171 may be formed of any material or combination or materials suitable for cutting formations. For example, cutting element 1170 may comprise a material in a substantially unitary configuration or may comprise a plurality of materials (e.g., a superabrasive layer bonded to a substrate). In at least one example, and as illustrated in FIG. 22B, cutting element 1170 may comprise a superabrasive layer or table 1174 bonded to or formed upon a substrate 1172. Table 1174 may be formed of any material or combination of materials; including, for example, a superhard or superabrasive material, such as polycrystalline diamond. Similarly, substrate 1172 may comprise any material capable of adequately supporting a superabrasive material during drilling of a subterranean formation; including, for example, cemented tungsten carbide.

Cutting element 1170 may be rotatably mounted to bit body 1110 of drill bit 1102 in any number of ways and configurations. For example, as illustrated in FIG. 22B, cutting element 1170 may be rotatably mounted to drill bit 1102 by adhering, brazing, threadedly affixing, welding, or securing cutting element 1170 to a first end of a coupling structure 1176. Coupling structure 1176 generally represents any structure capable of coupling cutting element 1170 a torque-generating assembly.

In at least one embodiment, rotatable cutting element 1170 may be structured to rotate in response to a torque generated and applied by a torque-generating assembly. As illustrated in FIG. 22B, in certain embodiments this torque-generating assembly may comprise a hydraulic actuator assembly 1140 and a structural assembly 1150 coupled to both the hydraulic actuator assembly 1140 and cutting element 1170. As with the exemplary embodiments illustrated in FIGS. 4A-4C, hydraulic actuator assembly 1140 may represent a device capable of converting hydraulic or pneumatic pressure generated by a pump, such as pump 130 in FIGS. 2 and 3, into linear motion. In the exemplary embodiment illustrated in FIG. 22B, hydraulic actuator assembly 1140 may comprise opposing seal members 1142 disposed within a recess 1115 defined in bit body 1110, a chamber 1143 defined by seal members 1142, a piston 1144 disposed within chamber 1143, and a piston rod 1148 coupled to piston 1144.

In at least one embodiment, piston 1144 may be moved within chamber 1143 by generating a pressure differential within chamber 1143. As detailed above, in certain embodiments this pressure differential may be generated by a pump, such as pump 130 in FIGS. 2 and 3. Chamber 1143 may be in fluid communication with a pump used to generate this pressure differential, such as pump 130 in FIGS. 2 and 3, via one or more conduits 1147. Conduits 1147 generally represent any type of fluid communication device; including, for example, hoses, pipes, and tubing.

In at least one embodiment, the movement of piston 1144 within chamber 1143 may cause piston rod 1148, which may be coupled to piston 1144, to reciprocate in a linear fashion. In certain embodiments, structural assembly 1150, which may be coupled to piston rod 1148, may convert the linear motion of piston rod 1148 into rotary motion (i.e., torque) for rotating cutting element 1170. Structural assembly 1150, which may be formed in any shape and size, generally represents any device capable of converting linear motion generated by hydraulic actuator assembly 1140 into rotary motion (i.e., torque) for rotating cutting element 1170. In at least one embodiment, structural assembly 1150 may comprise a connecting structure 1152 coupled to piston rod 1148 and a crank 1154 coupled to both connecting structure 1152 and coupling structure 1176, which, as detailed above, may be coupled to cutting element 1170. In certain embodiments, connecting structure 1152 may be coupled or attached to a first end of piston rod 1148. In addition, crank 1154 may be rotatably attached to connecting structure 1152 by a pin 1156 inserted through apertures defined in both connecting structure 1152 and crank 1154.

In the exemplary embodiment illustrated in FIG. 22B, the linear motion of piston rod 1148 may be converted to rotary motion by structural assembly 1150 by allowing crank 1154 to rotate about the axis of pin 1156 as piston rod 1148, and connecting structure 1152 connected thereto, reciprocates. This rotary motion may then be transferred from crank 1154 to coupling structure 1176, which may in turn apply this rotary motion to cutting element 1170 as torque to rotate the cutting element.

In at least one embodiment, cutting element 1170 may be inhibited or limited from rotating in a direction opposite to the direction of torque applied by a torque-applying structure, such as structural assembly 1150. For example, a limiting member, such as a spring or other mechanism, may be biased toward and engage engaging features formed on a portion of coupling structure 1176 housed within crank 1154 to inhibit coupling structure 1176, and thus cutting element 1170, from rotating in a direction opposite to the direction of torque applied by structural assembly 1150. This limiting member may be any structure or assembly structured for limiting the rotation of cutting element 1170 in an undesired direction. In certain embodiments, this limiting member may be housed in a recess or aperture defined in crank 1154 of structural assembly 1150.

Rotation of a cutting element may be accomplished in various configurations. For example, a cutting element may be rotated in a first direction (e.g., clockwise) and subsequently rotated in a second direction (e.g., clockwise or counterclockwise). In one embodiment, the second direction may be opposite to the first direction. In another embodiment, the second direction may be identical to the first direction. Further, as discussed above, a cutting element may be rotated in a first direction and in a second direction opposite to the first direction through a selected angle (e.g., ninety degrees, forty-five degrees, one hundred and eighty degrees, etc.). In addition, rotation of a cutting element may occur in a substantially continuous fashion or may occur in a stepped or piecewise fashion. Thus, a cutting element may rotate and cease to rotate (or vice versa) if desired. Rotation may occur at any selected acceleration and/or velocity, without limitation.

Forces developed on a cutting element during drilling may inhibit or prevent rotation of the cutting element. Accordingly, it may be advantageous to rotate a cutting element while limiting or preventing engagement of the cutting element with a material to be cut. Such a configuration may reduce or limit forces on the cutting element, which may limit or reduce resistance to rotation of the cutting element. Thus, in one embodiment, a cutting element may be employed for drilling a subterranean formation and periodically caused to have limited or no contact with the subterranean formation. Such a method may facilitate rotation of the cutting element by limiting or eliminating resistance of the cutting element to rotation. Put another way, drilling operations and/or conditions (e.g., weight on bit, torque, rotation speed (rpm), etc.) may be selected (e.g., periodically or according to any desired criteria, without limitation) for facilitating rotation of at least one rotatable cutting element.

The preceding description has been provided to enable others skilled in the art to best utilize the invention in various embodiments and aspects and with various modifications as are suited to the particular use contemplated. This exemplary description is not intended to be exhaustive or to limit the invention to any precise form disclosed. Many modifications and variations in the form and details are possible without departing from the spirit and scope of the invention. It is intended that the scope of the invention be defined by the following claims.

What is claimed is:

1. A system for drilling a subterranean formation, the system comprising:
    a torque-generating assembly;
    a drill bit including a bit body and at least one cutting element rotatably coupled to the bit body, the bit body being rotatable relative to the torque-generating assembly;
    a structure positioned between the torque-generating assembly and the at least one cutting element, wherein the structure is configured to effect rotation of the at least one cutting element upon rotation of the bit body relative to the torque-generating assembly.

2. The system of claim 1, wherein the torque-generating comprises a cam follower assembly configured to rotate with the drill bit body relative to a cam assembly.

3. The system of claim 2, wherein the cam assembly includes a substantially annular body.

4. The system of claim 2, wherein the substantially annular body includes a cam surface.

5. The system of claim 4, wherein at least a portion of the cam surface is inclined relative to a plane that is substantially normal to a rotational axis of the bit body.

6. The system of claim 4, wherein the cam surface is substantially planar.

7. The system of claim 3, wherein the cam assembly comprises a plurality of inserts coupled with the substantially annular body, the plurality of inserts collectively defining a cam surface.

8. The system of claim 7, wherein each of the plurality of inserts includes a superabrasive table bonded to a substrate.

9. The system of claim 2, wherein the structure includes a push rod having a first end positioned adjacent a portion of the cam follower assembly and a second end positioned adjacent a portion of the at least one cutting element.

10. The system of claim 9, wherein the first end of the push rod is positioned within a recess defined within a cam follower element of the cam follower assembly.

11. The system of claim 9, wherein the push rod is at least partially disposed within an interior passage of the bit body.

12. The system of claim 11, further comprising a bushing positioned between the push rod and the interior passage.

13. The system of claim 9, wherein the push rod is biased towards the at least one cutting element.

14. The system of claim 1, wherein the torque-generating assembly is coupled with a drill string.

15. The system of claim 1, wherein the torque-generating assembly comprises a cam assembly that is associated with a sleeve disposed about at least a portion of the bit body.

16. The system of claim 15, wherein the sleeve is disposed within a recess formed in a gage portion of the bit body.

17. The system of claim 16, further comprising at least one radial bearing disposed between the sleeve and the bit body.

18. The system of claim 17, further comprising at least one thrust bearing disposed between the sleeve and the bit body.

19. The system of claim 1, further comprising a motor configured to rotate the bit body relative to the torque-generating assembly.

20. The system of claim 1, wherein the at least one cutting element comprises a superabrasive table bonded to a substrate.

* * * * *